(12) United States Patent
Jeon

(10) Patent No.: US 7,092,047 B2
(45) Date of Patent: *Aug. 15, 2006

(54) THIN FILM TRANSISTOR SUBSTRATE FOR LIQUID CRYSTAL DISPLAY PANEL AND MANUFACTURING METHOD THEREOF

(75) Inventor: Jin Jeon, Anyang-si (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/814,955

(22) Filed: Mar. 31, 2004

(65) Prior Publication Data

US 2004/0179144 A1 Sep. 16, 2004

Related U.S. Application Data

(63) Continuation of application No. 10/051,701, filed on Jan. 17, 2002, now Pat. No. 6,738,109.

(30) Foreign Application Priority Data

Jul. 21, 2001 (KR) ............................ 2001-44035

(51) Int. Cl.
*G02F 1/136* (2006.01)
(52) U.S. Cl. .................... 349/43; 349/149; 349/151
(58) Field of Classification Search ............. 349/43, 349/152, 149, 151, 147, 143
See application file for complete search history.

(56) References Cited

U.S. PATENT DOCUMENTS

| 5,294,811 A * | 3/1994 | Aoyama et al. ............. 257/59 |
| 6,261,881 B1 * | 7/2001 | Yamazaki et al. .......... 438/161 |
| 6,384,818 B1 * | 5/2002 | Yamazaki et al. .......... 345/206 |
| 6,738,109 B1 * | 5/2004 | Jeon ............................ 349/43 |

FOREIGN PATENT DOCUMENTS

CN 19941083598 3/1994

OTHER PUBLICATIONS

English Abstract.

* cited by examiner

*Primary Examiner*—Dung T. Nguyen
*Assistant Examiner*—Thoi V. Duong
(74) *Attorney, Agent, or Firm*—F. Chau & Associates, LLC

(57) ABSTRACT

In an LCD panel substrate and a manufacturing method thereof, a gate pattern includes a gate line formed on a pixel region and a peripheral region of a transparent insulating substrate and a gate electrode branched from the gate line. A gate insulating film is formed on the substrate having the gate pattern. An active pattern is formed on the gate insulating film and including a first impurity region, a second impurity region, and a channel region therebetween. A data pattern is formed on the active pattern and the gate insulating film. The data pattern includes a first electrode, a second electrode, and a data line. A first insulating interlayer is formed on the data pattern and the gate insulating film. The first insulating interlayer includes a first contact hole for partially exposing the first electrode, a second contact hole for exposing the gate electrode of a first drive transistor of the peripheral region and a third contact hole for exposing the first/second electrode of a second drive transistor of the peripheral region. An electrode pattern part is formed on the first insulating interlayer. The electrode pattern part includes a first electrode pattern coupled to the first electrode of the pixel region through the first contact hole, and a second electrode pattern connecting the partially exposed gate electrode of the first drive transistor with the exposed first/second electrode of the second drive transistor through the second and third contact holes.

35 Claims, 51 Drawing Sheets

FIG. 40
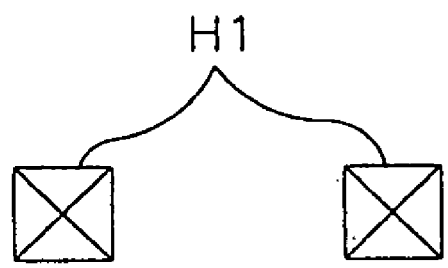
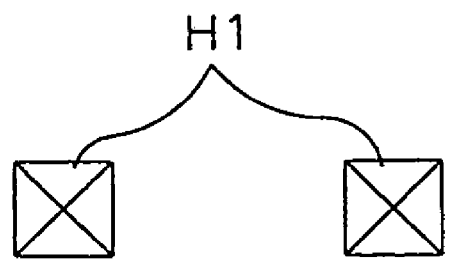

118

US 7,092,047 B2

THIN FILM TRANSISTOR SUBSTRATE FOR LIQUID CRYSTAL DISPLAY PANEL AND MANUFACTURING METHOD THEREOF

CROSS-REFERENCE TO RELATED APPLICATIONS

This is a continuation of application Ser. No. 10/051,701 filed on Jan. 17, 2002, now U.S. Pat. No. 6,738,109 the disclosure of which in its entirety is incorporated-by-reference herein.

BACKGROUND OF THE INVENTION

1. Field of the Invention

The present invention relates to a thin film transistor substrate and a manufacturing method thereof, and more particularly, to an amorphous silicon thin film transistor substrate having a gate driver for an LCD panel and a manufacturing method thereof.

2. Description of the Related Art

A liquid crystal display (LCD) is one of the most popular flat panel displays (FPDs). An LCD generally includes two substrates, each having an electrode formed on an inner surface thereof, and a liquid crystal layer interposed between the two substrates. In an LCD, a voltage is applied to the electrode to re-align liquid crystal molecules and control an amount of light transmitted through the liquid crystal layer.

TFT-LCDs are now the most common type of LCDs. Electrodes are formed on each of the two substrates and thin film transistors (TFTs) are used for switching power supplied to each electrode. The TFT is typically formed on one side of the two substrates.

Generally, an LCD in which TFTs are respectively formed in unit pixel regions is classified as an amorphous type TFT-LCD and a polycrystalline type TFT-LCD. The polycrystalline type TFT-LCD has advantages in that it is capable of speedier operation at low power consumption. It has also an advantage in that TFTs for pixels and semiconductor devices for drive-circuits can be formed together.

On the other hand, the driving circuit for the polycrystalline type TFT-LCD further needs an annealing process for transforming an amorphous silicon into polycrystalline silicon after the amorphous silicon is deposited. In other words, in case that a glass substrate is used, a deformation in the glass substrate may occur during the annealing process. Also, since the gate driver has a structure of complementary metal oxide semiconductor (CMOS), both of n-channel transistor and p-channel transistor are formed on the same substrate. Thus, as compared with a manufacturing process of the amorphous type TFT-LCD in which a single channel type transistor is formed, a manufacturing process of the polycrystalline type TFT-LCD is more complicated and difficult.

In general, a substrate on which TFTs for an LCD are formed is manufactured by a photolithography process using a plurality of masks, and five or six photolithography process steps are used. Since the photolithography process is expensive, it is desirable to reduce the number of photolithography steps.

SUMMARY OF THE INVENTION

There is provided an LCD panel substrate. In the above LCD panel substrate, a gate pattern includes a gate line formed on a pixel region and a peripheral region of a transparent insulating substrate respectively and a gate electrode branched from the gate line. A gate insulating film is formed on the substrate having the gate pattern. An active pattern is formed on the gate insulating film and includes a first impurity region, a second impurity region, and a channel region formed between the first impurity region and the second impurity region. A data pattern is formed on the active pattern and the gate insulating film. The data pattern includes a first electrode in contact with the first impurity region, a second electrode in contact with the second impurity region and a data line coupled to the first electrode. A first insulating interlayer is formed on the data pattern and the gate insulating film. The first insulating interlayer includes a first contact hole for partially exposing the first electrode, a second contact hole for exposing the gate electrode of a first drive transistor of the peripheral region and a third contact hole for exposing the first/second electrode of a second drive transistor of the peripheral region. An electrode pattern part is formed on the first insulating interlayer. The electrode pattern part includes a first electrode pattern coupled to the first electrode of the pixel region through the first contact hole, and a second electrode pattern connecting the partially exposed gate electrode of the first drive transistor with the exposed first/second electrode of the second drive transistor through the second and third contact holes.

Also, there is provided an LCD panel substrate, in which a gate pattern includes a gate line formed on a pixel region and a peripheral region of a transparent insulating substrate respectively and a gate electrode branched from the gate line. A gate insulating film is formed on the substrate having the gate pattern. An active pattern is formed on the gate insulating film and includes a first impurity region, a second impurity region, and a channel region formed between the first impurity region and the second impurity region. A data pattern is formed on the active pattern and the gate insulating film and includes a first electrode in contact with the first impurity region, a second electrode making contact with the second impurity region and a data line coupled to the first electrode. A first insulating interlayer is formed on the data pattern and the gate insulating film. The first insulating interlayer includes a first contact hole for partially exposing the second electrode, a second contact hole for partially exposing the first electrode of the pixel region, a third contact hole for exposing the gate electrode of a first drive transistor of the peripheral region, and a fourth contact hole for exposing the first/second electrode of a second drive transistor of the peripheral region. An electrode pattern part is formed on the first insulating interlayer. The electrode pattern part includes a first electrode pattern coupled to the second electrode of the pixel region through the first contact hole, a second electrode pattern coupled to the first electrode of the pixel region through the second contact hole, and a third electrode pattern connecting the exposed gate electrode of the first drive transistor with the exposed first/second electrode of the second drive transistor through the third and fourth contact holes.

There is also provided a method for manufacturing an LCD panel substrate. In the above method, a gate pattern including a gate line formed on a pixel region and a peripheral region of a transparent insulating substrate respectively and a gate electrode branched from the gate line are formed. A gate insulating film, a non-doped amorphous silicon layer, an impurity-doped amorphous silicon layer, and a metal layer are formed on the insulating substrate having the gate pattern. A photoresist pattern is formed on the metal layer. Here, a portion the photoresist pattern corresponding to a channel region between a source electrode and a drain electrode is thinner than portions corresponding to the source electrode and the drain electrode. The metal layer, the doped amorphous silicon layer, and the amorphous silicon layer are patterned using the photoresist pattern as a mask to remove the metal layer of the channel region and to form a data pattern including the source electrode, the drain electrode spaced apart from the source electrode, and a data line coupled to the drain electrode and substantially perpendicular to the gate line. The photoresist pattern and the impurity-doped amorphous silicon layer of the channel region are removed. An insulating interlayer is formed on a resultant structure of the substrate. The insulating interlayer is partially etched to form a first contact hole for partially exposing the drain electrode of the pixel region, a second contact hole for exposing the gate electrode of a first transistor of the peripheral region, and a third contact hole for exposing the source/drain electrode of a second transistor of the peripheral region. A conductive film is formed on the first insulating layer having the first, second and third contact holes. The conductive film is patterned to form a first electrode pattern and a second electrode pattern. The first electrode pattern is coupled to the drain electrode of the pixel region through the first contact hole, and the second electrode pattern connects the partially exposed gate electrode of the first transistor with the exposed source/drain electrode of the second transistor through the second and third contact holes.

Also, there is provided a method for manufacturing an LCD panel substrate. In the above method, a gate pattern includes a gate line on a pixel region and a peripheral region of a transparent insulating substrate respectively and a gate electrode branched from the gate line. A gate insulating film, a non-doped amorphous silicon layer, an impurity-doped amorphous silicon layer and a metal layer are sequentially formed on the gate pattern and the substrate. A photoresist pattern is formed on the metal layer. Here, a portion of the photoresist pattern corresponding to a channel region between a source electrode and a drain electrode is thinner than portions corresponding to the source electrode and the drain electrode. The metal layer, the doped amorphous silicon layer and the amorphous silicon layer are patterned using the photoresist pattern as a mask to remove the metal layer of the channel region and to form a data pattern including the source electrode and the drain electrode spaced apart from the source electrode. The photoresist pattern and the impurity-doped amorphous silicon layer of the channel region are removed. A first insulating interlayer is formed on a resultant structure of the substrate. The first insulating interlayer is partially etched to form a first contact hole for partially exposing the drain electrode of the pixel region, a second contact hole for partially exposing the source electrode of the pixel region, a third contact hole for exposing the gate electrode of a first transistor of the peripheral region and a fourth contact hole for exposing the source/drain electrode of a second transistor of the peripheral region. A conductive film is formed on the first insulating interlayer having the first, second, third and fourth contact holes. The conductive film is patterned to form a first electrode pattern, a second electrode pattern and a third electrode pattern. The first electrode pattern is coupled to the source electrode of the pixel region through the first contact hole, the second electrode pattern is coupled to the drain electrode of the pixel region through the second contact hole and the third electrode pattern connects the exposed gate electrode of the first transistor with the exposed source/drain electrode of the second transistor through the third and fourth contact holes.

Further, there is provided a method for manufacturing an LCD panel substrate. In the above method, a gate pattern including a gate line on a pixel region and a peripheral region of a transparent insulating substrate respectively and a gate electrode branched from the gate line are formed. A gate insulating film is formed on the substrate having the gate pattern. An active pattern is formed on the gate insulating film. The active pattern includes a first impurity region, a second impurity region and a channel region between the first impurity region and the second impurity region. A data pattern including a drain electrode placed on and making contact with the first impurity region, a source electrode placed on and in contact with the second impurity region and a data line coupled to the source electrode and substantially perpendicular to the gate line is formed. An insulating interlayer is formed on the data pattern and the gate insulating film. The insulating interlayer is partially etched to form a first contact hole for partially exposing the drain electrode of the pixel region, a second contact hole for exposing the gate electrode of a first drive transistor of the peripheral region and a third contact hole for exposing the source/drain electrode of a second drive transistor of the peripheral region. A conductive film is formed on the insulating interlayer having the first, second and third contact holes. The conductive film is patterned to form a first electrode pattern and a second electrode pattern. The first electrode pattern is coupled to the drain electrode of the pixel region through the first contact hole and the second electrode pattern connecting the exposed gate electrode of the first drive transistor with the exposed source/drain electrode of the second drive transistor through the second and third contact holes.

Furthermore, there is provided a method for manufacturing an LCD panel substrate. In the above method, a gate pattern including a gate line on a pixel region and a peripheral region of a transparent insulating substrate respectively and a gate electrode branched from the gate line is formed. A gate insulating film is formed on the substrate having the gate pattern. An active pattern is formed on the gate insulating film. The active pattern includes a first impurity region, a second impurity region and a channel region between the first impurity region and the second impurity region. A data pattern including a drain electrode placed on and making contact with the first impurity region, a source electrode placed on and making contact with the second impurity region and a data line coupled to the source electrode and substantially perpendicular to the gate line is formed. A first insulating interlayer is formed on the data pattern and the gate insulating film. The first insulating interlayer is partially etched to form a first contact hole for partially exposing the source electrode of the pixel region, a second contact hole for partially exposing the drain electrode of the pixel region, a third contact hole for exposing the gate electrode of a first transistor of the peripheral region and a fourth contact hole for exposing the source/drain electrode of a second transistor of the peripheral region. A conductive film is formed on the first insulating interlayer having the first, second, third and fourth contact holes. The conductive film is patterned to form a first electrode pattern, a second electrode pattern and a third electrode pattern. The first electrode pattern is coupled to the source electrode of the pixel region through the first contact hole, the second electrode pattern being coupled to the drain electrode of the pixel region through the second contact hole and the third electrode pattern connecting the exposed gate electrode of the first transistor with the exposed source/drain electrode of the second transistor through the third and fourth contact holes.

Thus, according to the present invention, an area of the gate driving region is minimized and at the same time the number of the masks used for forming the thin film transistor is decreased to four or five sheets.

BRIEF DESCRIPTION OF THE DRAWINGS

The above objects and other advantages of the present invention will become more apparent by describing in detail preferred embodiments thereof with reference to the attached drawings in which:

FIGS. 37 to 41 are partial detailed plan views for describing unit processes in the unit pixel region and its adjacent portions;

DETAILED DESCRIPTION OF PREFERRED EMBODIMENTS

Figure 1:
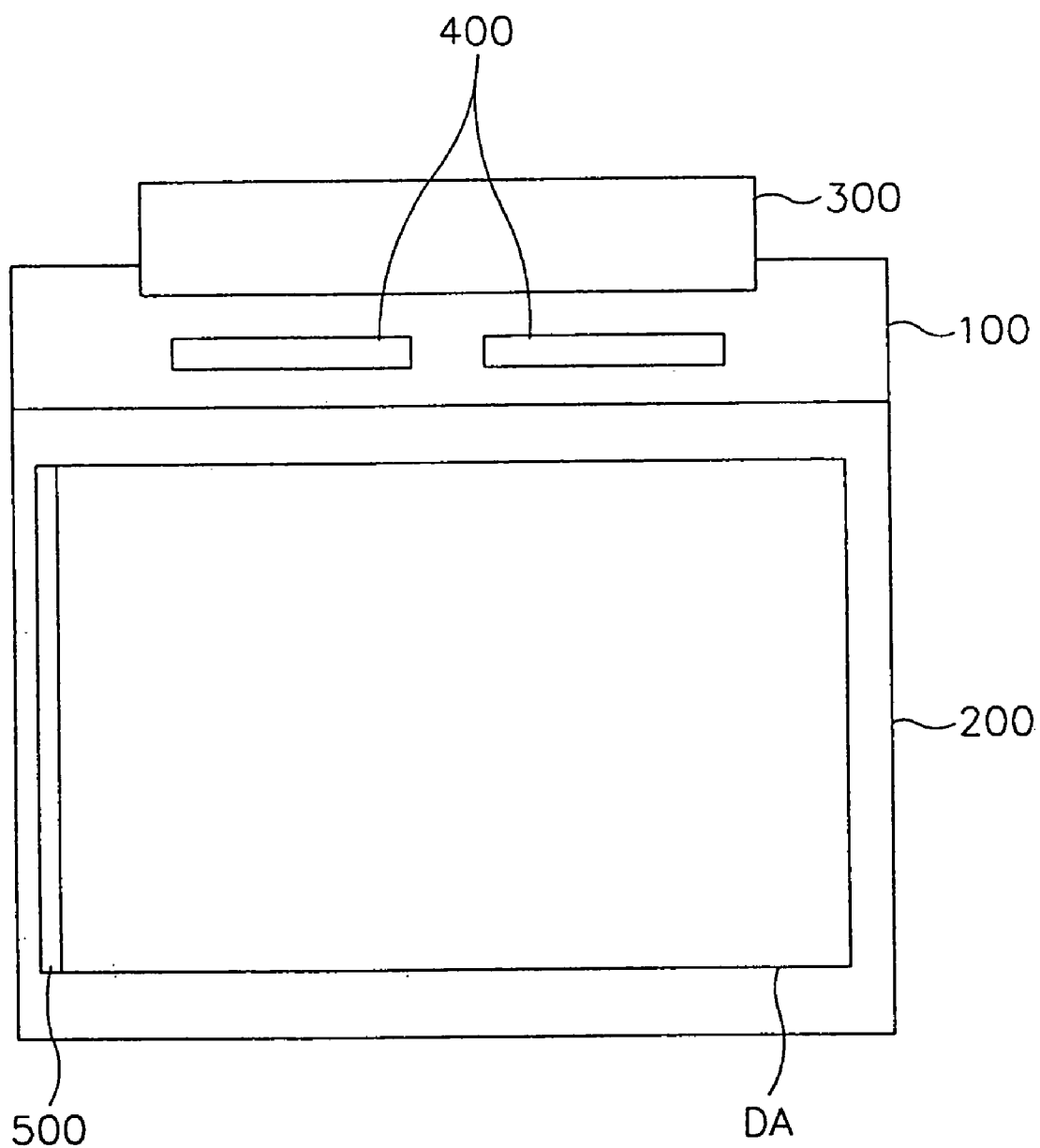
FIG. 1 is a schematic view of an LCD panel.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Then, liquid crystal displays according to embodiments of the present invention will be described with reference to the drawings.

Now, preferred embodiments of the present invention will be described in detail with reference to the annexed drawings.

FIG. 1 is a schematic plan view of an LCD panel.

Referring to FIG. 1, an LCD panel includes a thin film transistor (TFT) substrate 100 as a lower substrate, a color filter substrate 200 as an upper substrate, and a liquid crystal layer (not shown) disposed between the TFT substrate 100 and the color filter substrate 200. A flexible printed circuit (FPC) connector 300 is attached on and connected to the TFT substrate 100 along one side edge of the LCD panel.

The TFT substrate 100 is divided into a pixel region and a peripheral region. At the pixel region, there are arranged pixel electrodes in a matrix configuration. Thin film transistors as switching elements are respectively coupled to the pixel electrodes. In FIG. 1, reference symbol DA indicates a display area.

At the peripheral region, there are arranged a source drive circuit part 400 and a gate drive circuit part 500. The source drive circuit part 400 separates a gate driving signal and a data driving signal from an external image signal input through the FPC connector 300 and applies the separated data driving signal to data lines. The gate drive circuit part 500 applies the gate driving signal separated from the source drive circuit part 400 to gate lines. The source drive circuit part 400 is mounted on the TFT substrate 100 in a chip on glass (COG) type. The source drive circuit part 400 may be plural as shown in FIG. 1 or be a single structure as shown in FIG. 2.

Figure 2:
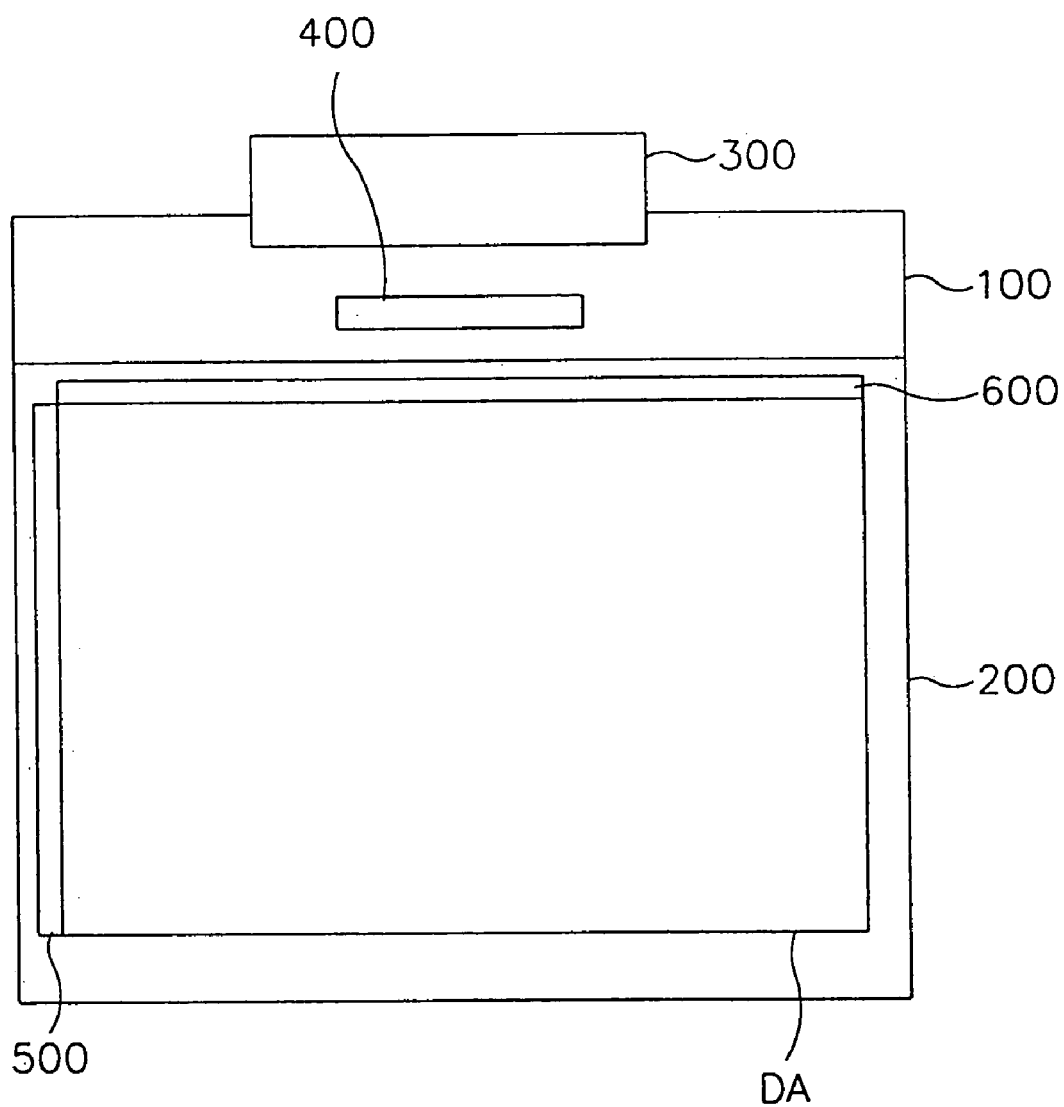
FIG. 2 is a plan view of an LCD panel.

FIG. 2 is a simplified plan view of a panel having the single source drive circuit part 400 in a transmission gate (TG) structure. Referring to FIG. 2, there is disposed a switching part 600 which allows data signals to be applied to the data lines of the pixel region from the source drive circuit part 400.

Figure 3:
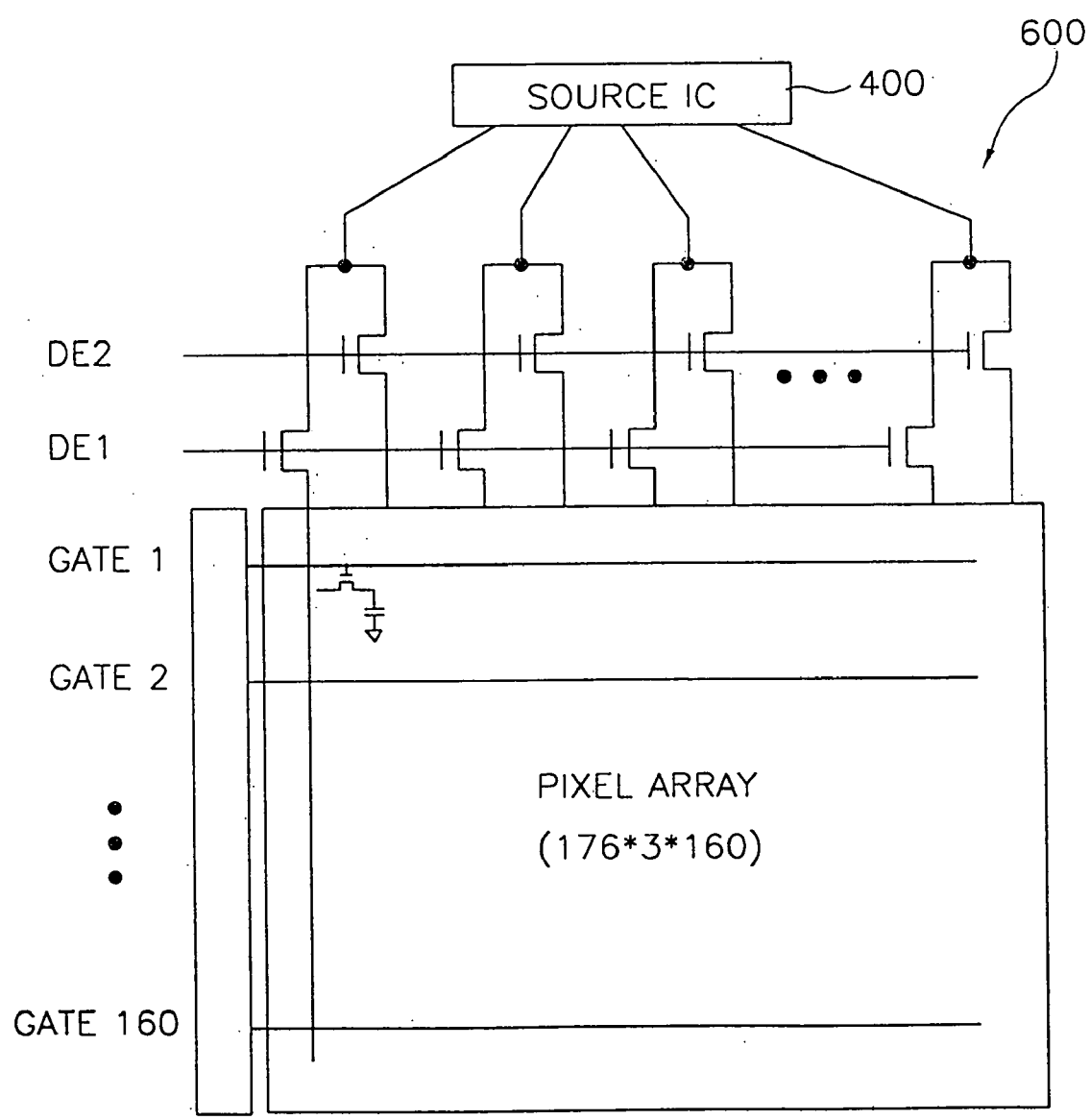
FIG. 3 is a simplified circuit diagram of the LCD panel of FIG. 2, which has a single source drive circuit part in a transmission gate (TG) structure.
Figure 51:
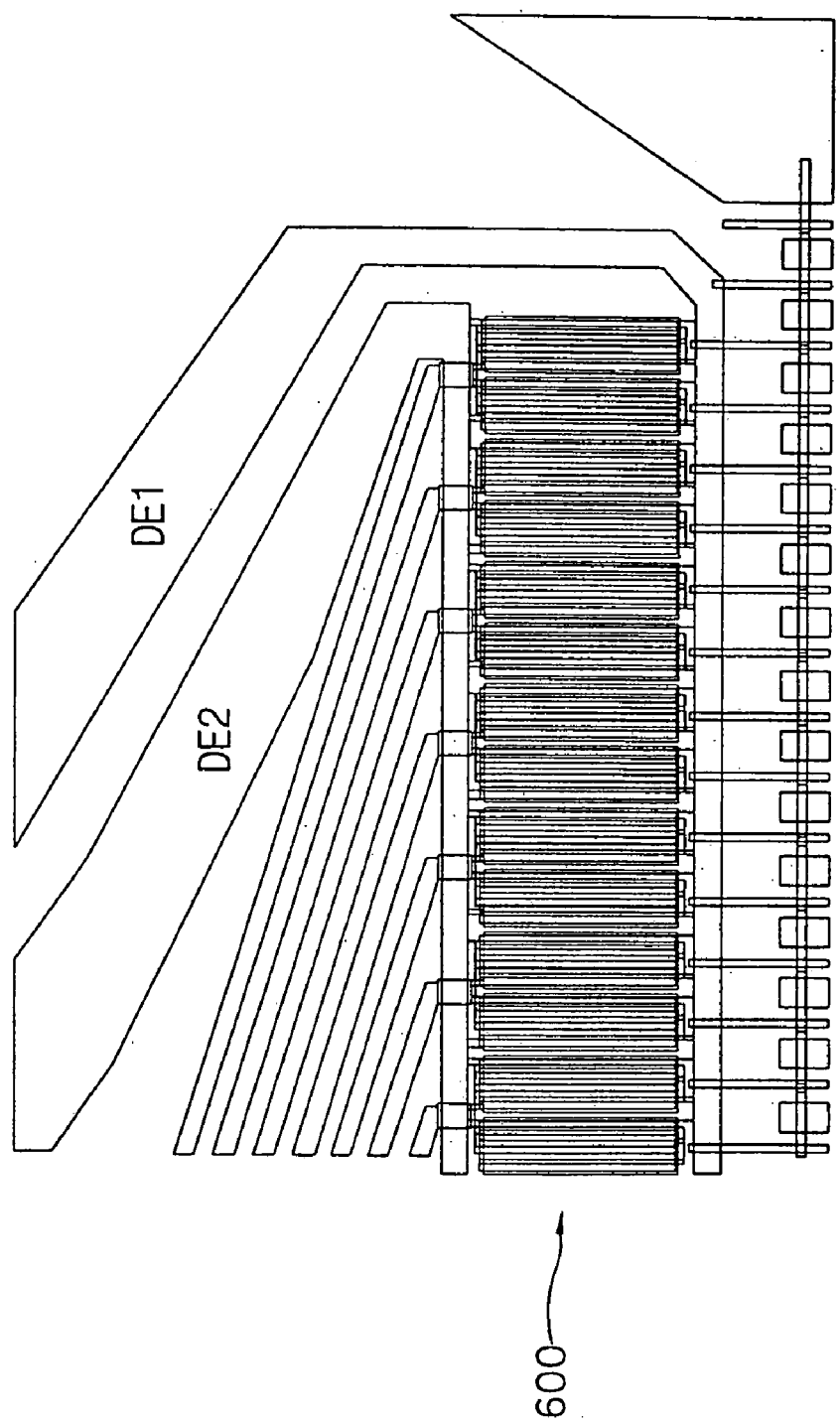
FIG. 51 is a plan view of lines of DE1 and DE2, data signal line extracted from the source drive circuit part, and a switching part.

FIG. 3 is an example of a circuit diagram of the switching part 600 as shown in FIG. 2. A planar structure of lines DE1 and DE2, data lines connected to the source drive circuit part 400. A plan view of the switching part 600 is shown in FIG. 51.

Figure 4:
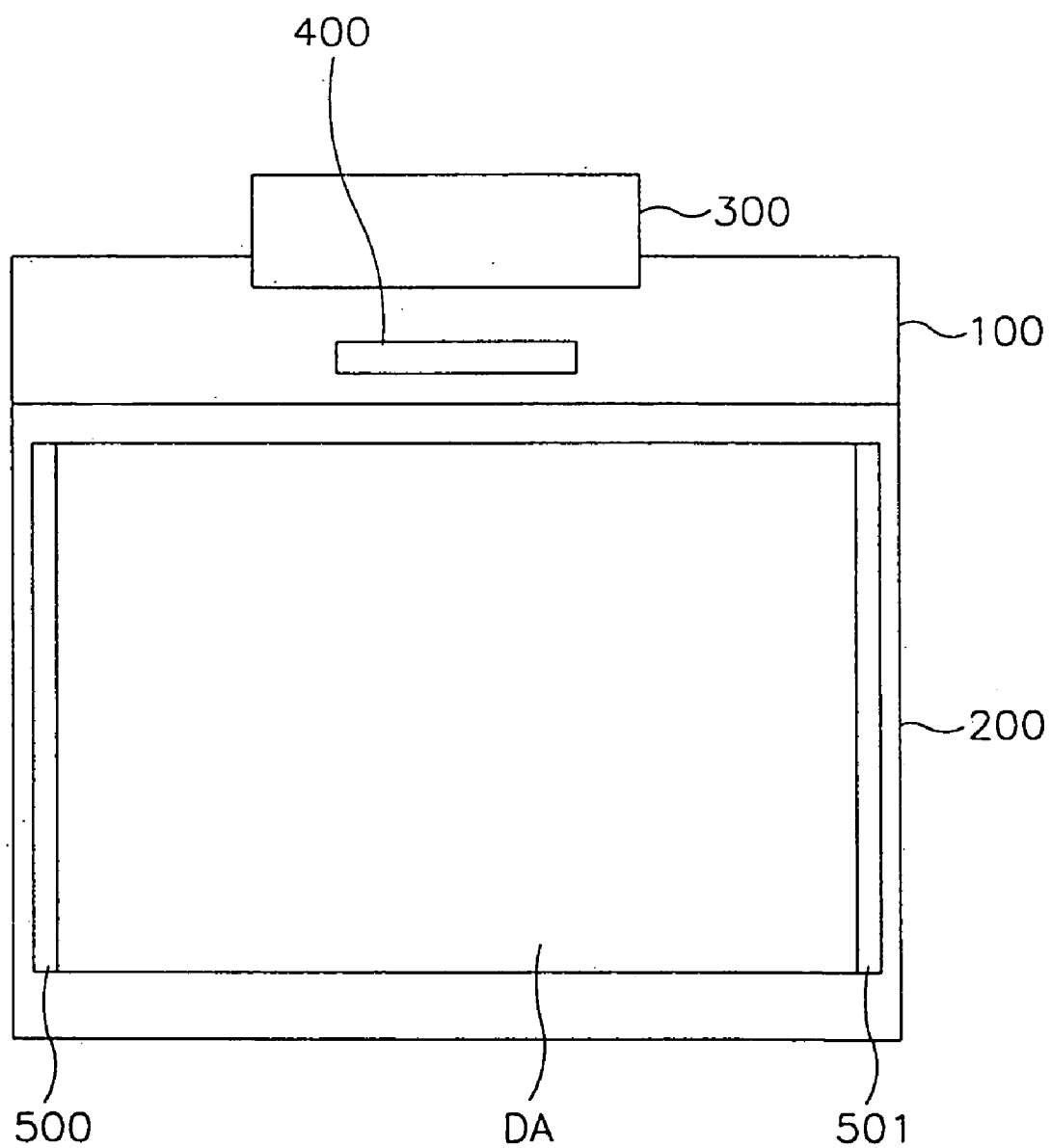
FIG. 4 is a simplified plan view of a panel having a single drive circuit part in a double gate (DG) structure.
Figure 5:
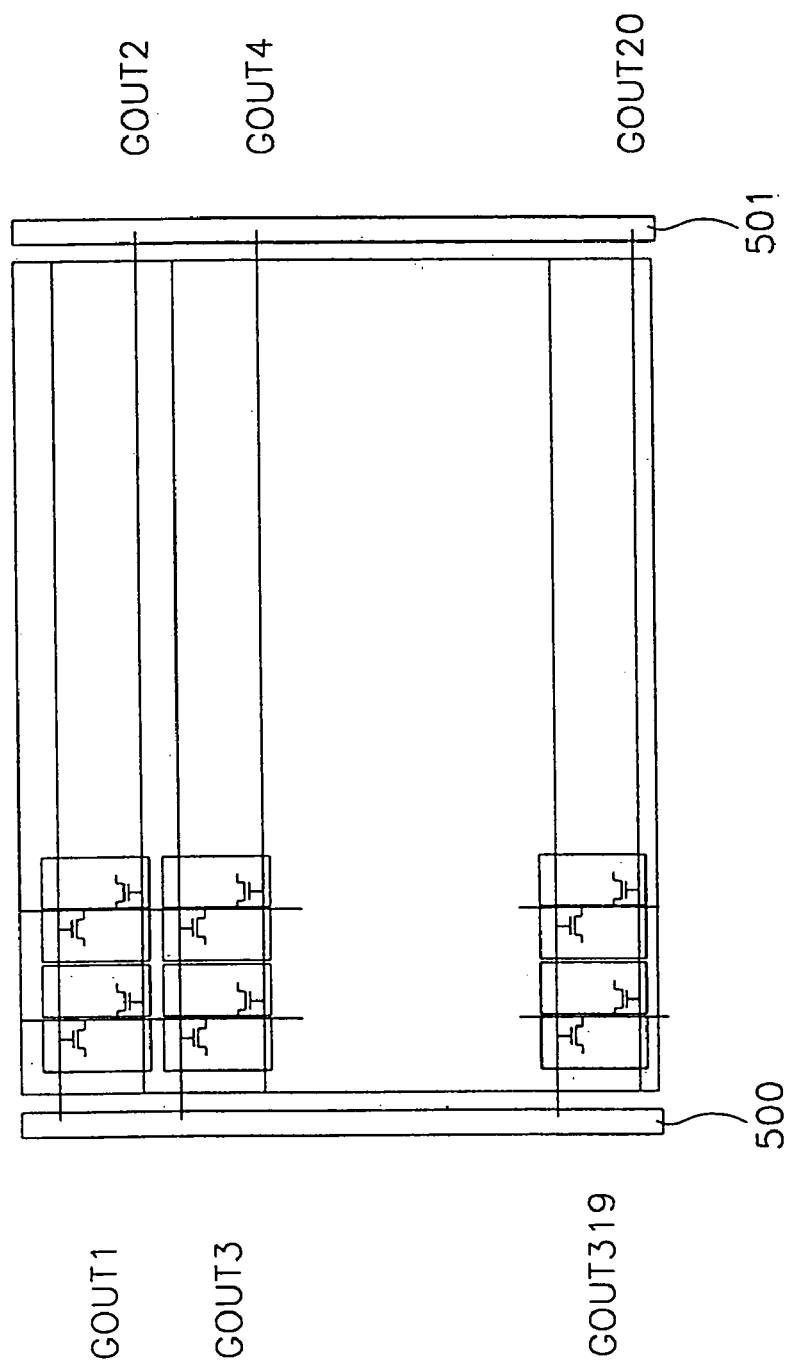
FIG. 5 is a simplified circuit diagram of FIG. 4.

FIG. 4 is a simplified plan view of a panel having the single drive circuit part in a double gate (DG) structure and FIG. 5 is a simplified circuit diagram of FIG. 4.

Referring to FIGS. 4 and 5, in the double gate structure, the gate drive circuit parts 500 and 501 are arranged along both edges of the LCD panel. For instance, a first gate drive circuit part 500 placed at the left side applies gate signals to thin film transistors connected to odd pixel electrodes and a second gate drive circuit part 501 placed at the right side applies gate signals to thin film transistors connected to even pixel electrodes.

Figure 6:
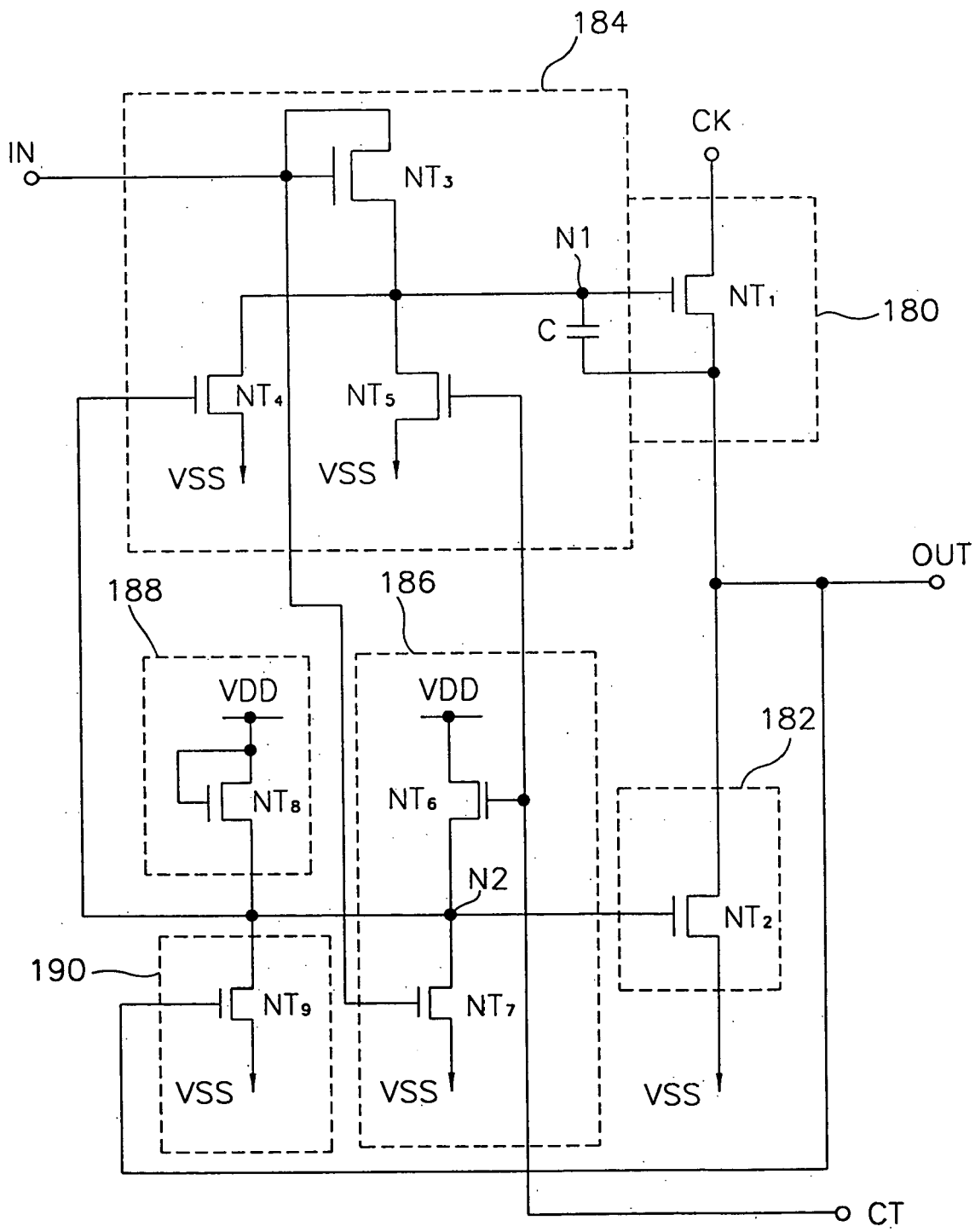
FIG. 6 is a circuit diagram of a shift register in a gate driving region of an amorphous silicon thin film transistor substrate for an LCD in accordance with a preferred embodiment of the present invention.

Each LCD panel shown in FIG. 1 through FIG. 5 has the gate driving circuit part including a plurality of shift registers. FIG. 6 shows a circuit diagram of these shift registers which will be described later.

In embodiments of the present invention, the gate drive circuit part has the following characteristics.

Figure 48:
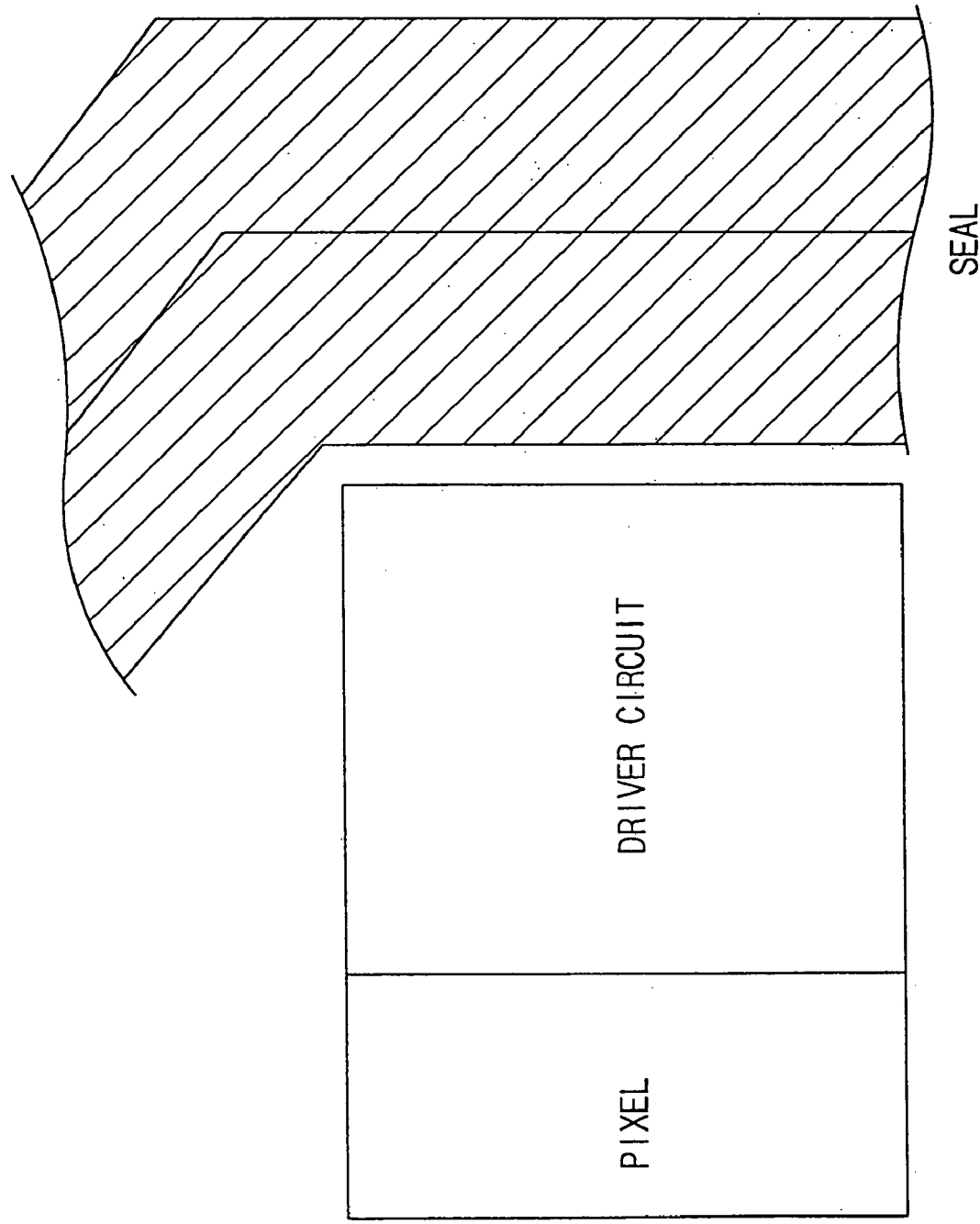
FIG. 48 is a plan view of a sealing portion in the gate driving region in accordance with preferred embodiments of the present invention.

First, as shown in FIG. 48, a seal line which is used for attaching the TFT substrate and the color filter substrate is designed separately from the gate drive circuit part, which prevents a short failure in the interconnection lines that may occur when the seal line is disposed on the insulating interlayer of the gate drive circuit part.

Figure 49:
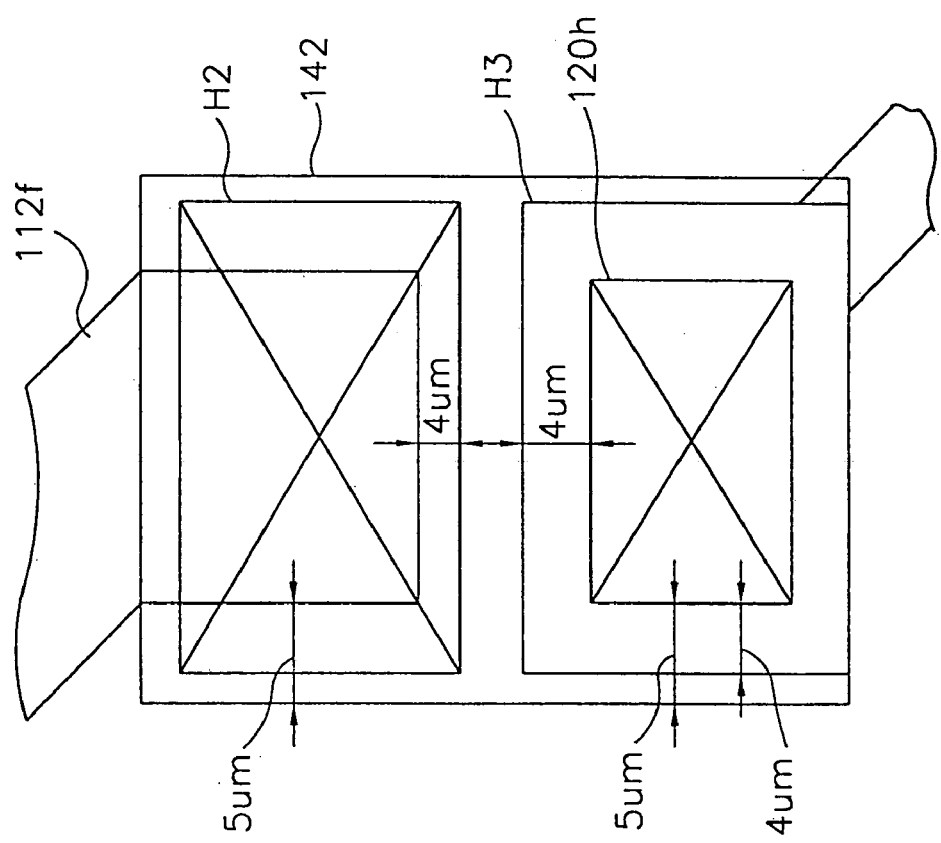
FIG. 49 is a detailed plan view of the contact part in the gate driving region in accordance with preferred embodiments of the present invention.
Figure 50:
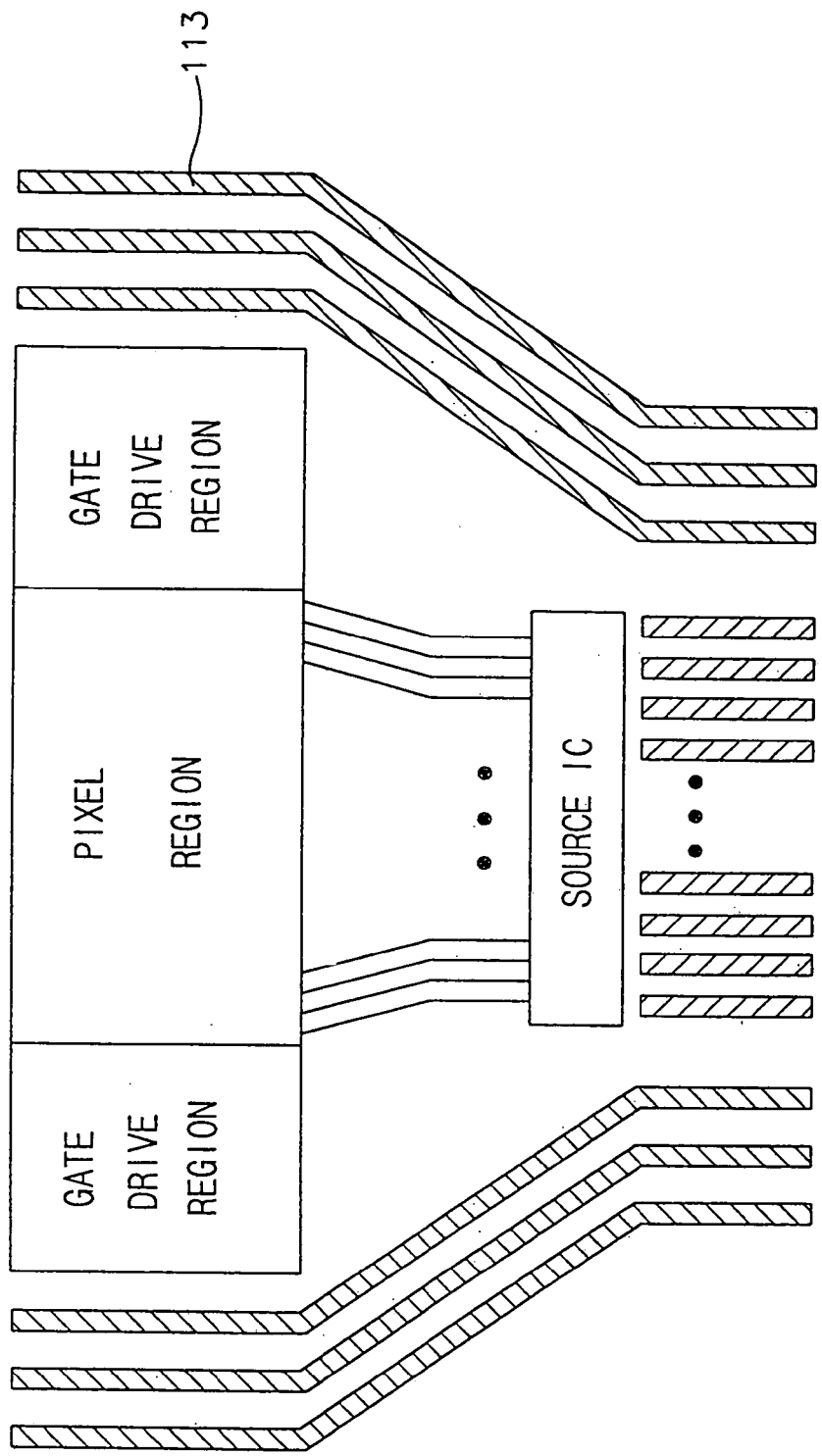
FIG. 50 is a plan view showing a signal line connection structure in the gate driving region in accordance with preferred embodiments of the present invention.

Also, as shown in FIG. 49, the number of electrical contacts is minimized and drive circuits are designed to have a minimum area. In other words, first and second transistors that are relatively wide in width are connected directly to the output terminal (OUT), and the remainder transistors of third to ninth transistors NT3 to NT9 are arranged at a middle portion. As shown in FIG. 50, signal lines 113 are arranged at the outside of the pixel region and the gate drive regions.

Further, a range in which pixel electrodes are used is limited within the contact portion such that the circuit characteristic does not depend on the kinds of electrodes used.

Furthermore, as the sensitivity against the resistance becomes greater, interconnection line width is increased. (Voff>VCK1=VCK2>Vst)

A structure of LCD panel for liquid crystal display according to embodiments of the present invention will be described in detail.

EMBODIMENT 1

Figure 7:
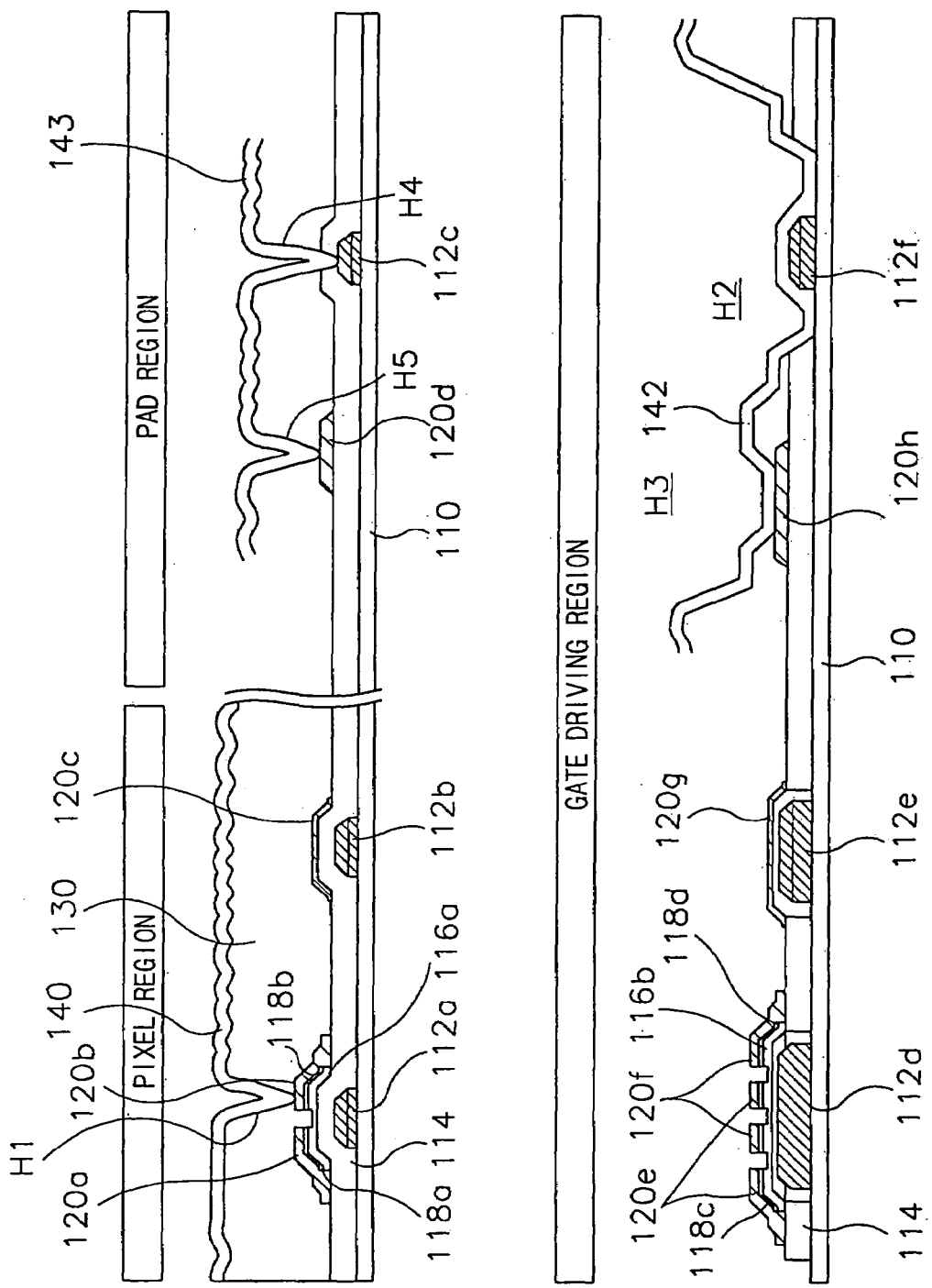
FIG. 7 is a sectional view of the amorphous silicon thin film transistor (a-Si TFT) substrate in accordance with a preferred embodiment of the present invention.

FIG. 7 is a sectional view of an amorphous silicon thin film transistor substrate having a pixel region and a peripheral region in accordance with a first embodiment of the present invention. The peripheral region includes a pad region and a gate driving region.

Referring to FIG. 7, gate patterns 112*a*, 112*b*, 112*c*, 112*d*, 112*e*, and 112*f* on a transparent insulating substrate 110 are arranged in the pixel region and the peripheral region. The gate patterns 112*a*–112*f* include gate lines and gate electrodes branched from the gate lines. The gate patterns 112*b* and 112*e* respectively arranged at the pixel region and the peripheral region function as lower electrodes of storage capacitors.

Each of the gate patterns 112*a*–112*f* is a single layered structure having a thickness of about 2500 Å or a double-layered structure in which a lower layer is formed of Cr in a thickness of approximately 500 Å and an upper layer is formed of an alloy of AlNd in a thickness of approximately 2,000 Å.

The pad region is placed between the pixel region and the gate driving region. The gate pattern 112*c* is used for a gate pad in the pad region, which is made from the same layer of the gate patterns arranged at the pixel region. An extending line of the gate line in the pixel region is electrically connected to the gate pad 112*c*.

A gate insulating film 114 is disposed on the entire surface of the substrate 100 having the gate patterns 112*a*–112*f*. The gate insulating film 114 is preferably made of silicon nitride (SiNx), silicon oxide, or the like having a thickness of approximately 4,500 Å.

An active layer pattern including first impurity regions 118*a* and 118*c*, second impurity regions 118*b* and 118*d*, and channel regions 116*a* and 116*b* is disposed on the gate insulating film 114 at the pixel region and the gate driving region. The channel regions 116*a* and 116*b* are respectively disposed between the first impurity regions 118*a* and 118*c* and the second impurity regions 118*b* and 118*d*. The channel regions 116*a* and 116*b* are made of intrinsic amorphous silicon in a thickness of approximately 2,000 Å. The first and second impurity regions 118*a*–118*d* are made of extrinsic amorphous silicon in which n-type impurities are highly doped in a thickness of approximately 500 Å.

A data pattern is arranged on the active pattern 118*a*–118*d*, 116*a*, and 116*b*. The data pattern includes source electrodes 120*a* and 120*e* respectively in contact with the first impurity regions 118*a* and 118*c*, drain electrodes 120*b* and 120*f* respectively in contact with the second impurity regions 118*b* and 118*d*, and data lines (not shown) substantially perpendicular to the gate lines and connected to the source electrodes 120*a* and 120*e*.

As shown in FIG. 7, the source electrode 120*e* and the drain electrode 120*f* of a TFT in the gate driving region are preferably made in an interdigital structure having multi-channels. In other words, even source electrodes 120*e* are alternatively disposed between odd drain electrodes 120*f*.

An upper storage electrode 120*g* is disposed on the gate insulating film 114. The upper storage electrode 120*g* is overlapped with the gate pattern 112*e* (used as a lower storage electrode) with the gate insulating film 114 interposed therebetween.

A data pad 120*d* is disposed in the pad region, which is made of the same layer as the data patterns 120*a*–120*g*.

On the resultant substrate including the data patterns 120*a*–120*g*, a passivation film 130 in which a first contact hole H1 for partially exposing the drain electrode 120*b* in the pixel region, a second contact hole H2 for partially exposing the contact gate pattern 112*f*, and a third contact hole H3 for exposing the contact data pattern 120*h* of the gate driving region are formed. Hereinafter, the gate pattern 112*f* is called "contact gate pattern" and the data pattern 120*h* is called "contact data pattern". Fourth and fifth contact holes H4 and H5 are also formed in the pad region for partially exposing the gate pad 112*c* and the data pad 120*d*, respectively. According to an embodiment of the present invention, the passivation film 130 is formed of silicon nitride or the like and has a thickness of approximately 1.85 μm.

On the passivation film 130 including the first to fifth contact holes H1–H5, there is disposed an electrode pattern part in which a pixel electrode (or a first electrode pattern) 140 which is connected to the drain electrode 120*b* of the pixel region through the first contact hole H1, a second electrode pattern 142 which electrically connects the exposed contact gate pattern 112*f* in the gate driving region with the exposed contact data pattern 120*h* in the gate driving region through the second and third contact holes H2 and H3, and a third electrode pattern 143 which electrically connects the gate pad 112*c* in the pad region with the data pad 120*d* in the pad region through the fourth and fifth contact holes H4 and H5. Here, the second electrode pattern 142 in the gate driving region and the third electrode pattern 143 in the pad region can be regarded as contact terminals of the same functional group when it is considered that they electrically connect a part of the gate patterns with a part of the data patterns.

Detailed constitutions for these contact terminals portions are shown in FIG. 49. Referring to FIG. 49, one end of the contact gate pattern 112*f* is exposed through the second contact hole H2 and one end of the contact data pattern 120*h* is exposed through the third contact hole H3. The contact gate pattern 112f and the contact data pattern 120h are electrically connected to each other by the second electrode pattern 142. According to a preferred embodiment of the present invention, one end line of each of the second and third contact holes H2, H3 is formed longer by about 4 µm than one end line of each of the contact gate pattern 112f and the contact data pattern 120h, and the width of the second electrode pattern 142 is larger than the width of each of the contact gate pattern 112f and the contact data pattern 120h by about 5 µm from one side line of each of the contact gate pattern 112f and the contact data pattern 120h, or by about 10 µm on the whole.

In case that the TFT substrate of the present invention is applied to a transmission type LCD, the first electrode pattern 140, the second electrode pattern 142, and the third electrode pattern 143 are made of transparent material such as indium tin oxide (ITO), indium zinc oxide (IZO), or the like. And in case that the TFT substrate is applied to a reflection type LCD, they may be made of opaque material such as chromium (Cr), AlNd, or the like. Especially, when the reflection electrode of the reflection type LCD has an uneven surface, a photosensitive organic insulating film having an uneven surface is used as the passivation film. The use of the photosensitive organic insulating film allows deletion of at least one patterning process for forming a contact hole and an uneven surface.

EMBODIMENT 2

Figure 8:
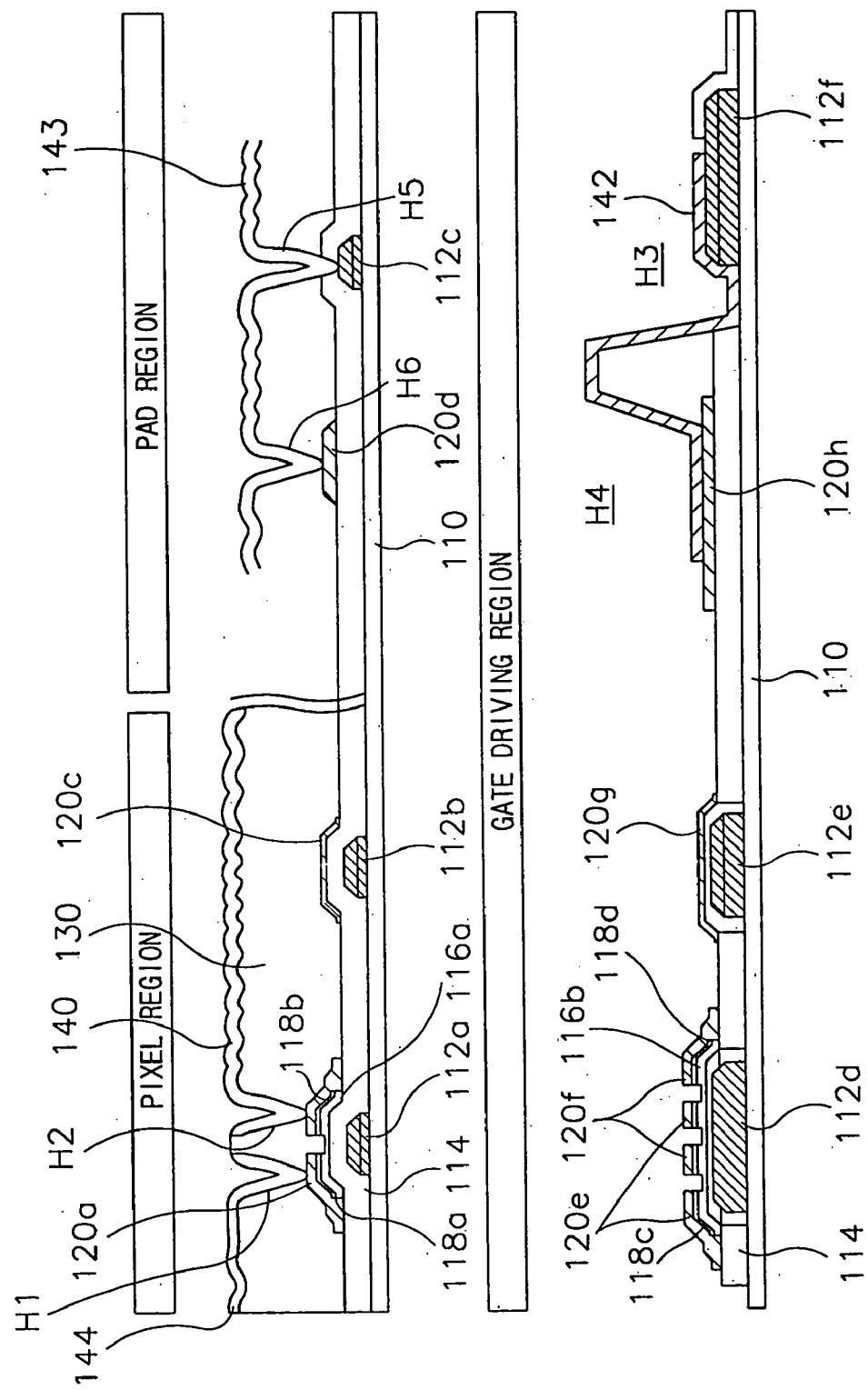
FIG. 8 is a sectional view of the a-Si TFT substrate in accordance with another preferred embodiment of the present invention.

FIG. 8 is a sectional view of the amorphous silicon thin film transistor substrate in accordance with second embodiment of the present invention.

Comparing FIG. 8 with FIG. 7, constitution of the data line is different from each other. As shown in FIG. 8, a data line 144 is disposed on a passivation film 130 together with a pixel electrode 140 and is spaced apart by a predetermined interval from the pixel electrode 140. Particularly, the data line 144 is only disposed on the source electrode 120a, not on the whole pixel region on the resultant substrate.

On the resultant substrate including the data pattern, the passivation film 130 is formed, in which a first contact hole H1 for partially exposing the source electrode 120a in the pixel region, a second contact hole H2 for partially exposing the drain electrode 120b in the pixel region, a third contact hole H3 for exposing the contact gate pattern 112f of the gate driving region, and a fourth contact hole H4 for exposing a contact data pattern 120h of the gate driving region. And fifth and sixth contact holes H5 and H6 are disposed in the pad region for partially exposing a gate pad 112c and a data pad 120d, respectively.

According to the embodiment of the present invention, the passivation film 130 is formed of silicon nitride or the like and has a thickness of approximately 1.85 µm.

On the passivation film 130 including the first contact hole H1 to the sixth contact hole H6, there is disposed an electrode pattern part. The electrode pattern part includes the data line (or a first electrode pattern) 144 connected to the source electrode 120a of the pixel region through the first contact hole H1, a pixel electrode (or a second electrode pattern) 140 spaced apart by a selected interval from the data line 144 and electrically coupled to the drain electrode 120b of the pixel region through the second contact hole H2, a third electrode pattern 142 which electrically connects the exposed contact gate pattern 112f in the gate driving region with the exposed contact data pattern 120h in the gate driving region through the third and fourth contact holes H3 and H4, and a fourth electrode pattern 143 which electrically connects the gate pad 112c in the pad region with the data pad 120d in the pad region through the fifth and sixth contact holes H5 and H6.

Here, the third electrode pattern 142 in the gate driving region and the fourth electrode pattern 143 in the pad region can be regarded as contact terminals of the same functional group when it is considered that they electrically connect a part of the gate patterns with portions of the data patterns.

Since the remaining elements except for the foregoing elements are the same as those of the first embodiment, their further description will be omitted.

According to Embodiments 1 and 2, a contact area in the peripheral region is minimized, and gate drivers are integrated within a smaller area. Also, since the use of the pixel electrode in the gate driving region is limited to the contact portions, circuit characteristics are not dependent upon the type of electrode, thereby the circuit can be stably operated.

EMBODIMENT 3

Figure 9:
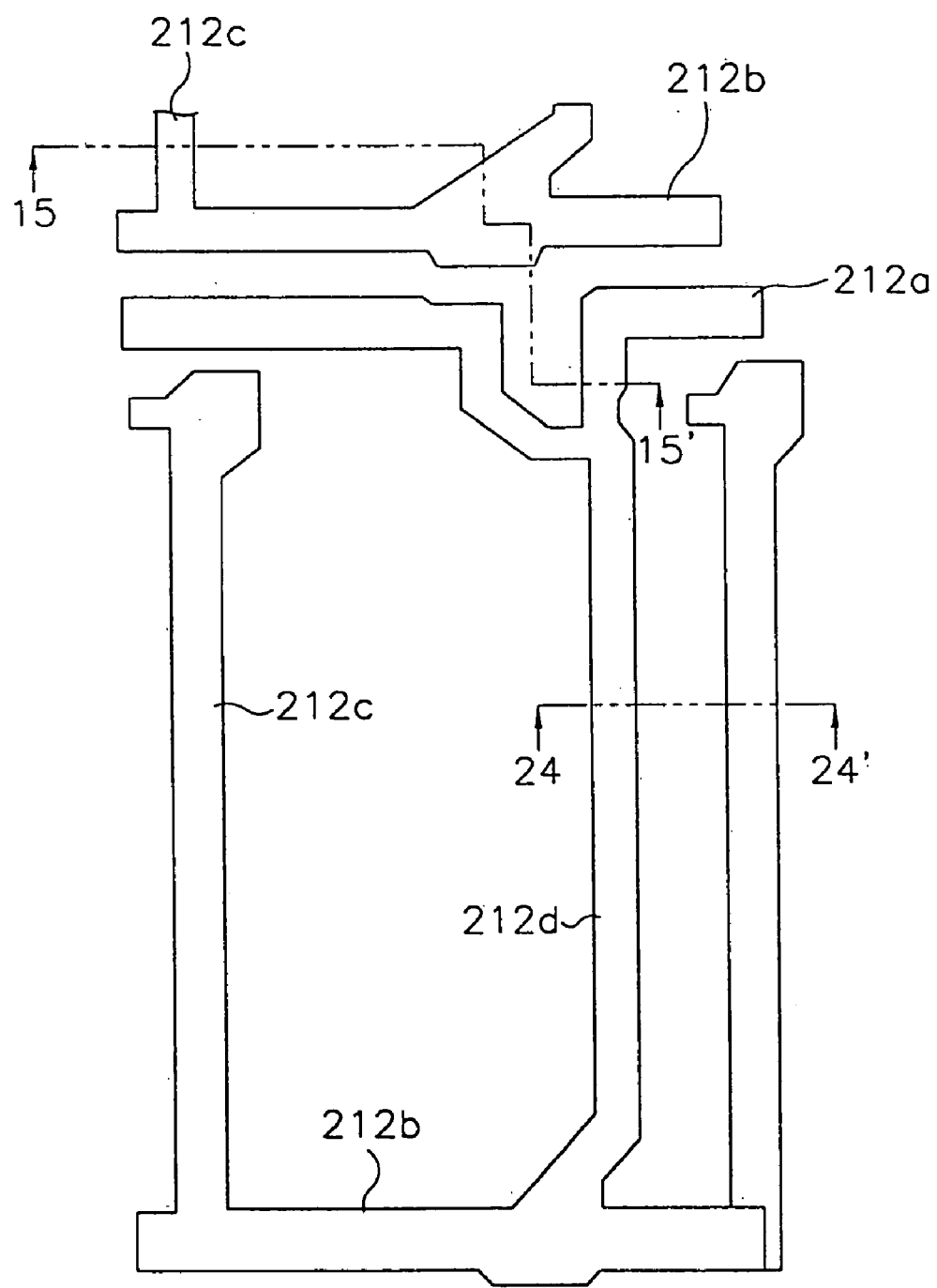
FIGS. 9 to 14 are plan views each showing a unit pixel region and portions adjacent thereto in the a-Si TFT substrate of FIG. 7.
Figure 13:
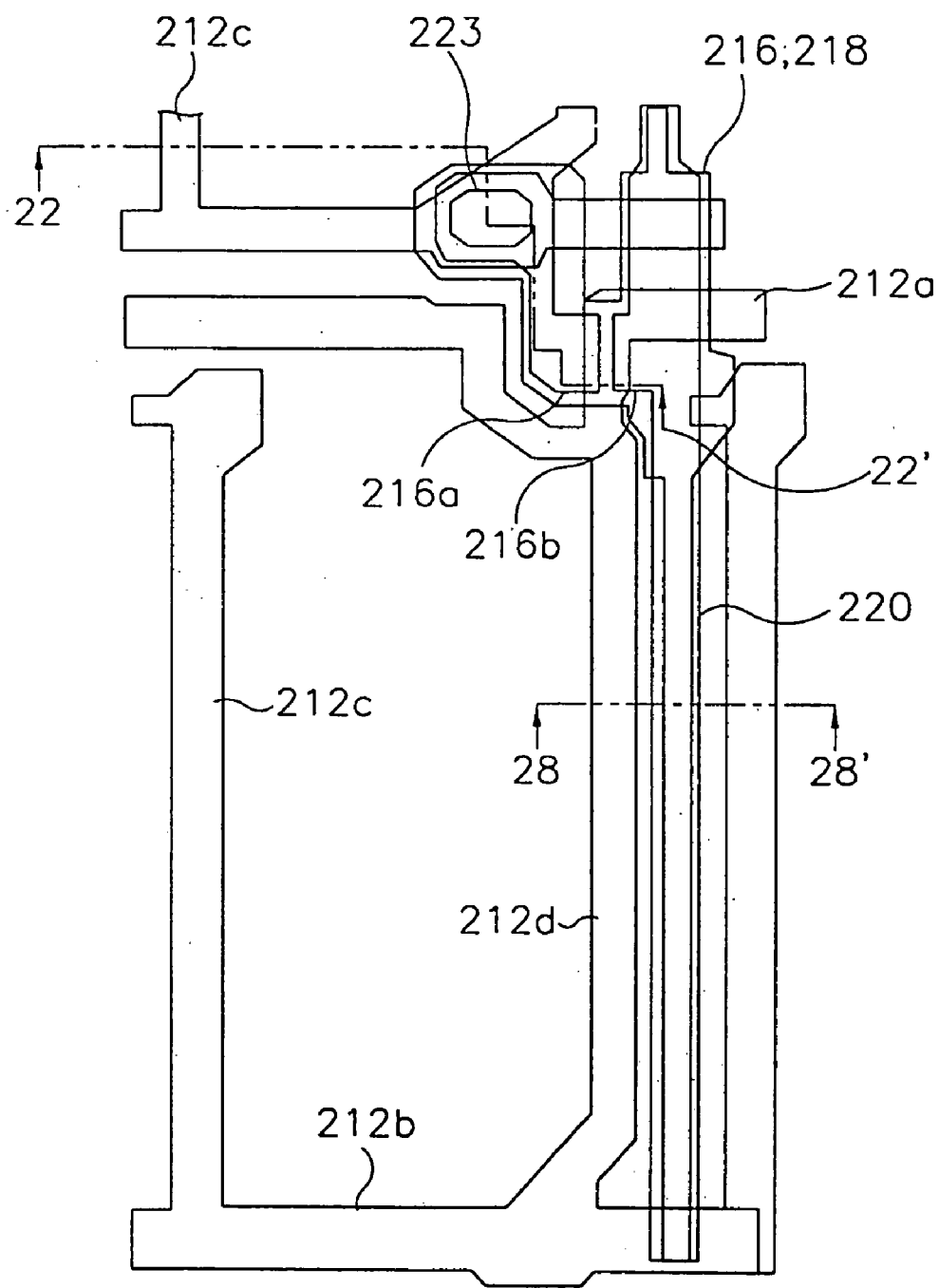
Figure 14:
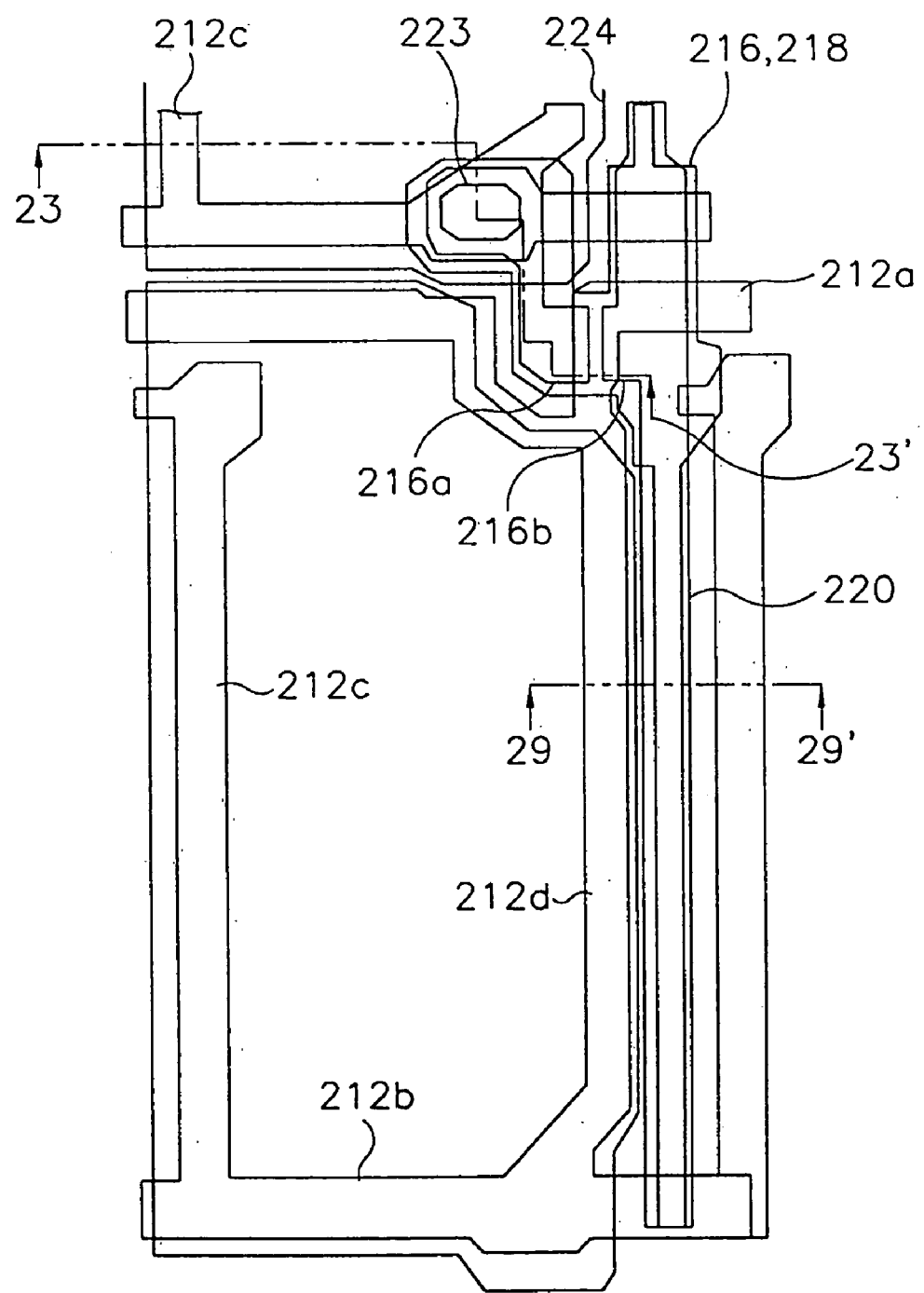
Figure 15:
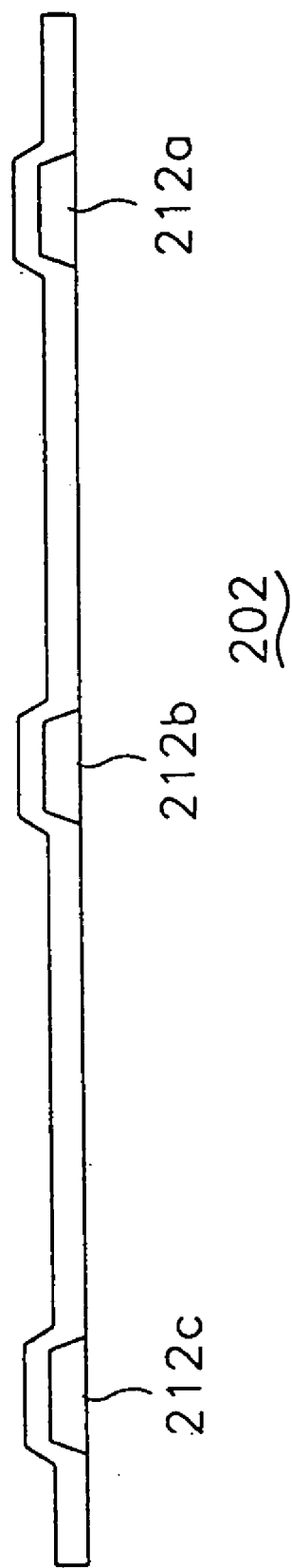
FIGS. 15 to 23 are sectional views taken along a first line in FIGS. 9 to 14.
Figure 22:
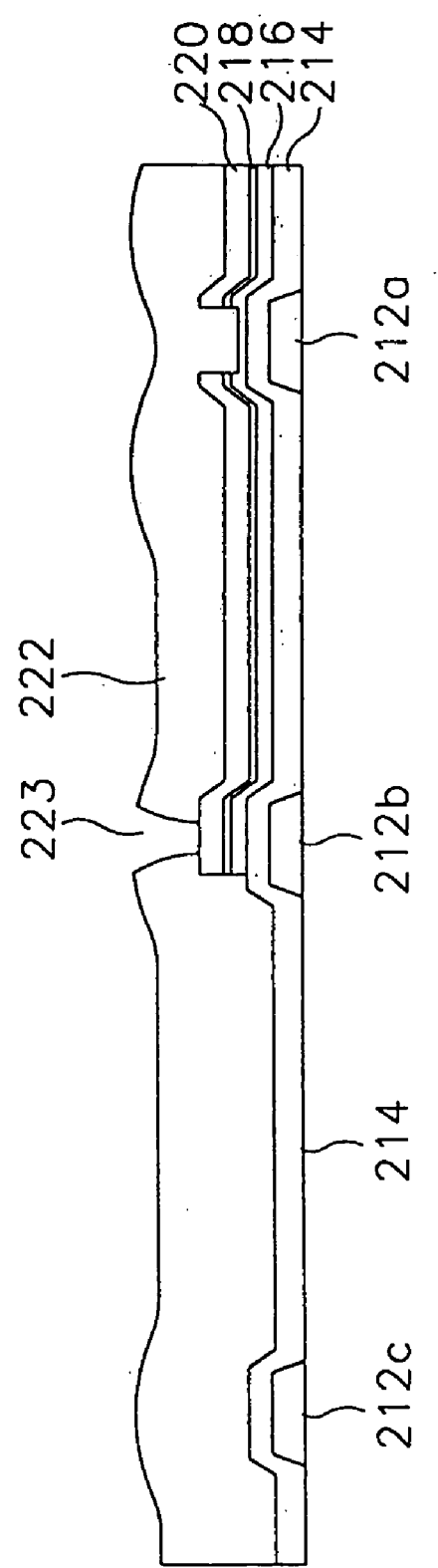
Figure 23:
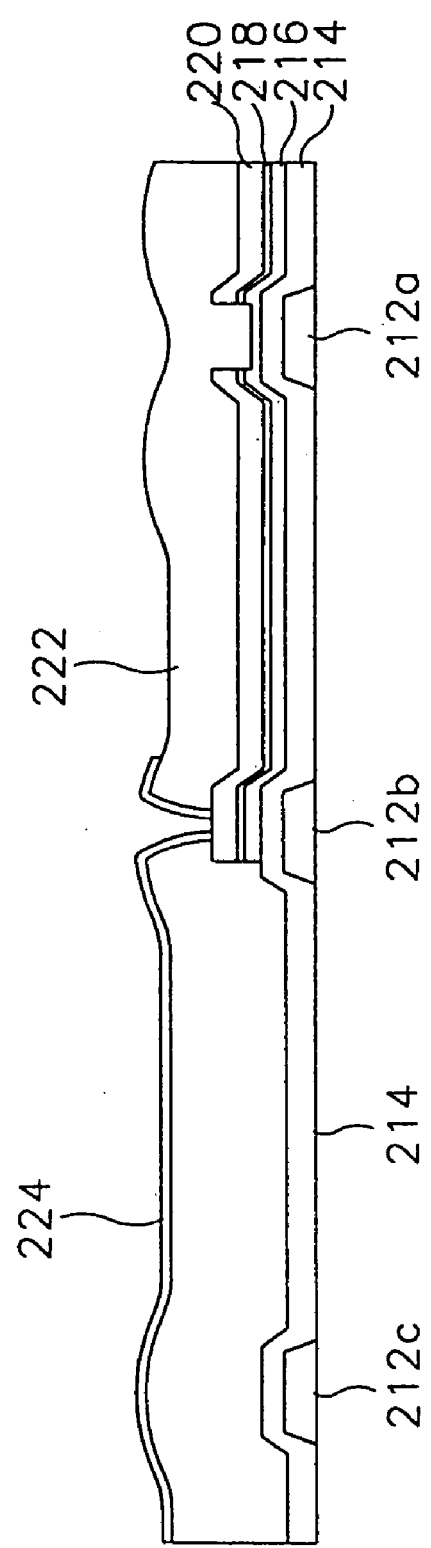
Figure 24:
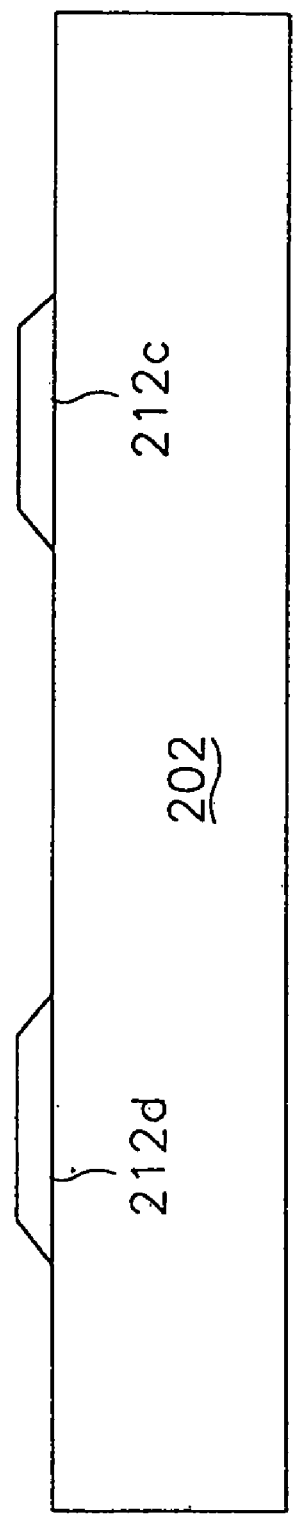
FIGS. 24 to 29 are sectional views taken along a second line in FIGS. 9 to 14.

FIGS. 9 to 14 are plan views each showing a unit pixel region and portions adjacent thereto in the amorphous silicon (a-Si) TFT substrate of FIG. 7, FIGS. 15 to 23 are sectional views respectively taken along a first line in FIGS. 9 to 14, and FIGS. 24 to 29 are sectional views respectively taken along a second line in FIGS. 9 to 14. For example, FIG. 15 is a sectional view taken along the line 15–15' in FIG. 9 and FIG. 24 is a sectional view taken along the line 24–24' in FIG. 9.

Referring to FIGS. 9, 15, and 24, a light shielding film (not shown) such as silicon oxide is formed on a transparent substrate 202. The substrate 202 is made of an insulating material such as glass, quartz, or sapphire.

A gate pattern is formed on the light shielding film (not shown), which includes a gate line 212a, a gate electrode 212d branched from the gate line 212a, and a lower storage electrode pattern 212b and 212c extending from the gate electrode 212d and having an open loop structure in which the lower storage electrode pattern 212b and 212c envelops edge portions of a unit pixel region.

Although not shown in the drawings, a gate pad and a contact gate pattern are formed for receiving scan signals from an external integrated circuit (IC) in the peripheral region. The gate pad and contact gate pattern are manufactured from the same layer as the gate pattern of the pixel region.

The gate pattern has a single layer structure such as aluminum (Al), an Al alloy of AlNd, or a multi-layered structure in which Al or AlNd alloy is stacked on Cr film. This gate pattern is formed by depositing a film having the aforementioned single layer structure or multi-layered structure to a thickness of approximately 2,000 to approximately 3,000 Å on the substrate 202 and patterning the deposited film by a conventional photolithography method using a first mask.

Figure 10:
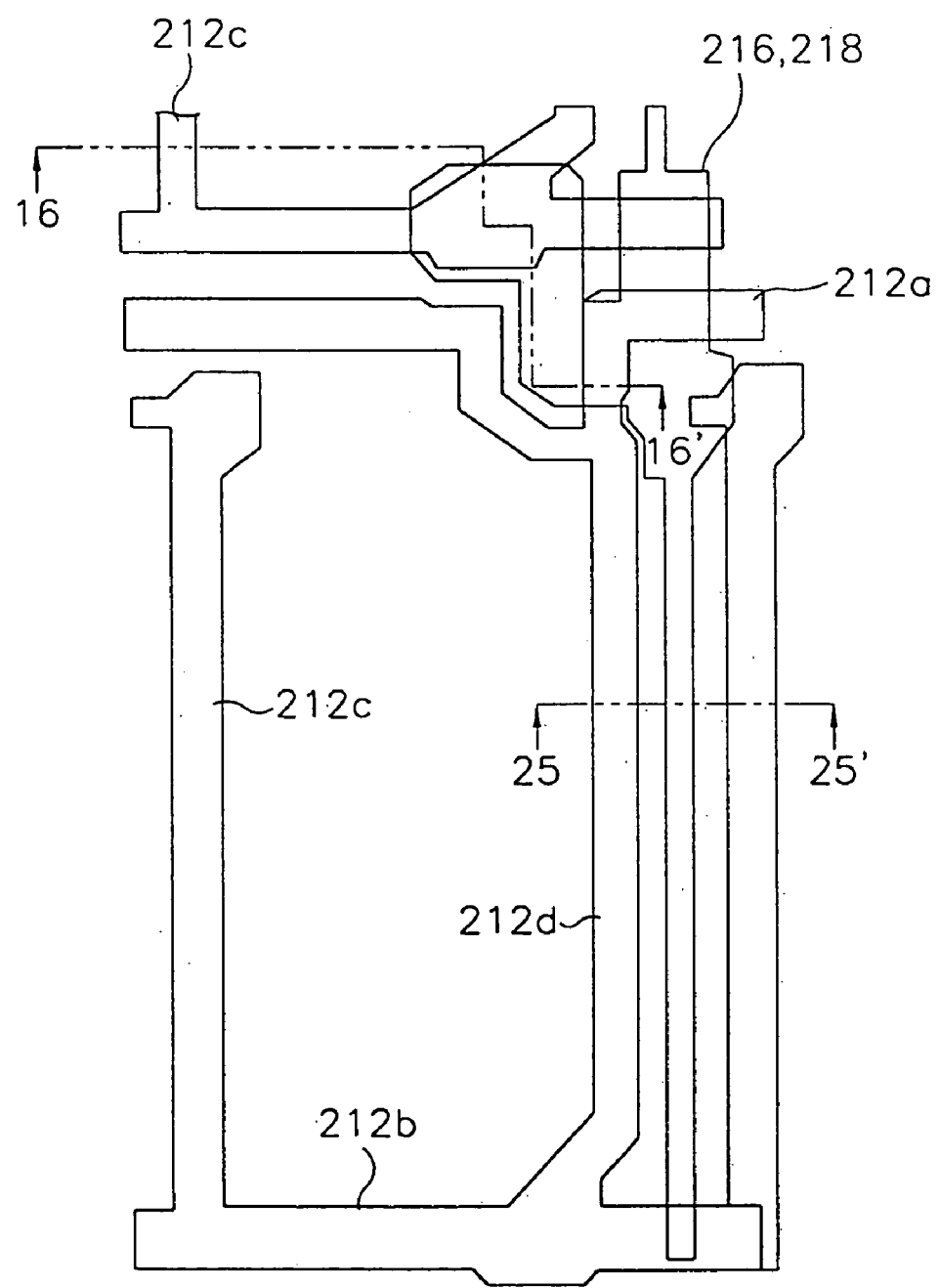
Figure 11:
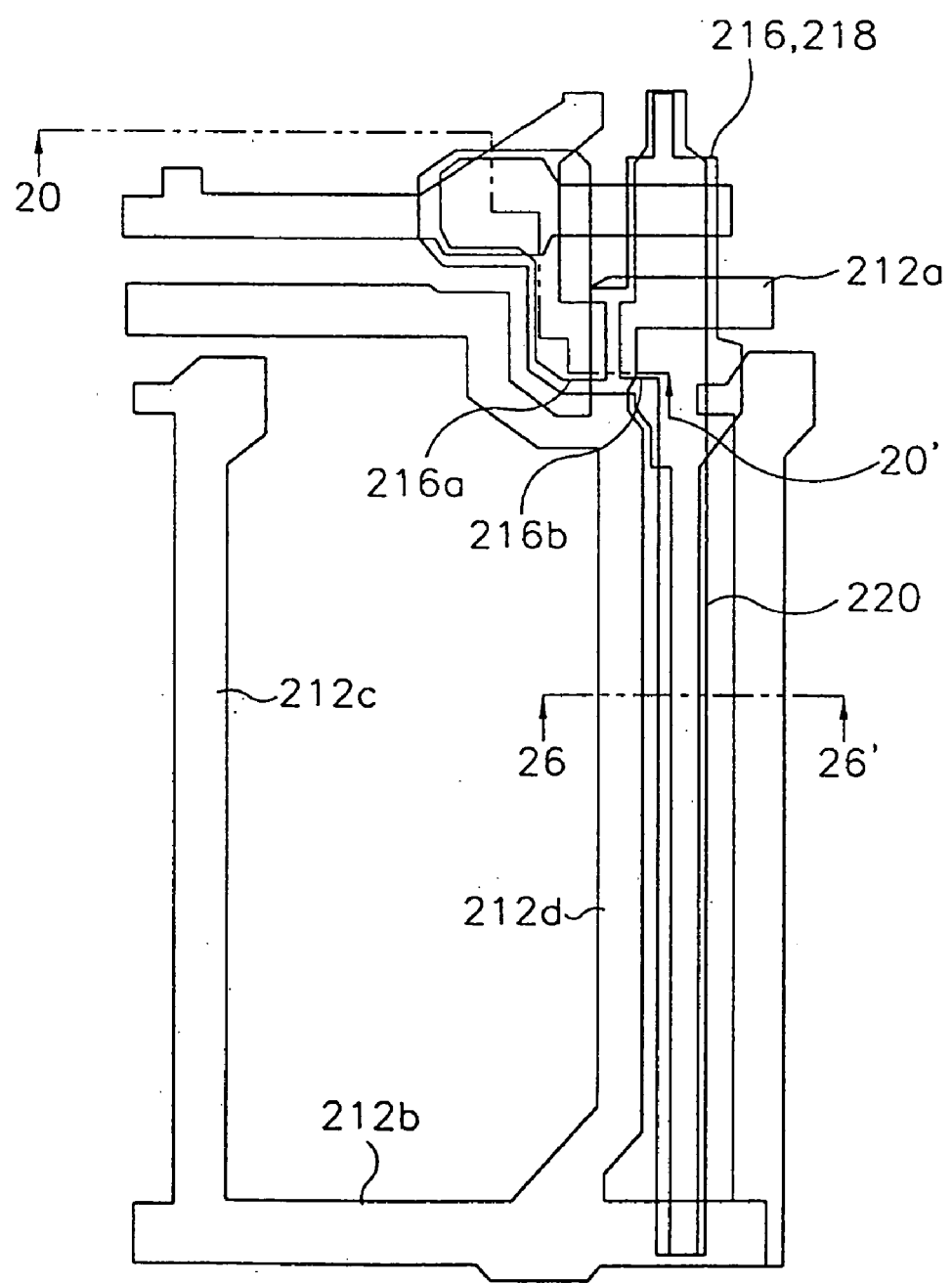
Figure 16:
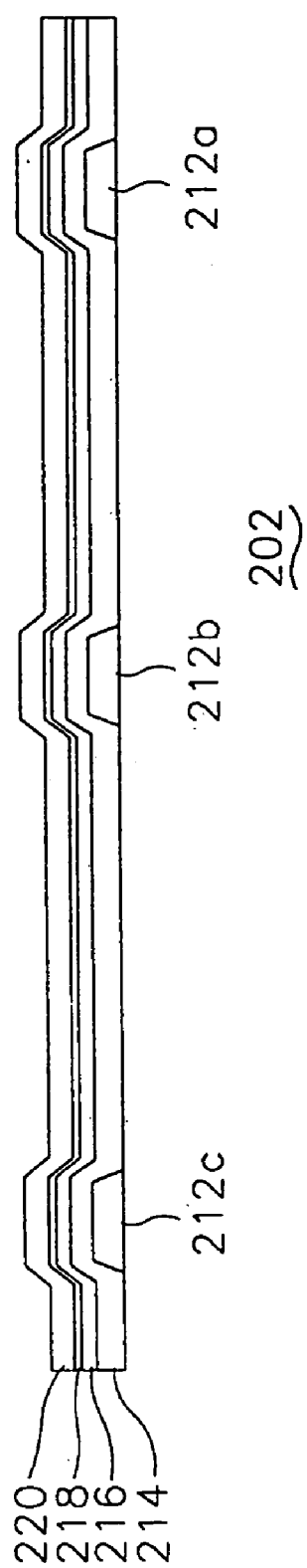
Figure 25:
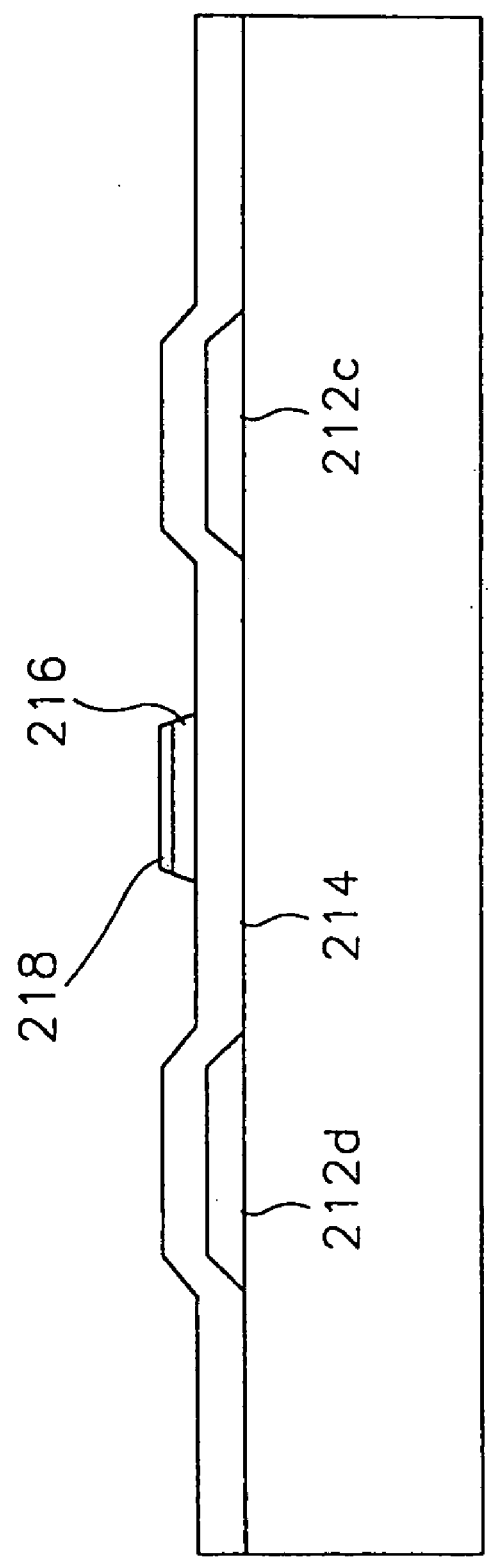

FIG. 16 is a sectional view taken along the line 16–16' of FIG. 10 and FIG. 25 is a sectional view taken along the line 25–25' of FIG. 11.

Referring to FIGS. 10, 16, and 25, after forming the gate pattern 211a–212d, a gate insulating film 214 such as silicon nitride (SiNx), or the like, an intrinsic amorphous silicon (a-Si:H) film 216 in which impurities are not doped, and an extrinsic amorphous silicon (n+a-Si) film 218 in which impurities are highly doped are sequentially deposited on the resultant substrate including the gate pattern 211a–212d. These three layers 214, 216, and 218 are formed by a method such as a plasma enhanced chemical vapor deposition (PECVD) method, which is one kind of the chemical vapor deposition (CVD) method. As an example, the gate insulating film 214 is formed of approximately 4,500 Å thick, the intrinsic amorphous film 216 is formed of approximately 2,000 Å thick, and the extrinsic amorphous silicon film 218 is formed of approximately 500 Å thick.

Figure 17:
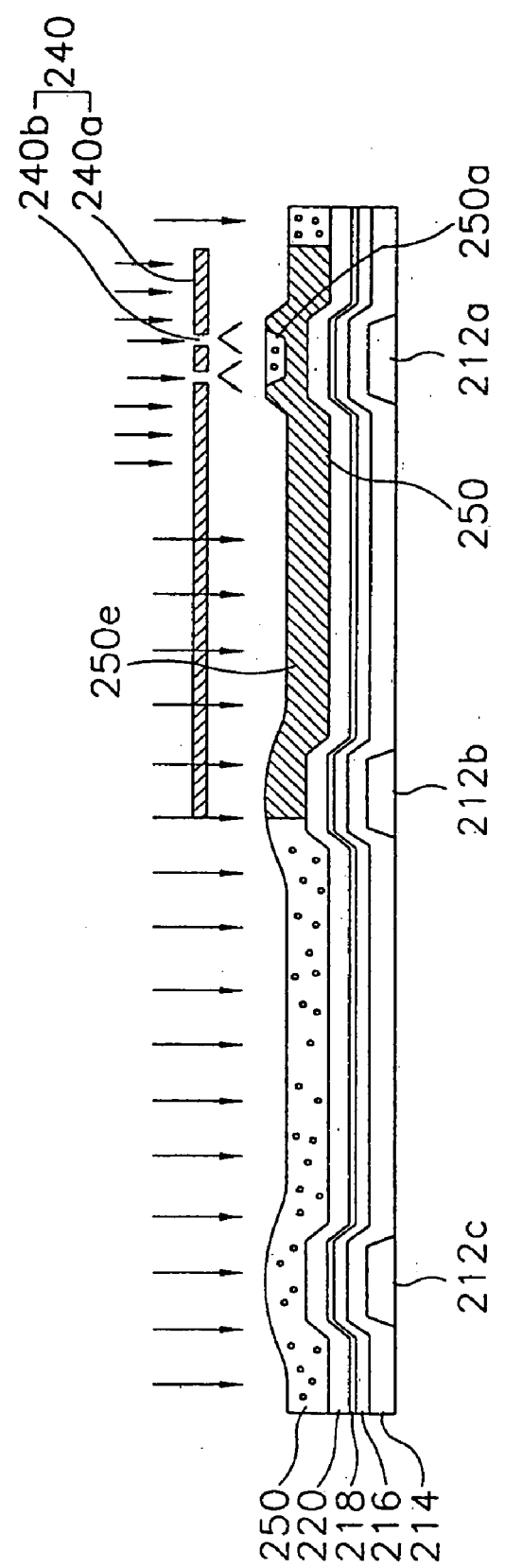
Figure 26:
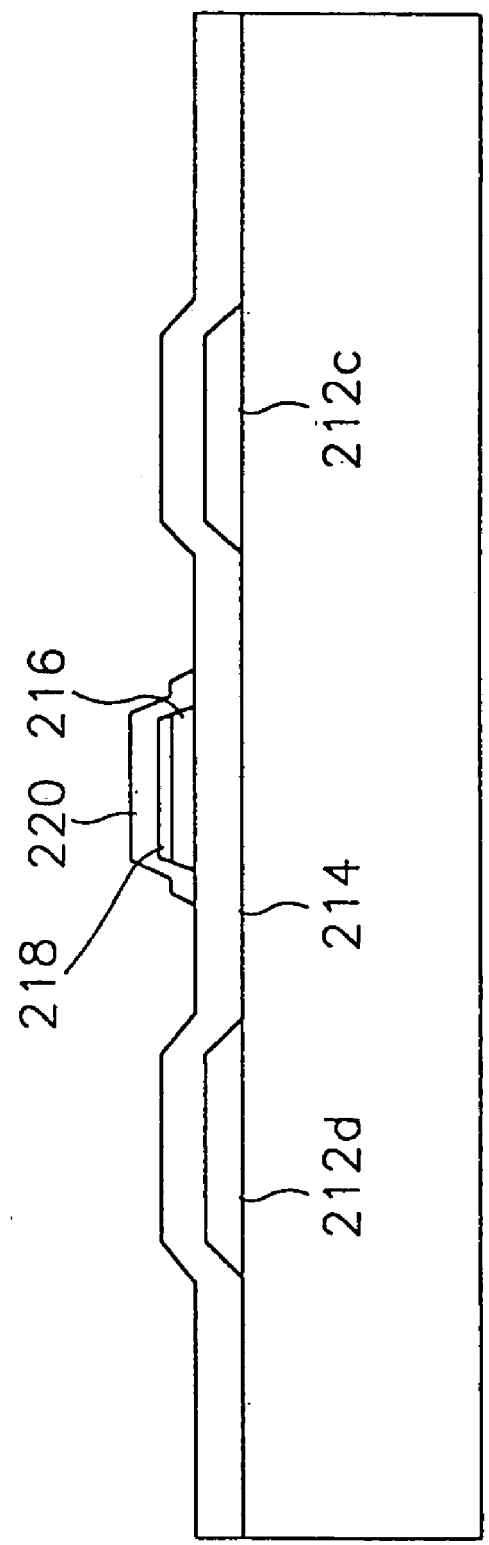

FIG. 17 is a sectional view taken along the line 20–20' of FIG. 11 and FIG. 26 is a sectional view taken along the line 26–26' of FIG. 11.

Referring to FIGS. 11, 17, and 26, after forming a gate insulating film 214, an intrinsic amorphous silicon (a-Si:H) film 216, and an extrinsic amorphous silicon (n+a-Si) film 218, a metal layer 220 for source/drain electrode is formed on the entire surface of the extrinsic amorphous silicon film 218 by a physical vapor deposition method such as a sputtering method. The metal layer 220 is preferably formed from materials such as aluminum (Al) or aluminum alloy, molybdenum (Mo) or molybdenum tungsten (MoW), chromium (Cr), tantalum (Ta), and titanium (Ti).

Figure 18:
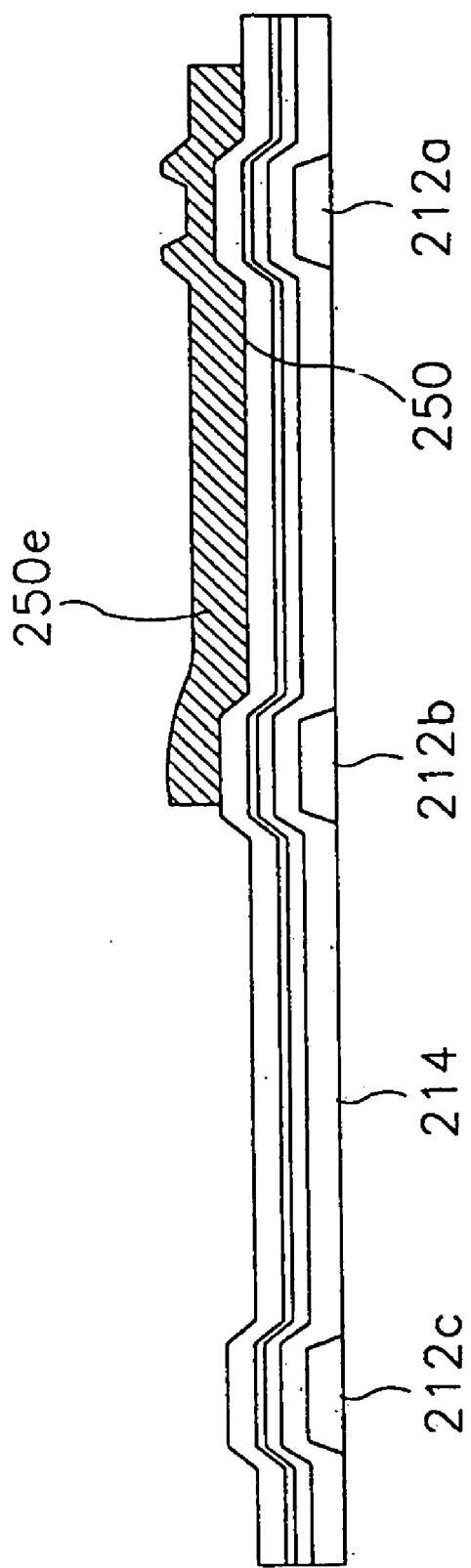

The metal layer 220 for source/drain electrode and the underlying three layers 218, 216, and 214 are patterned using a second mask. Specifically, referring to FIG. 17, a positive type photoresist film 250 is coated on the entire surface of the metal layer 220 to have a predetermined thickness and then a mask 240 is aligned over the coated photoresist film. The mask 240 has a transparent region 240b and an opaque region 240a which is aligned over a source region, a drain region, and a channel region. In particular, a portion of the transparent region 240b between the channel region and a portion of the source region and between the channel region and the drain region has a slit structure, respectively. Since light passing through these slits is diffracted, it is designed that an interval between the slits is slightly smaller than an interval of the channel region. In case that ultra violet rays are used as the light, the ultra violet rays passing through the slits are diffracted to expose the channel region portion of the photoresist film. At the same time, the remaining photoresist film is also exposed to the ultra violet rays. The exposed photoresist film is developed as shown in FIG. 18, a photoresist mask pattern 250e in which the channel region portion is removed to a predetermined depth is formed.

Figure 19:
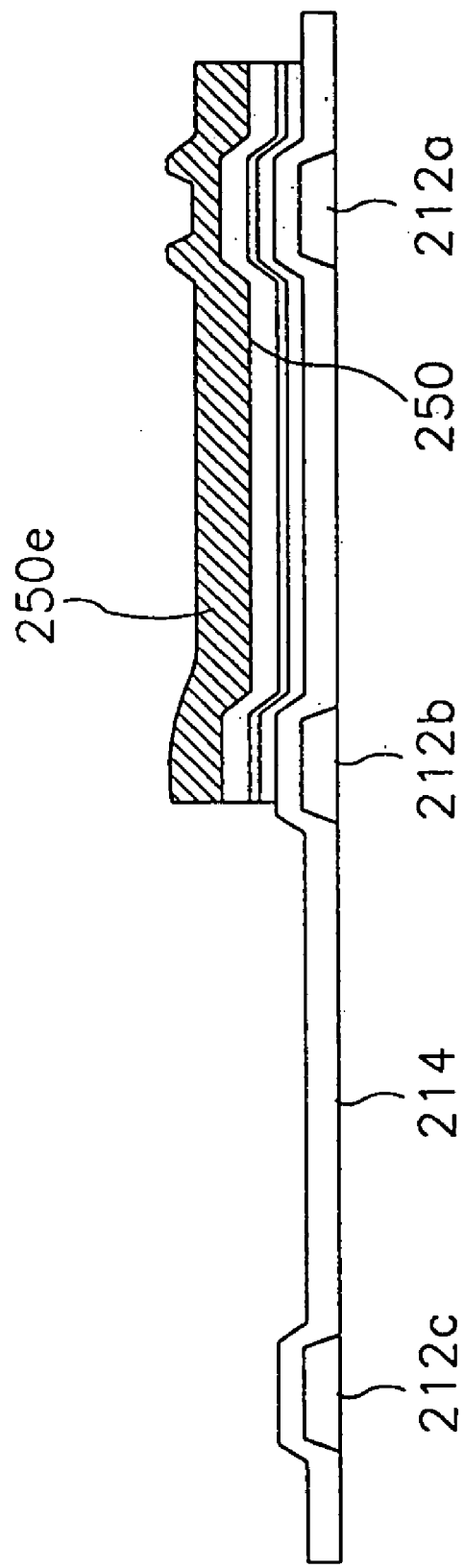

Referring to FIG. 19, a portion that is not covered with the photoresist mask pattern 250e is removed, so a portion of the exposed metal layer 220, a portion of the underlying extrinsic amorphous silicon film 218, and a portion of the underlying intrinsic amorphous silicon film 216 are removed. According to a preferred embodiment of the present invention, at least one of the exposed metal layer 220, the extrinsic amorphous silicon film 218, and the intrinsic amorphous silicon film 216 is removed by a dry etch method to remove a portion of the photoresist mask pattern in the channel region portion together. In other words, since the photoresist mask pattern 250e in the channel region portion becomes very thin while the developing process is performed, it is removed together during the dry etch method.

Figure 20:
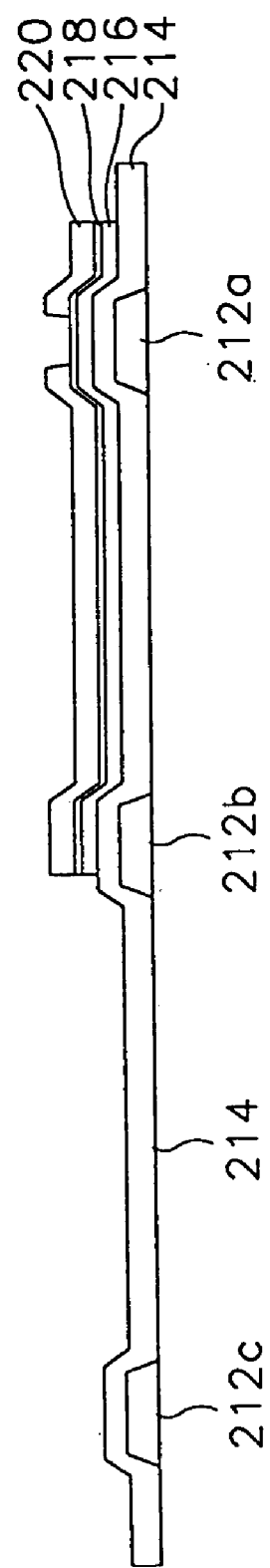
Figure 21:
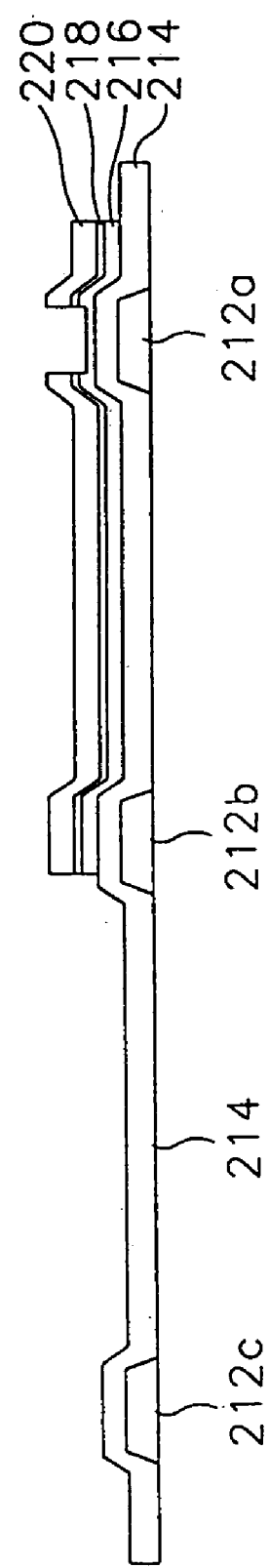

Next, referring to FIGS. 20 and 21, the exposed metal film 220 in the channel region and the underlying extrinsic amorphous silicon film 218 are completely removed by an etch method, and the underlying intrinsic amorphous silicon film 216 is removed by a predetermined thickness.

After patterning, the intrinsic amorphous film 216 and the extrinsic amorphous film 218 become active patterns 216 and 218, and the metal line 220 becomes a data line 220.

Figure 12:
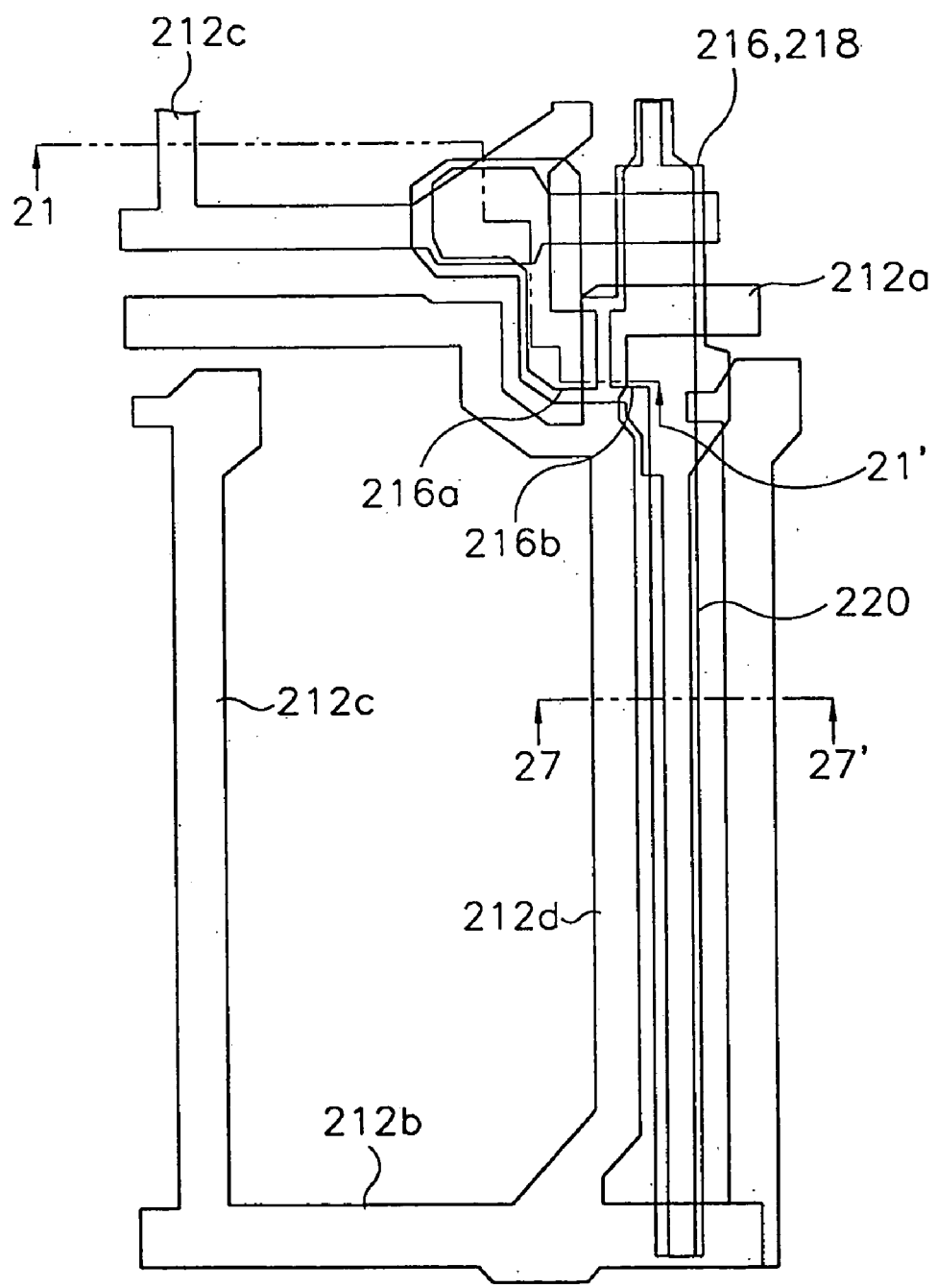
Figure 27:
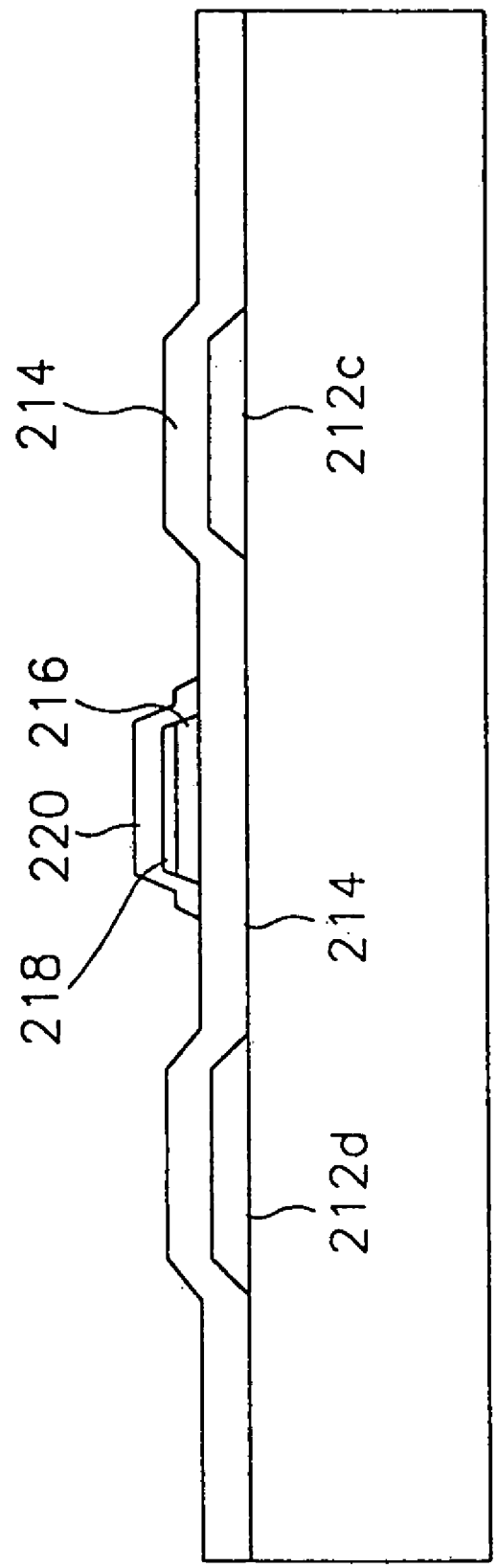

FIG. 12 is a plan view showing a state in which the aforementioned second mask process is completed, FIG. 21 is a sectional view taken along the line 21–21' of FIG. 12 and FIG. 27 is a sectional view taken along the line 27–27' of FIG. 12.

Referring to FIGS. 12, 21, and 27, the active patterns 216 and 218 in the source region extend to be substantially perpendicular to the gate line 212a and they are also overlapped with the data line 220. The active patterns 216 and 218 are interposed between the data line 220 and the insulating film 214. Each of the active patterns 216 and 218 has a width smaller than the data line 220. Thus, the extending active patterns 216 and 218 function to prevent an opening of the data line 220 and to lower the resistance of the data line 220.

Figure 28:
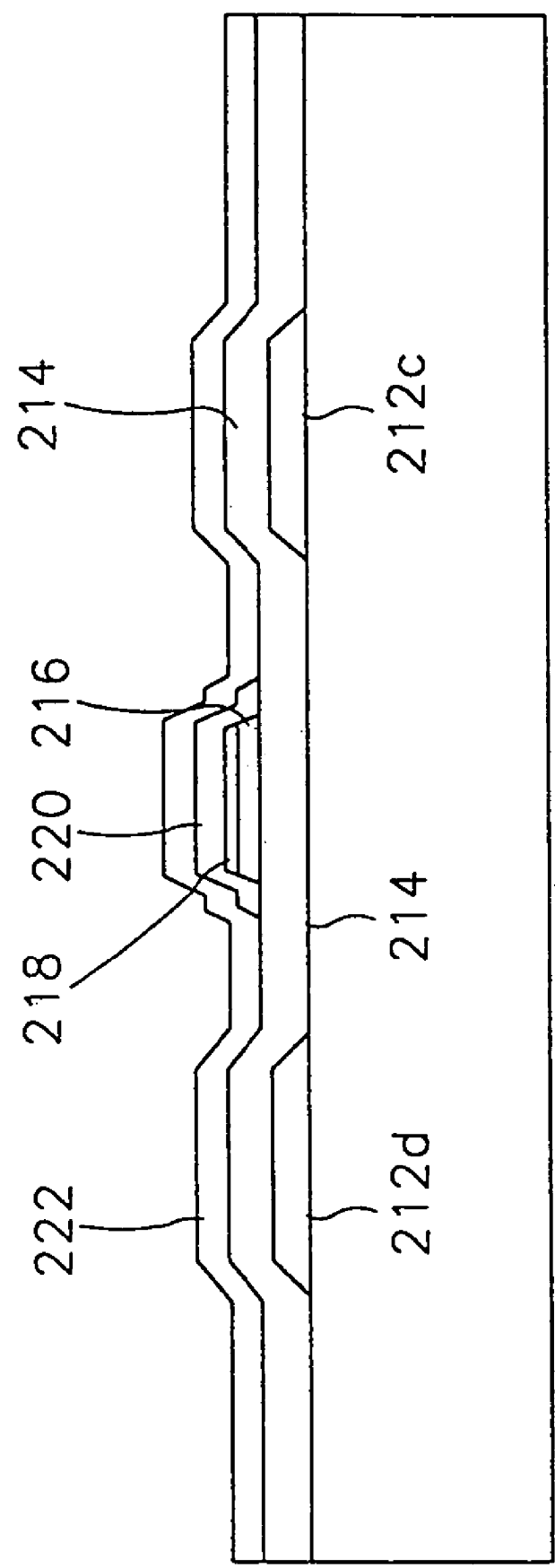

FIG. 13 is a plan view showing a state in which a passivation film 222 is formed on the resultant substrate of FIG. 12, FIG. 22 is a sectional view taken along the line 22–22' of FIG. 13, and FIG. 28 is a sectional view taken along the line 28–28' of FIG. 13. According to an embodiment of the present invention, the passivation film 222 is formed by CVD of silicon nitride or silicon oxide, preferably having a thickness of about 1.85 μm. After this step, as shown in FIGS. 13, 22, and 28, a first contact hole 223 is formed for exposing a selected portion of a drain electrode in the metal layer 220 at a predetermined portion of the passivation film 222 using a third mask. Meanwhile, although not shown in the drawings, a second contact hole for exposing the gate pattern in the gate driving region and a third contact hole for exposing the data pattern in the gate driving region are formed together with the first contact hole 223 using the third mask.

Figure 29:
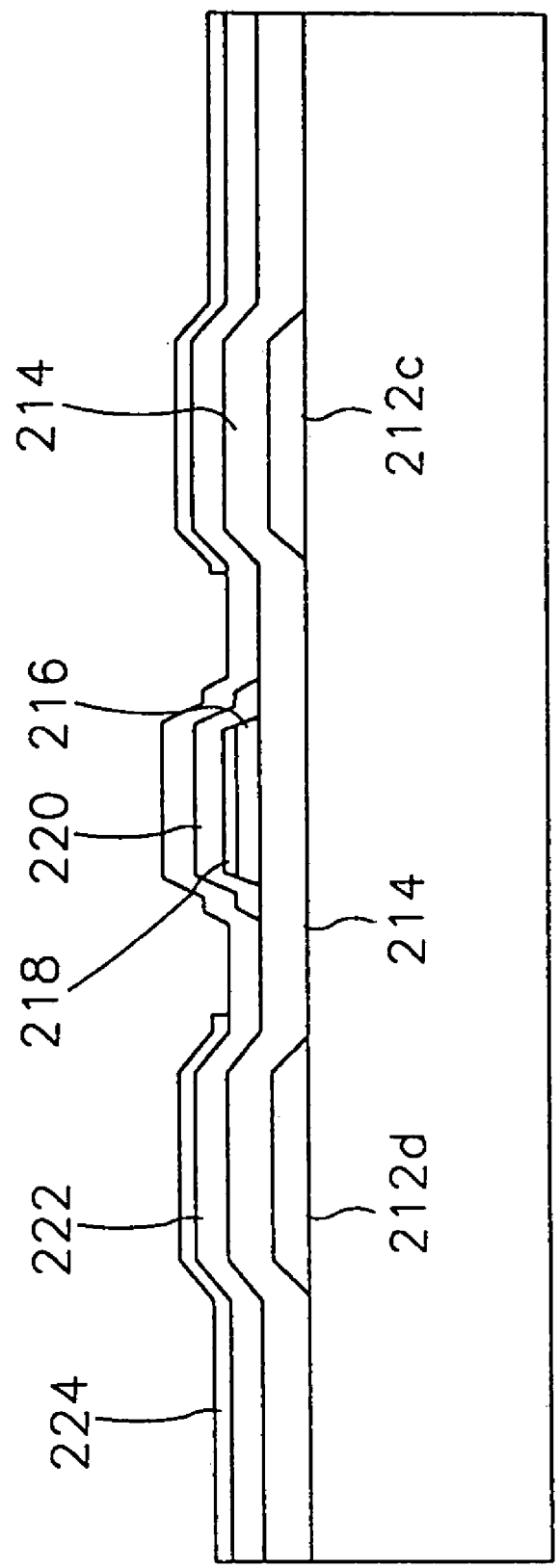

Next, referring to FIGS. 14, 23, and 29, a metal film is deposited having a thickness of approximately 1,500 Å on the entire surface of the resultant substrate by a sputtering method. As shown in FIG. 23, the deposited metal film is patterned into two kinds of conductive pattern by using a fourth mask. In other words, there is patterned a pixel electrode 224 (or first electrode pattern) which is in contact with the drain electrode in the metal layer 220 through the first contact hole at the pixel region. Although not shown in the drawings, a second electrode pattern are formed, which connects the gate pattern extended from the gate electrode of the first transistor with the data pattern extended from the source/drain electrode of the second transistor adjacent to the first transistor through the second and third contact holes.

As shown in the sectional views of FIGS. 23 and 29, the patterned pixel electrode 224 has the passivation film 222 and the gate insulating film 214 as a dielectric layer, which are interposed between the pixel electrode 224 and the lower storage electrodes 212b and 212c. The patterned pixel electrode 224 functions as the upper electrode of a storage capacitor. By the above constitution, phase of liquid crystal is stably maintained until a following signal is applied.

In case that the manufacturing method of the thin film transistor substrate disclosed in the third embodiment is applied to a transmission type LCD, the first electrode pattern 224 and the second electrode pattern (not shown) are made of transparent conductive material such as indium tin oxide (ITO), indium zinc oxide (IZO), or the like. On the contrary, in case that the manufacturing method is applied to a reflection type LCD, the pixel electrode is made of opaque conductive material such as chromium (Cr), AlNd alloy, or the like.

In particular, when the reflection electrode of the TFT substrate for the reflection type LCD has a specific uneven surface, a photosensitive organic insulating film having an uneven surface may be used as the passivation film.

Since the photosensitive organic insulating film does not require a process for forming a photosensitive mask pattern thereon, at least one patterning process for forming a contact hole and an irregular surface can be omitted.

According to the present embodiment, the active pattern, the source electrode and the drain electrode are formed by one masking process and the contact gate pattern extended from the gate of the first thin film transistor and the contact data pattern extended from the source/drain electrode of the second thin film transistor are simultaneously formed while the pixel electrode is patterned. Accordingly, the number of the masks used for forming the thin film transistor can be decreased to four sheets.

EMBODIMENT 4

In a similar manner as described for Embodiment 2 and FIG. 8, the present embodiment discloses a method for manufacturing a thin film transistor substrate in which data lines are formed on the passivation film using only four sheets of mask.

As shown in FIGS. 15 and 24, using a first mask, there is formed a gate pattern including a gate electrode 212d, a gate line 212a, and a lower storage electrode 212b and 212c. Then, a gate insulating film 214 is deposited to a selected thickness on the entire surface of the resultant substrate.

In the same manner as that shown in FIGS. 17–21, an active pattern including first and second impurity regions and channel region and a data pattern including the source electrode and the drain electrode are formed using a second mask, but the data line integrated with the source electrode is not formed at the pixel region.

Next, referring to FIGS. 22 and 8, a passivation film 130 such as silicon nitride or the like is formed on the resultant substrate including the active pattern and the data pattern. Thereafter, a first contact hole H1 for partially exposing the source electrode 120a of the pixel region, a second contact hole H2 for partially exposing the drain electrode 120b of the pixel region, a third contact hole H3 for exposing the contact gate pattern 112f of the gate driving region, and a fourth contact hole H4 for exposing a contact data pattern 120h of the gate driving region are formed in the passivation film 130 as using a third mask. Also, in the pad region of the passivation film 130, there are formed fifth and sixth contact holes H5 and H6 for partially exposing a gate pad 112c and a data pad 120d, respectively.

On the passivation film 130 including the first contact hole H1 to the sixth contact hole H6, a metal film for the pixel electrode is deposited to a predetermined thickness. The deposited metal film is patterned using a fourth mask, thereby forming an electrode pattern part. The electrode pattern part includes the data line (or a first electrode pattern) 144 which is connected to the source electrode 120a of the pixel region through the first contact hole H1, the pixel electrode (or a second electrode pattern) 140 which is electrically coupled to the drain electrode 120b of the pixel region through the second contact hole H2, a third electrode pattern 142 which electrically connects the exposed contact gate pattern 112f of the gate driving region and the exposed data pattern 120h of the gate driving region to each other through the third and fourth contact holes H3 and H4, and a fourth electrode pattern 143 which electrically connects the gate pad 112c of the pad region and the data pad 120d of the pad region to each other through the fifth and sixth contact holes H5 and H6.

Here, the third electrode pattern 142 of the gate driving region and the fourth electrode pattern 143 of the pad region can be regarded as contact terminals of the same functional group from the fact that they electrically connect a part of the gate patterns with a part of the data patterns.

Like the above embodiments, in case that the manufacturing method of the thin film transistor substrate disclosed in the fourth embodiment is applied to a transmission type LCD, the first electrode pattern 144 and the second electrode pattern 140 are comprised of a transparent conductive material such as indium tin oxide (ITO) or indium zinc oxide (IZO). On the contrary, in case that the manufacturing method is applied to a reflection type LCD, the pixel electrode is comprised an opaque conductive material such as chromium (Cr) or AlNd alloy.

In particularly, when the reflection electrode of the TFT substrate for the reflection type LCD has a specific uneven surface, a photosensitive organic insulating film having an uneven surface may be used as the passivation film. Since the photosensitive organic insulating film does not need a process for forming a photosensitive mask pattern thereon, at least one patterning process for forming a contact hole and an uneven surface may be omitted.

According to the present embodiment, the active pattern, the source electrode and the drain electrode are formed by one masking process and the contact gate pattern extended from the gate of the first thin film transistor and the contact data pattern extended from the source/drain electrode of the second thin film transistor are simultaneously formed while the pixel electrode is patterned. Accordingly, the number of the masks used for forming the thin film transistor can be decreased to four sheets.

EMBODIMENT 5

The present embodiment is a layout design of a pattern for minimizing contacts in the gate driving region and thereby minimizing the occupied area.

Figure 30:
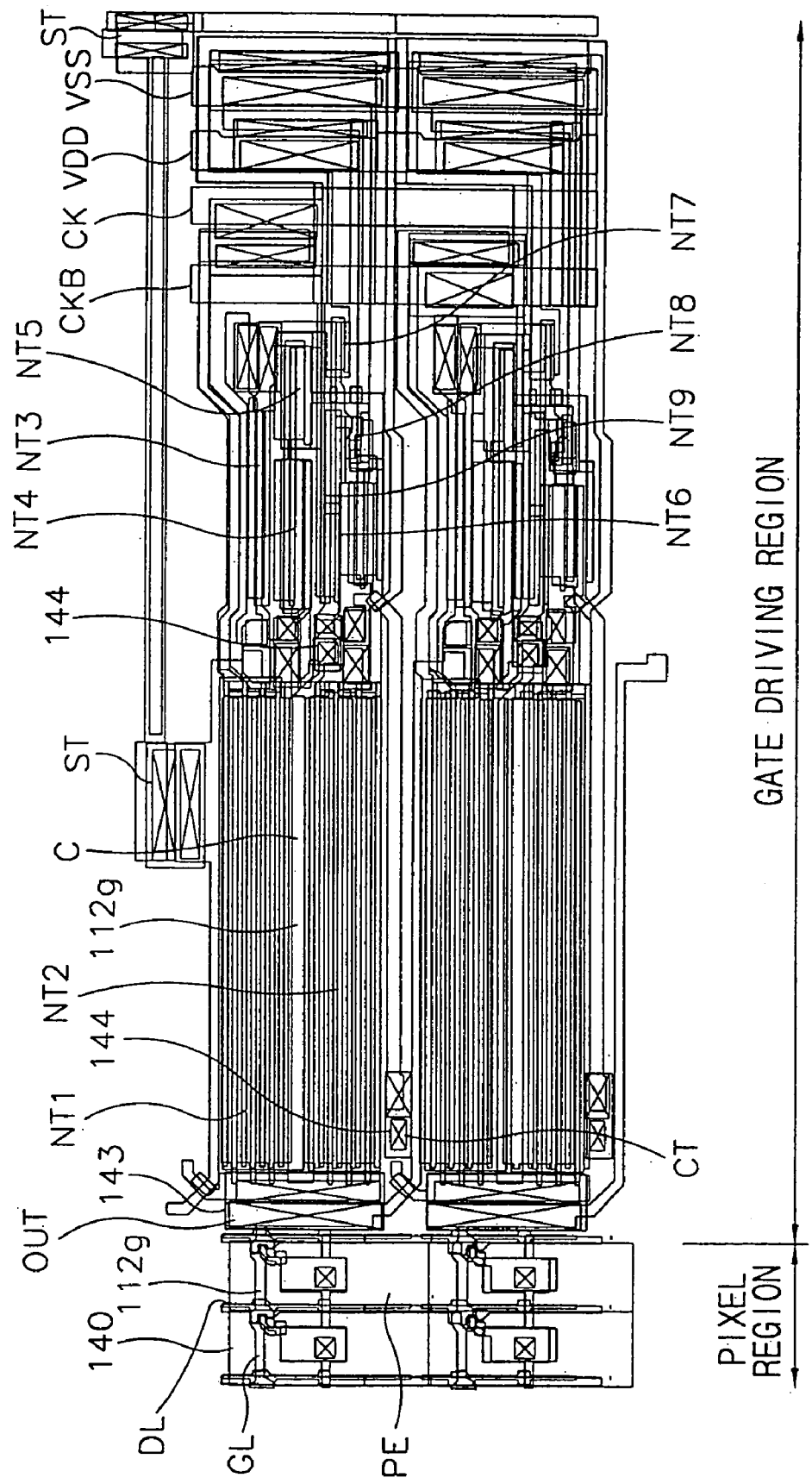
FIG. 30 is a plan view for partially showing the gate driving region and the pixel region adjacent thereto.

FIG. 30 is a plan view partially showing the gate driving region and its adjacent portion.

Referring to FIG. 30 and FIG. 6, first and second transistors NT1 and NT2 as the gate line driving transistor are arranged at a portion adjacent to the pixel region and external signal lines CKB, CK, VDD, VSS, and ST are arranged at the most distant position from the pixel region. Third to ninth transistors NT3–NT9 as a control transistor are arranged between the gate line driving transistors region and the external signal lines region. Capacitor C is arranged between the first gate line driving transistor NT1 and the second gate line driving transistor NT2. The capacitor C includes a lower electrode arranged at an extended portion of the lower portion of the gate electrode of the first driving transistor NT1, an upper electrode arranged at an extended portion of the upper portion of the drain electrode of the second driving transistor NT2, and a gate insulating film of SiNx interposed between the upper electrode and the lower electrode.

FIGS. 31 to 35 show unit patterns for forming the structure of FIG. 30. The sectional structures of the aforementioned FIGS. 7 and 8 partially correspond to the plane structure of FIG. 30. FIG. 36 is a partial detailed plan view of a unit pixel region and an adjacent portion thereof, and FIGS. 37 to 41 are partial detailed plan views of FIG. 30. FIG. 42 is a partial detailed view of a peripheral region including the gate driving region and the pad region and FIGS. 43 to 47 are partial detailed plan views showing unit patterns in the peripheral region.

Figure 31:
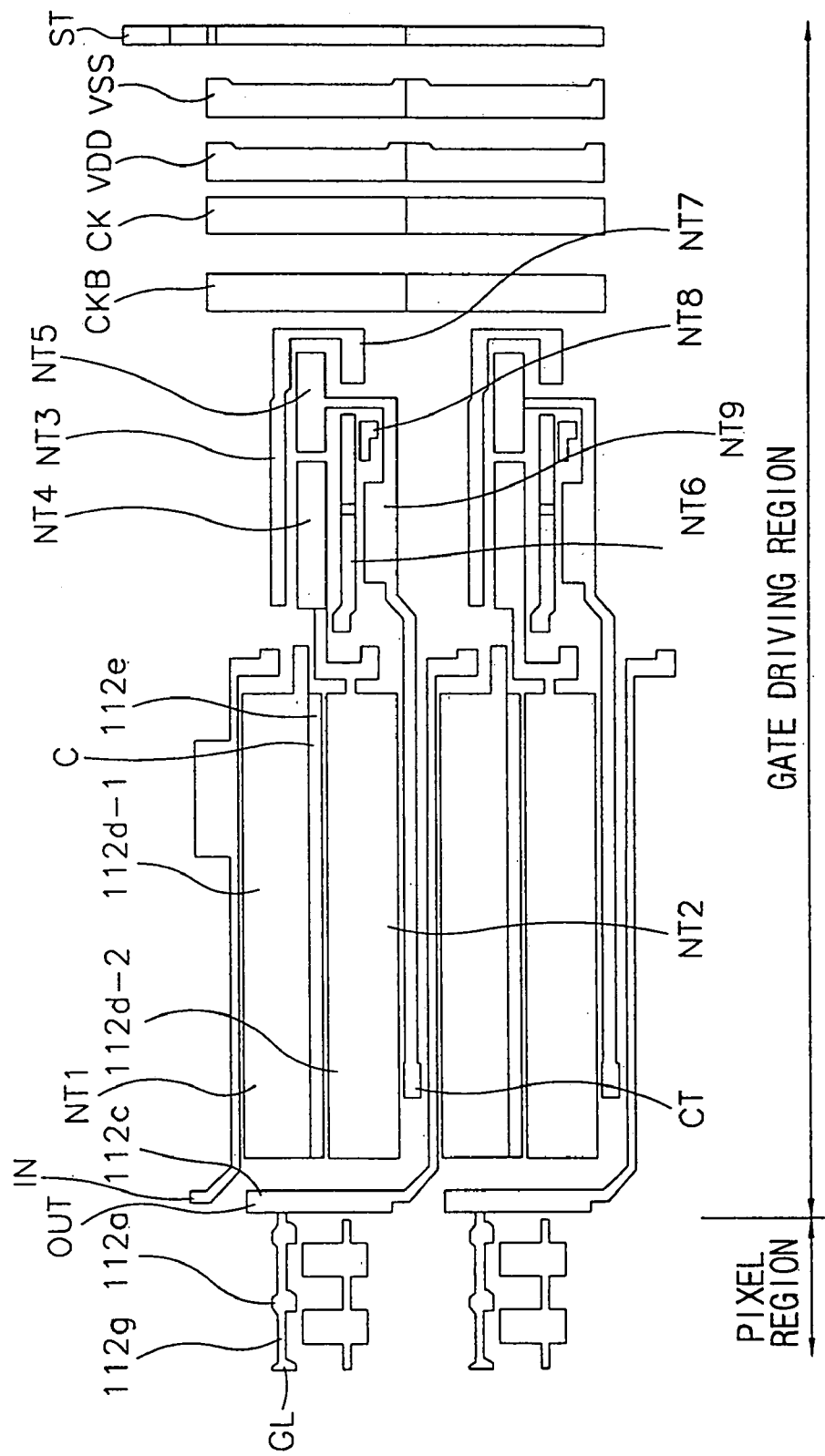
FIGS. 31 to 35 are plan views of patterns applied to unit processes to form the structure of FIG. 30.

Referring to FIGS. 31, 37, 43, and 7, a plurality of gate patterns are formed on a transparent insulating substrate 110 using a first mask. The plurality of gate patterns have a single layer structure of aluminum (Al) or an aluminum-contained alloy such as AlNd, or a double layer structure in which chromium (Cr) or molybdenum (Mo) is stacked on Al. The plurality of gate patterns in the pixel region includes gate lines 112g arranged in a horizontal direction, a lower capacitor line 112h parallel to the gate line 112g disposed between adjacent gate lines 112g and parallel to the gate line 112g, a lower capacitor pattern 112i overlapped with the lower capacitor line 112h and formed within a unit pixel region, and a gate electrode 112a branched from the gate line 112g. As shown in FIG. 31, a gate pad 112c is placed between the pixel region and the gate driving region to be connected to one end of the gate line 112g. The gate pad 112c of output terminal OUT receives scan signals from an external information processing device and applies the received scan signals to the gate line 112g. Gate electrodes 112d-1 and 112d-2 of the first driving transistor NT1 and the second driving transistor NT2, respectively, have wider width than those of gates of the third transistor NT3 to the ninth transistor NT9 shown in the detailed view of FIG. 43. Also, the gate electrode 112d-1 of the first driving transistor NT1 includes a lower storage pattern 112e extended toward the gate electrode 112d-2 of the second driving transistor NT2.

As the patterning process of the gate pattern shown in FIG. 31 is completed, the gate insulating film 114 such as silicon nitride or silicon oxide is formed on the entire surface of the resultant substrate. Then, as shown in FIG. 7, active patterns 116a, 116b, 118a, 118b, 118c, and 118d are formed on the gate insulating film 114 using a second mask.

Figure 32:
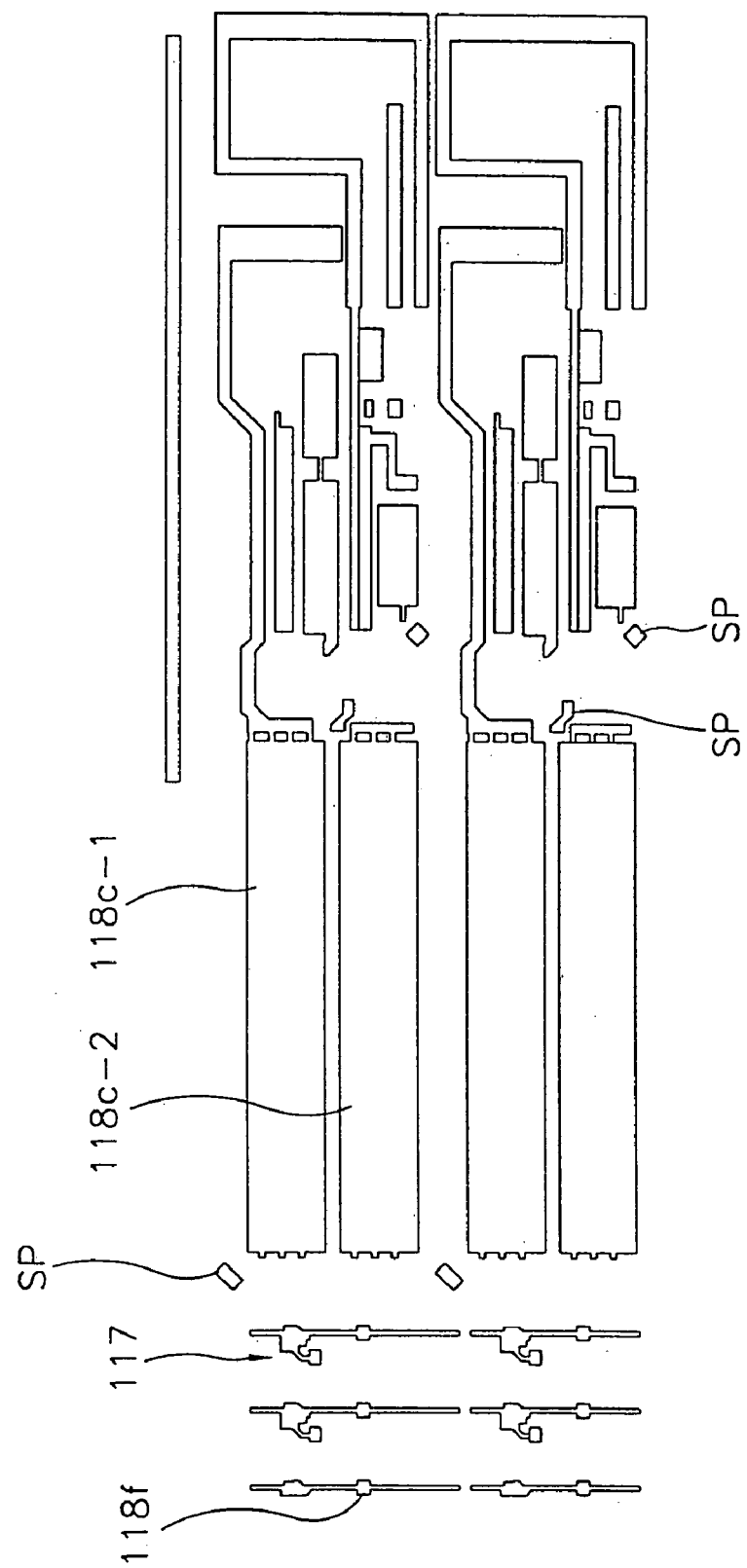
Figure 38:
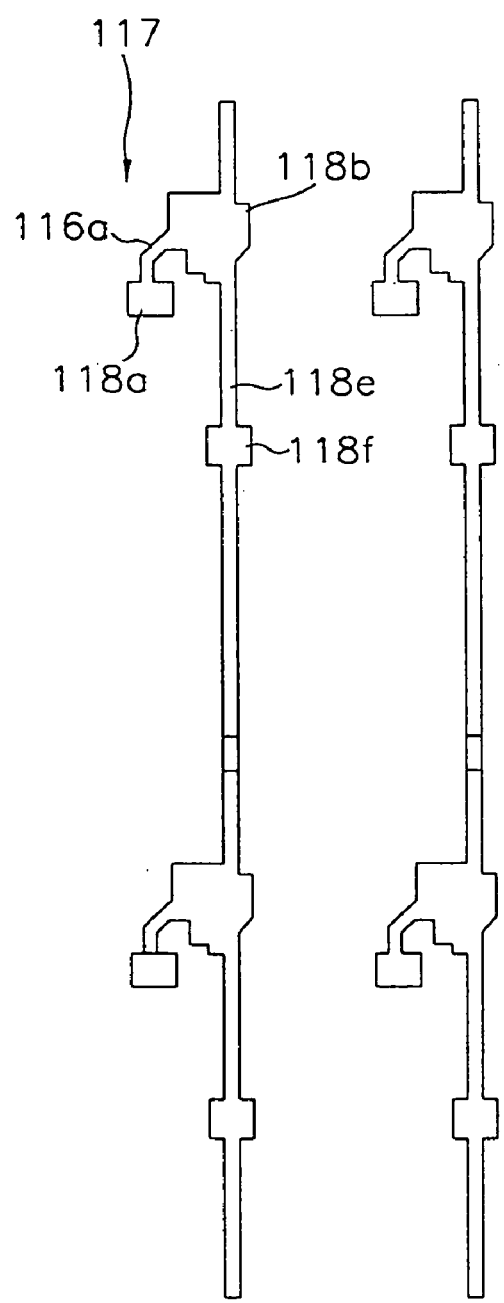
Figure 44:
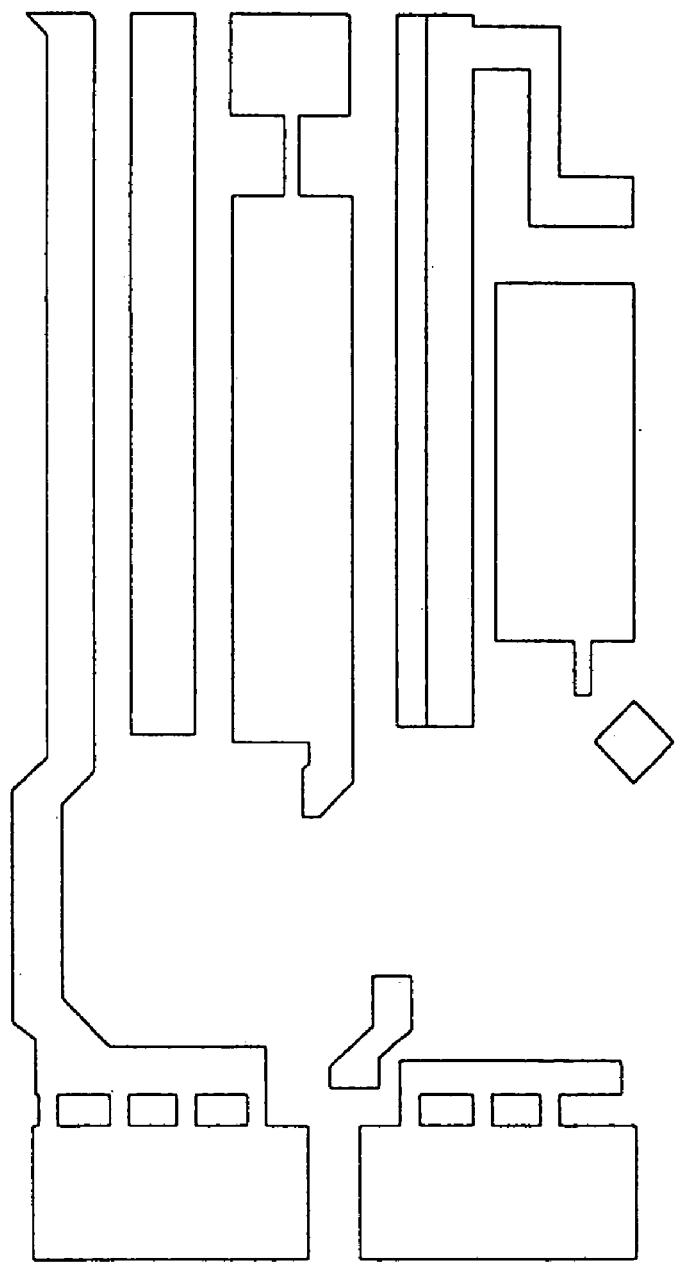

FIGS. 32, 38, and 44 are plan views showing a state in which the active patterns 116 and 118 are formed at the pixel region on the gate insulating film 114.

Referring to FIGS. 32 and 38, there are formed first to third active patterns. The active patterns includes a first active pattern 118e substantially perpendicular to the gate line 112g (in FIG. 31), a second active pattern 117 partially overlapped with the gate electrode 112a (in FIG. 31), and a third active pattern 118f disposed at selected portions of the first active pattern 118e and overlapped with the lower capacitor line 112h (in FIG. 37). The second active pattern 117 includes a first impurity region 118a (or drain region), a second impurity region 118b (or source region), and a channel region 116a between the first impurity region 118a and the second impurity region 118b.

Referring to FIGS. 32 and 44, the active patterns 118c-1 and 118c-2 on the first gate line driving transistor NT1 and the second gate line driving transistor NT2 connected to output terminals of the gate driving region have wider width than those of the active patterns on the third NT3 to ninth transistors NT9.

Of the active patterns shown in FIG. 32, the symbol "SP" denotes dummy patterns which are provided for protecting the source pattern crossed with the underlying gate pattern. These dummy patterns decrease the surface slope of a surface in which the source pattern is being formed, thereby preventing short of upper source metal lines.

Figure 33:
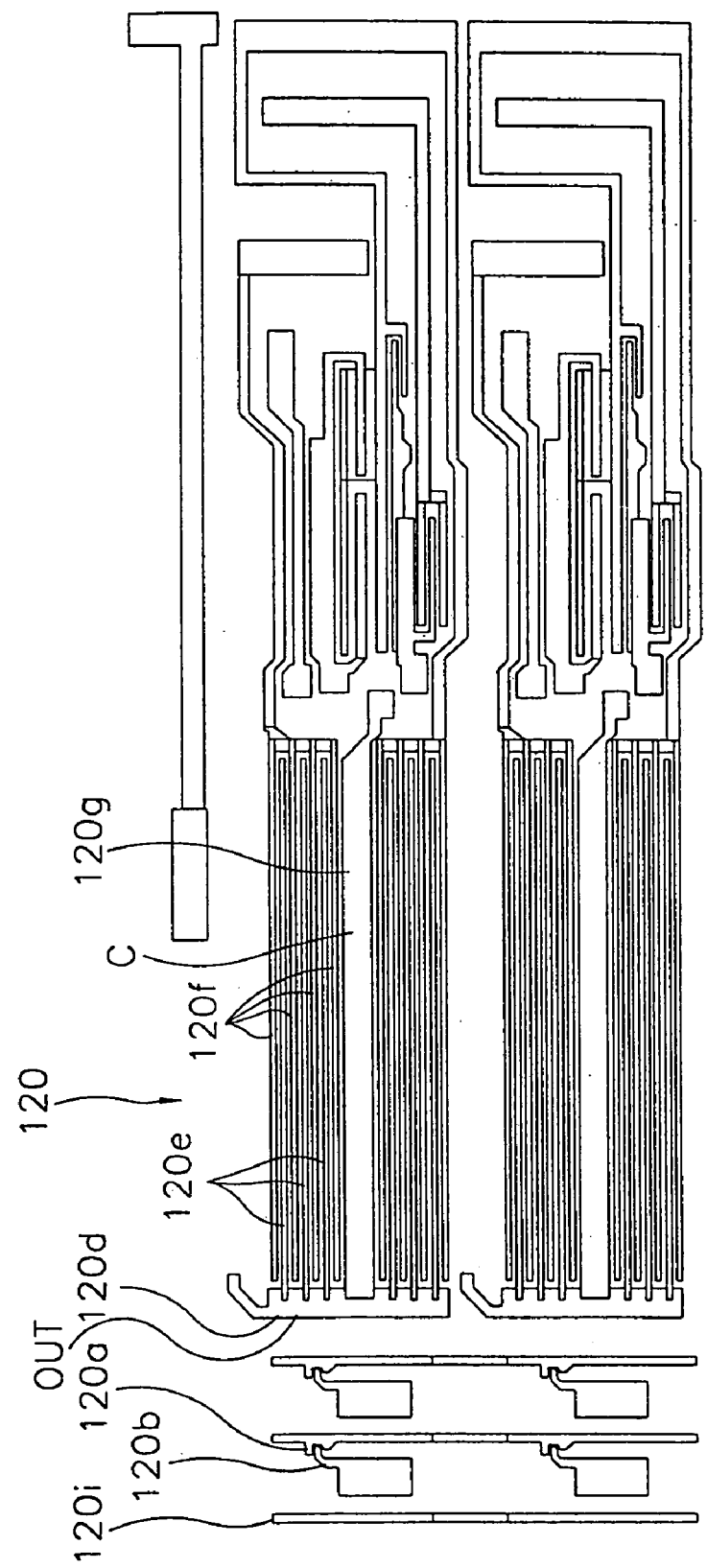

As shown in FIG. 33, on the resultant substrate including the active patterns, there are formed source/drain metal patterns 120. The source/drain metal patterns 120 are formed by depositing a Cr film to have a thickness of approximately 1,500 Å on the entire surface of the resultant substrate and patterning the deposited Cr film by a conventional photolithography method using a third mask.

Figure 39:
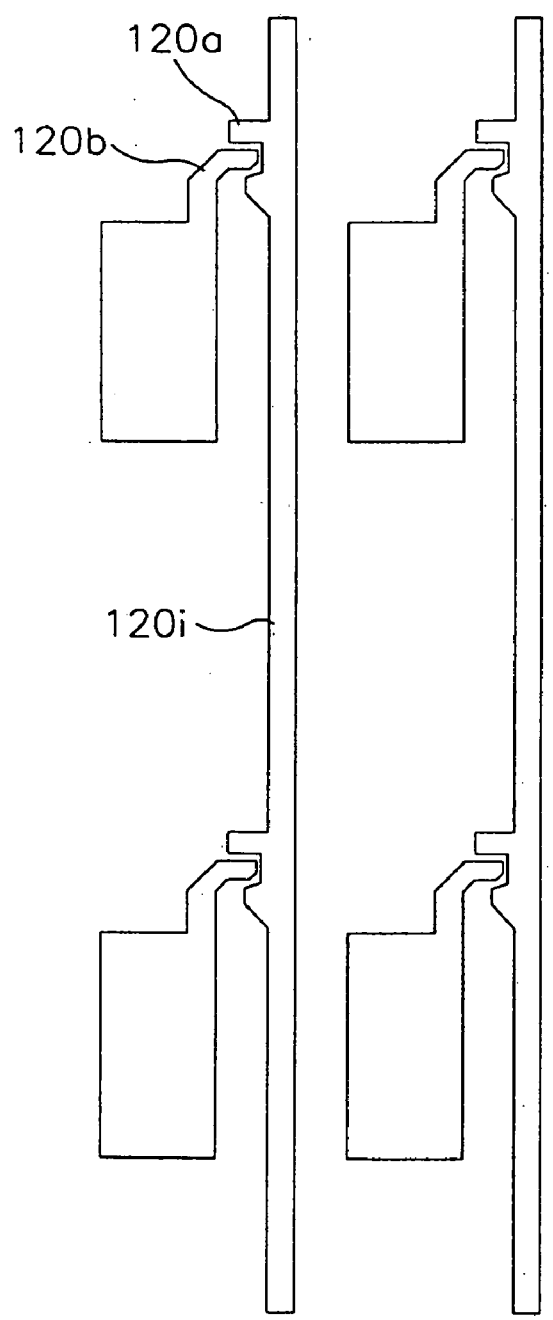
Figure 45:
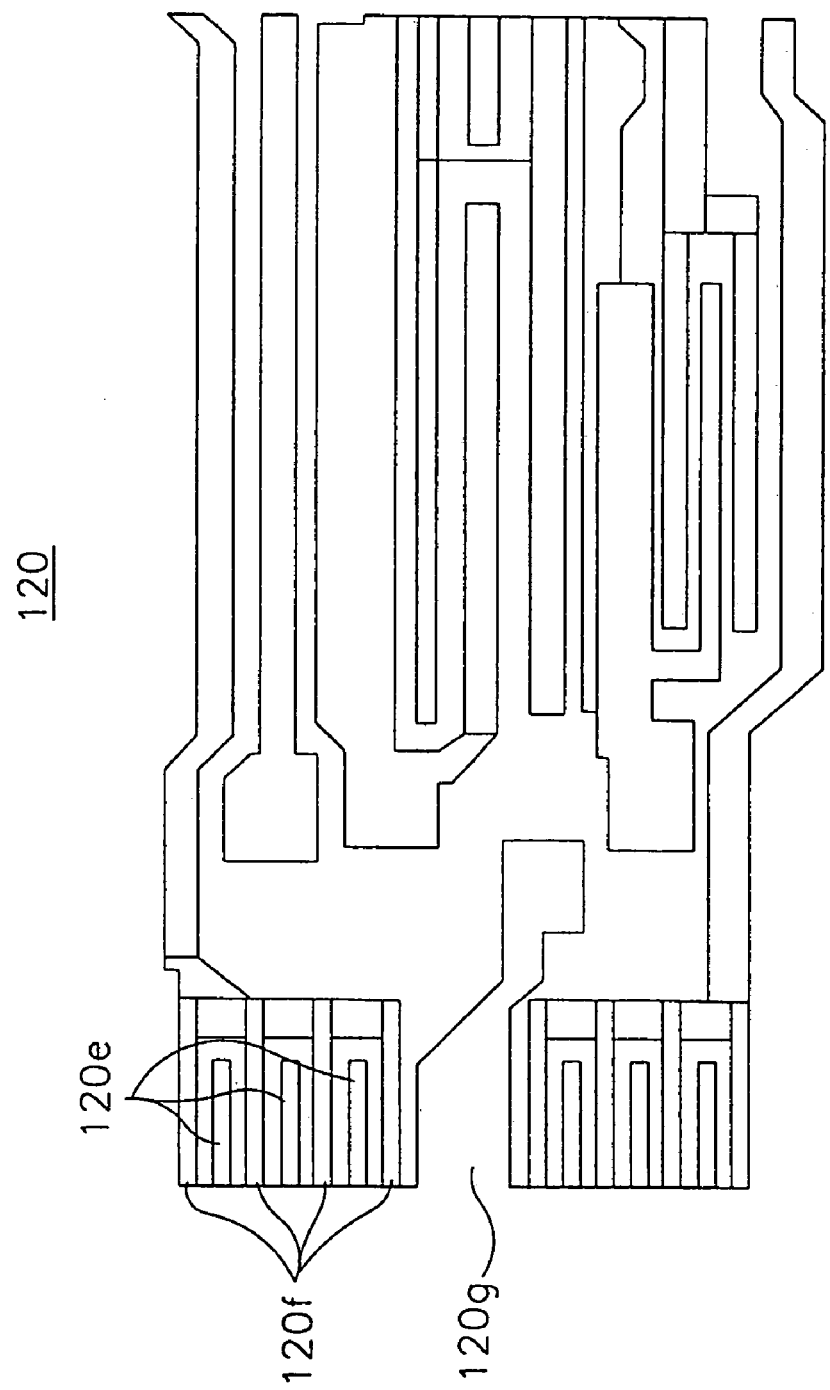
Figure 46:
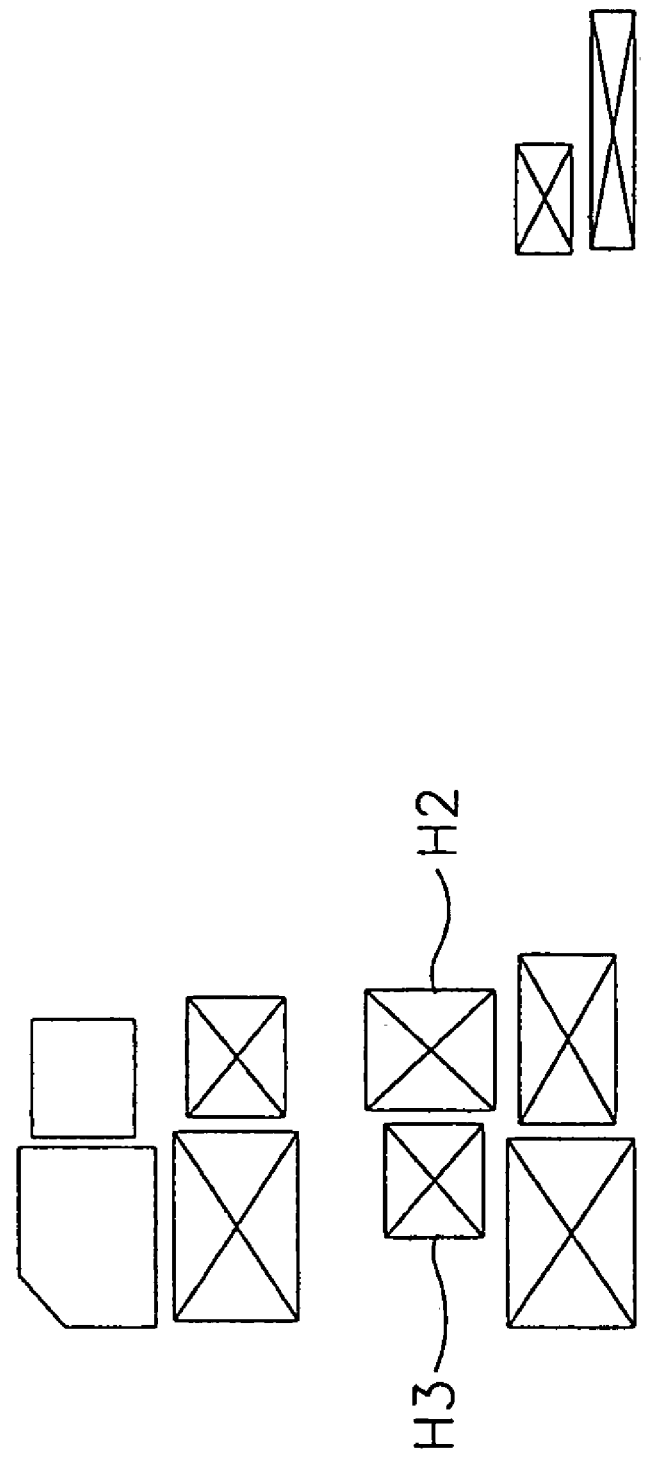

Referring to FIGS. 33, 39, and 45, there are arranged data lines 120i perpendicular to the gate lines 112i (in FIG. 37) and overlapped with the first active pattern 118e (in FIG. 38) in the pixel region. Source electrode 120a branched from the data line 120i and drain electrode 120b spaced apart by a certain distance from the source electrode 120a are formed together with the data lines 120i in a unit pixel region such that they are in contact with the first and second impurity regions 118a and 118b of the second active pattern 117. As shown in FIG. 39, the drain electrode 120b is overlapped with the lower capacitor pattern 112i shown in FIG. 31 to secure a sufficient storage capacitance.

Referring to FIG. 33, source/drain pad 120d (or data pad) is formed adjacent to the gate pad 112c (in FIG. 31) at the gate driving region. The source/drain pad 120d and the gate pad 112c (in FIG. 31) are electrically connected to each other by a contact pattern which is formed together with the pixel electrode of the pixel region, as shown in FIG. 30.

The source and drain electrodes of the first driving transistor NT1 and the second driving transistor NT2 are formed in an interdigital structure. In other words, even source electrodes 120e are commonly connected to the left source pad 120d, odd drain electrodes 120f are commonly connected to the right drain pad, and the even source electrodes 120e are alternatively disposed between the odd drain electrodes 120f. A first odd drain electrode 120f of the first driving transistor NT1 is extended toward its width direction to be overlapped with the lower storage electrode 112e (in FIG. 31) for the first driving transistor NT1, and thereby the first odd drain electrode 120f functions as the upper electrode of the capacitor C connected between the source electrode 120e (in FIG. 31) and the gate electrode 112d in the first driving transistor NT1. The interdigital structure applied to the source and drain electrodes of the first and second driving transistors NT1 and NT2 increases the channel width of the driving transistor, so that a sufficient driving capability of the thin film transistors comprised of amorphous silicon is secured.

As the formation of the source/drain metal patterns 120 shown in FIG. 33 is completed, the passivation film 130 is formed on the resultant structure, as shown in FIG. 7. The passivation film 130 is comprised of an inorganic insulating material such as silicon oxide, silicon nitride, or a mixture thereof.

Figure 34:
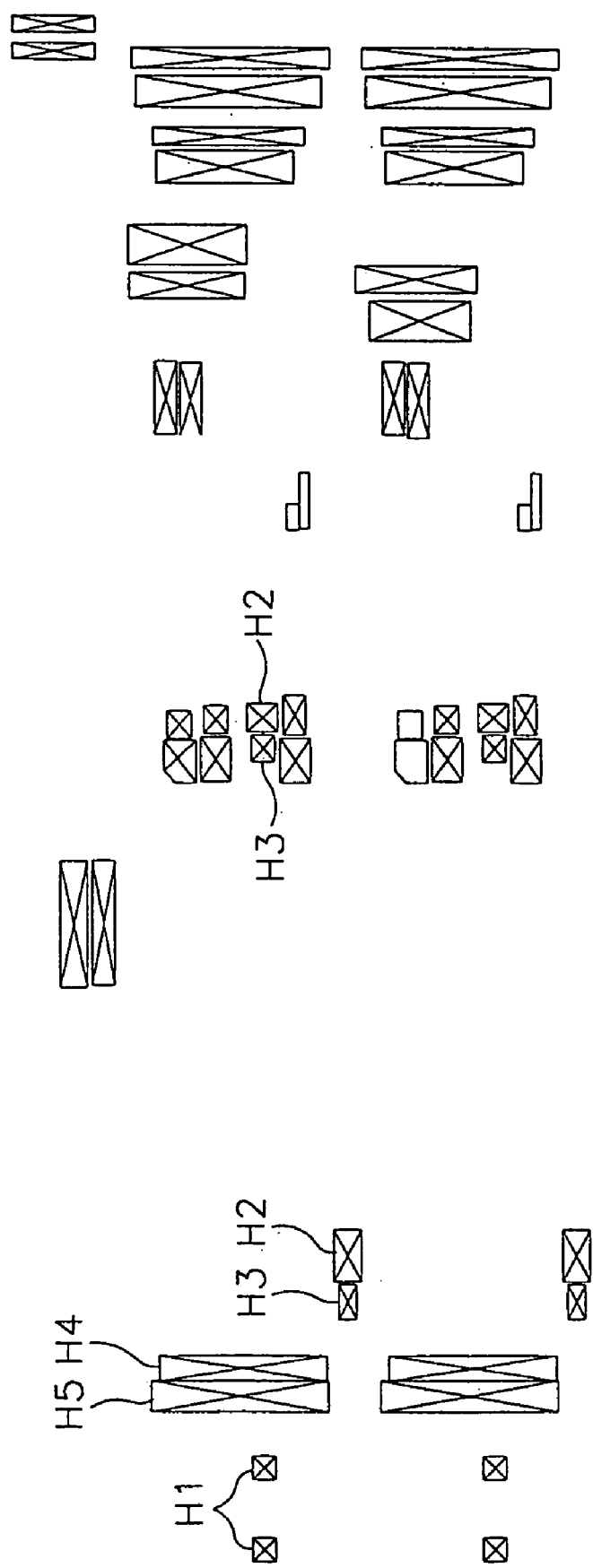

Next, as shown in FIG. 34, contact holes H1–H5 are formed in the passivation film through a conventional photolithography method using a fourth mask. Specifically, the first contact hole H1 is formed at the pixel region and the first contact hole H1 partially exposes the drain electrode 120b (in FIG. 33). The second contact hole H2 and the third contact hole H3 are formed at the gate driving region. The second contact hole H2 exposes the contact gate pattern and the third contact hole H3 exposes the contact data pattern. In addition to the second and third contact holes H2 and H3, the fourth and fifth contact holes H4 and H5 are formed at the gate driving region. Like the second and third contact holes H2 and H3, the fourth and fifth contact holes H4 and H5 are sorted into a first group for exposing the contact gate pattern and a second group for exposing the contact data pattern. To this end, it may be regarded that the contact holes for exposing the gate pad 112c (in FIG. 31) are included in the second contact hole group and the contact holes for exposing the data pad 120d (in FIG. 33) are included in the third contact hole group.

Figure 35:
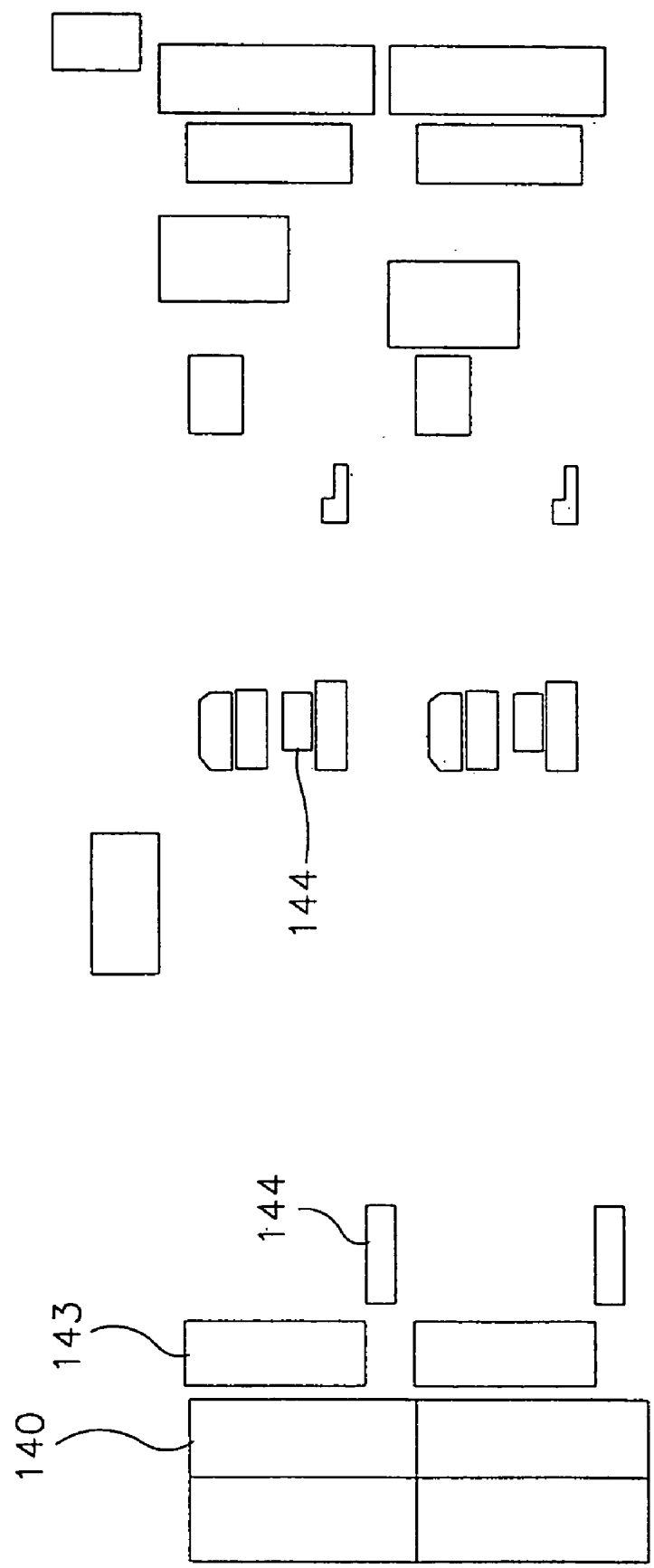
Figure 36:
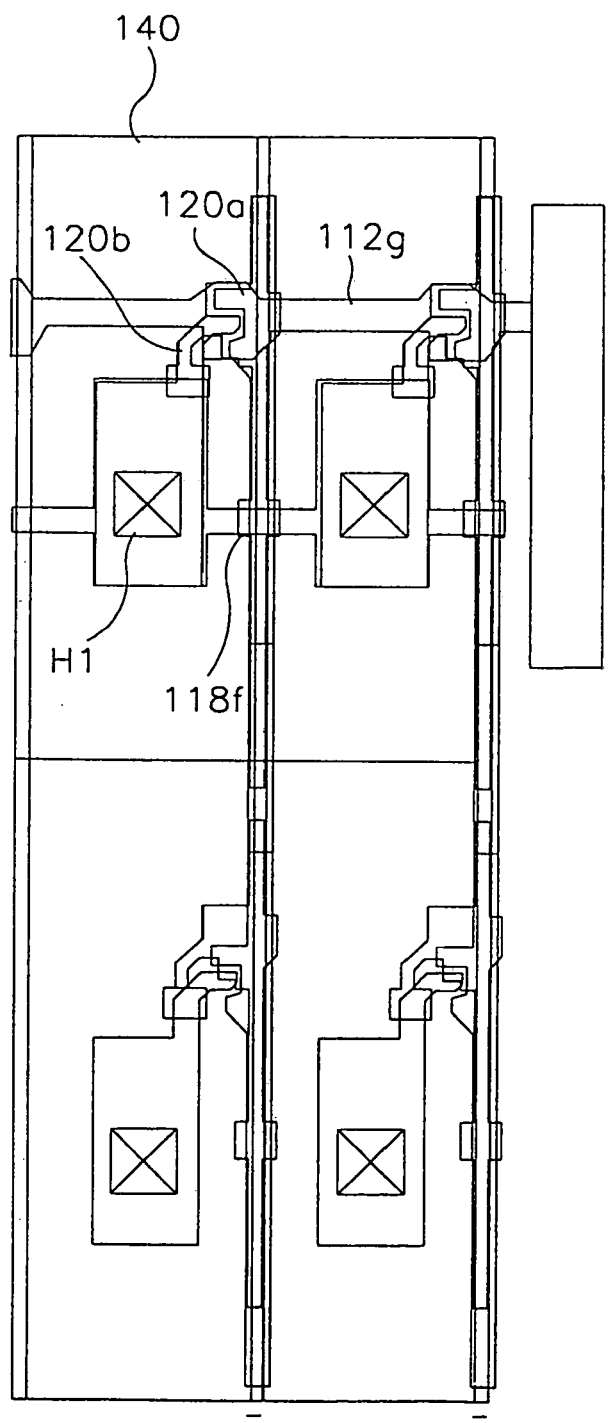
FIG. 36 is a partial detailed plan view of the unit pixel region and its adjacent portions of FIG. 30.
Figure 37:
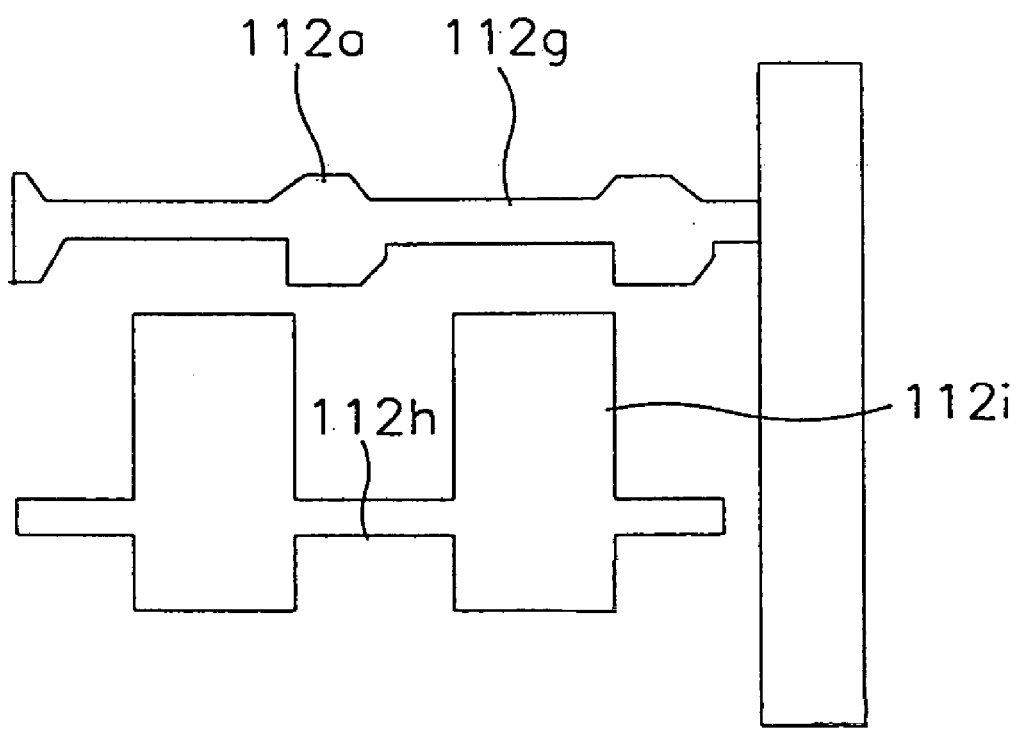

As shown in FIG. 35, the pair of contact holes H2 and H3 which are arranged adjacent to each other are electrically connected to each other by an electrode pattern 144 which is simultaneously formed together with the pixel electrode pattern provided in the pixel area. In other words, in order to electrically connect signal lines including the gate metal patterns and the source patterns each other, the contact holes are formed in the passivation film and then the contact patterns comprised of the same material as in the pixel electrode pattern are formed on the passivation including the contact holes. Specifically, as the formation of the contact holes are completed, a metal film for the pixel electrode is deposited on the passivation film including the contact holes. The deposited metal film is then patterned by the conventional photolithography method using a fifth mask.

Figure 41:
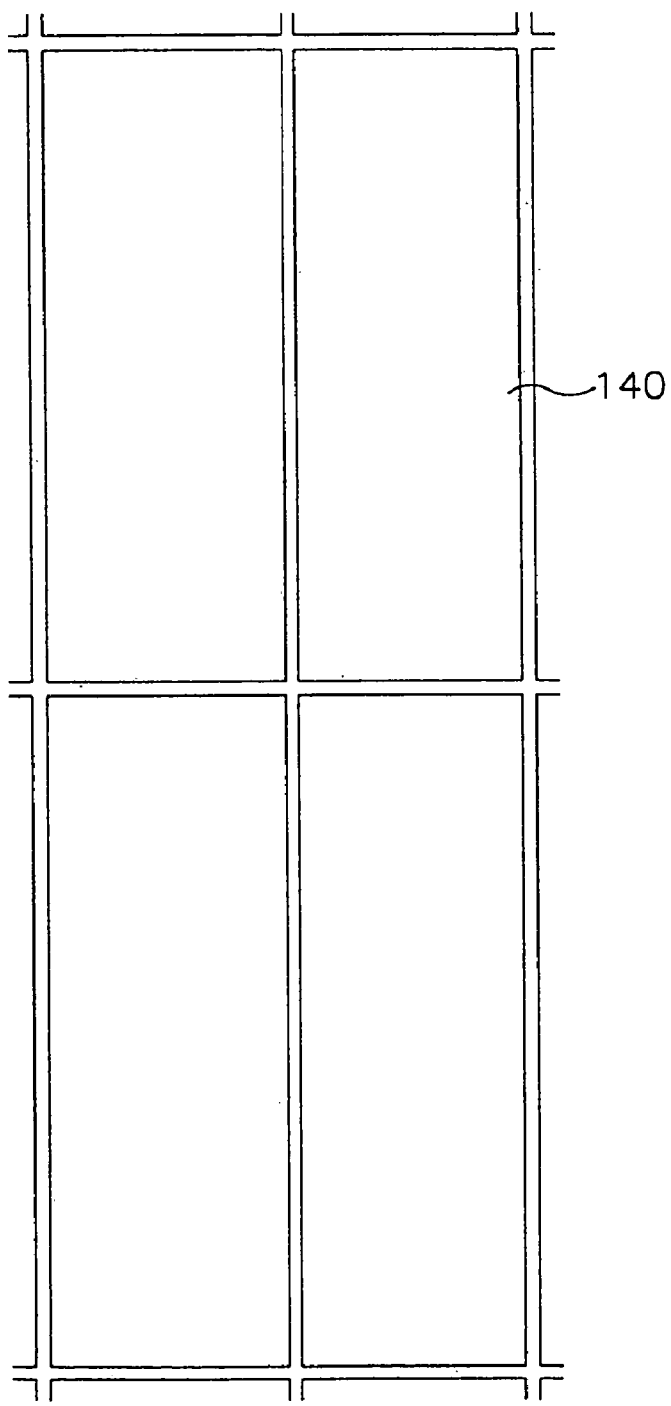
Figure 42:
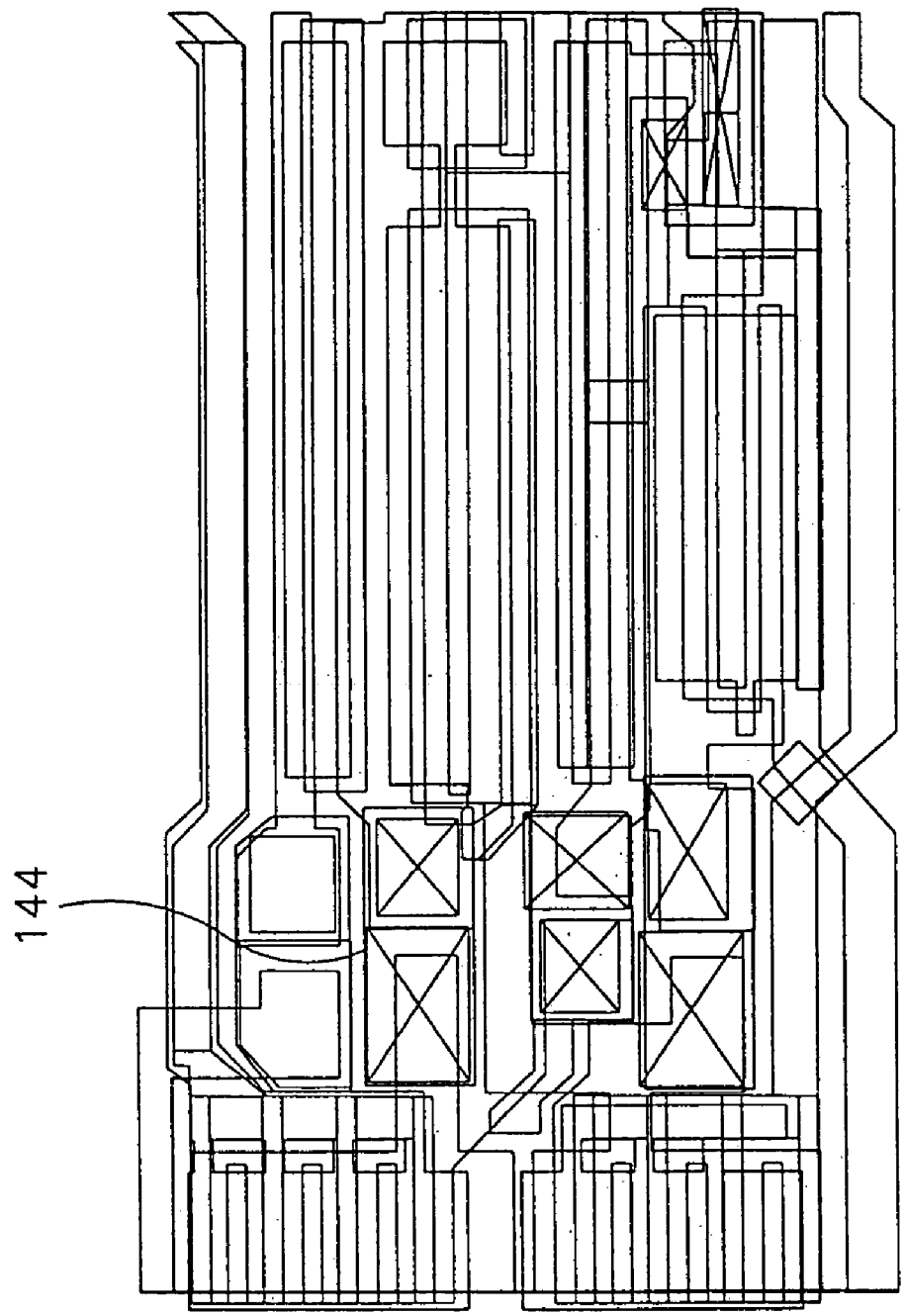
FIG. 42 is a partial detailed plan view of the gate driving region of FIG. 30.
Figure 43:
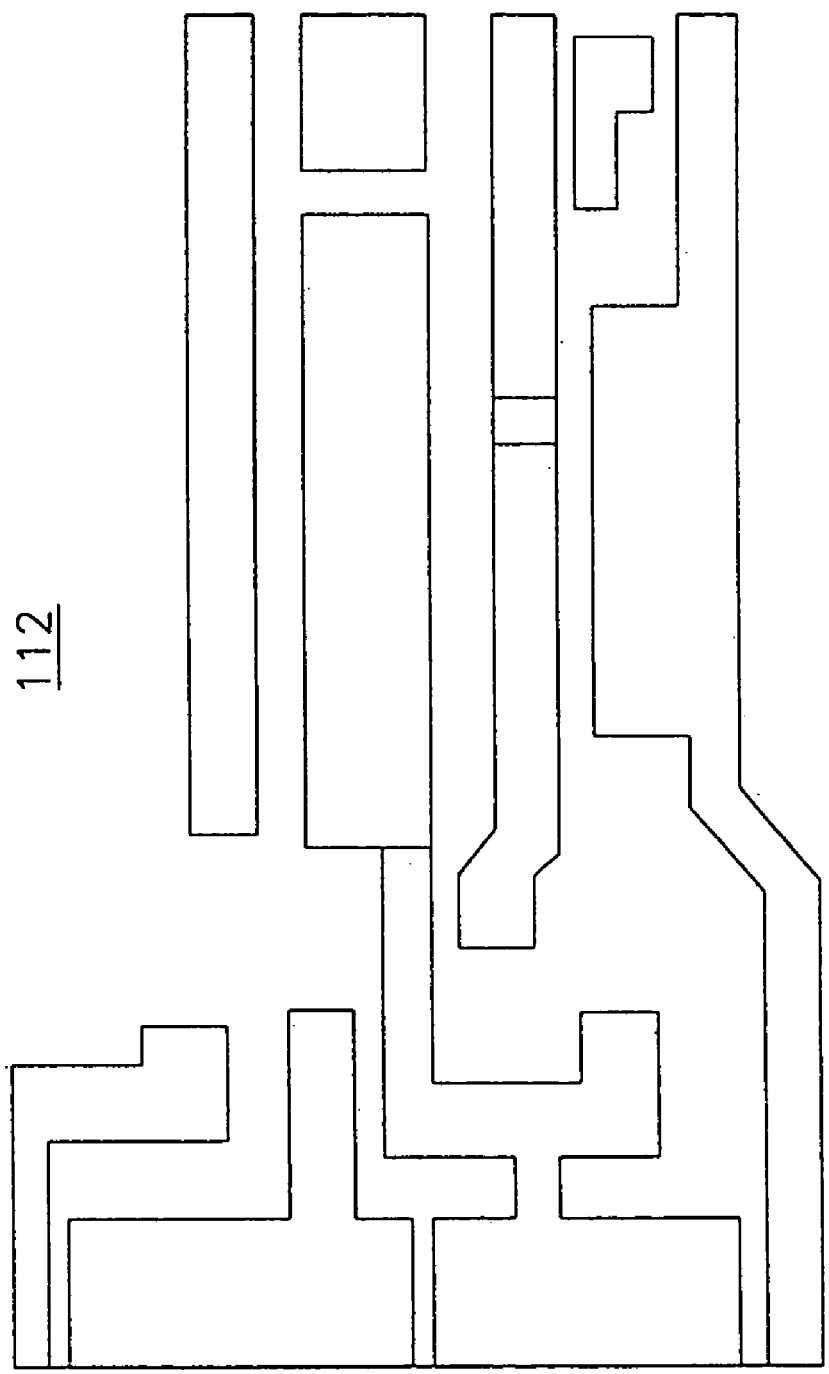
FIGS. 43 to 47 are partial detailed plan views for describing unit processes in the gate driving region.
Figure 47:
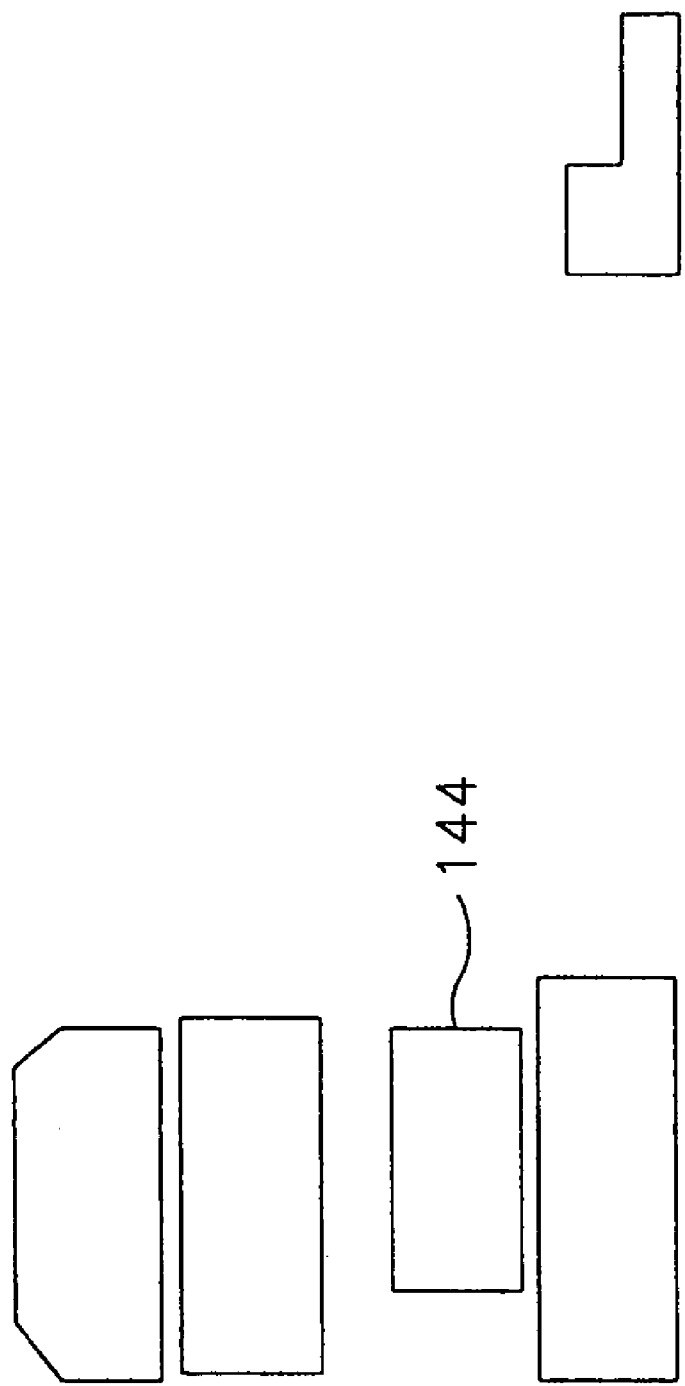

FIG. 35 is a plan view showing the pixel electrode pattern formed on the passivation film including the contact holes, FIG. 41 is a detailed plan view of the pixel electrode patterns shown in FIG. 35, and FIG. 47 is a plan view showing electrode patterns formed at the gate driving region. As shown in FIG. 35, the pixel electrode (or first electrode pattern) 140 in the pixel region makes contact with the drain electrode 120b (in FIG. 33) through the first contact hole H1 (in FIG. 34) formed in the passivation film 130. A pixel electrode pattern (or second electrode pattern) 144 formed in the gate driving region of the peripheral region connects the exposed gate pattern 112f (in FIG. 7) and the exposed data pattern 120h (in FIG. 7) electrically to each other through the second and third contact holes H2 and H3. Also, a pixel electrode pattern (or third electrode pattern) 143 formed in the pad region of the peripheral region connects the exposed data pad 120d (in FIG. 33) and the exposed gate pad 112c electrically to each other.

Similarly as in the above embodiments, in case that the manufacturing method of the thin film transistor substrate disclosed in the fifth embodiment is applied to a transmission type LCD, the first electrode pattern 144 and the second electrode pattern 140 are comprised of a transparent conductive material such as indium tin oxide (ITO) or indium zinc oxide (IZO). On the contrary, in case that the manufacturing method is applied to a reflection type LCD, the first and second electrode patterns are comprised of an opaque conductive material such as chromium (Cr) or AlNd alloy. In case of the transmission type LCD, while since the transparent conductive film is provided for the contact patterns, the transparent conductive film having a relatively lower conductivity than the metal patterns is used, it is preferably that the contact holes which are connected to each other through the electrode patterns should be arranged as close as possible in order to minimize influences on the electrical characteristics of the gate driving circuit due to the contact resistance.

In addition, to prevent an increase in the contact resistance or a contact failure due to a misalignment, it is preferable that a sufficient margin for the contact pattern size should be secured to a degree capable of covering the contact hole sufficiently.

In the meanwhile, when the reflection electrode of the TFT substrate for the reflection type LCD has a specific uneven surface, a photosensitive organic insulating film having an uneven surface may be used as the passivation film. Since the photosensitive organic insulating film does not require a process for forming a photosensitive mask pattern thereon, at least one patterning process for forming a contact hole and an irregular surface may be omitted.

According to the fifth embodiment of the present invention, the contact gate pattern that is extended from the gate electrode of the first thin film transistor of the gate driving region and the contact data pattern that is extended from the source/drain electrode of the second thin film transistor are simultaneously formed when the pixel electrode is patterned. Accordingly, the number of the masks used for forming the thin film transistor can be decreased to five sheets.

Thus, the number of contacts in the peripheral region is minimized. And, a gate driving circuit may be integrated in a minimized area compared with the panel size.

EMBODIMENT 6

FIG. 8 is a sectional view of the amorphous silicon thin film transistor substrate in accordance with the present embodiment.

Comparing FIG. 8 with FIG. 7, constitution of the data line is different. In other words, as shown in FIG. 8, the data line 144 is formed on the passivation film 130 together with the pixel electrode 140 and it is spaced apart by a certain distance from the pixel electrode 140. Specifically, as shown in FIGS. 31 and 32, the data line 144 is formed on the source electrode 120a, not on whole the pixel region on the resultant substrate. By depositing a metal film such as a Cr film to have a thickness of approximately 1,500 Å on the resultant substrate including the active patterns and then patterning the deposited metal film by the conventional photolithography method using a third mask, the data pattern is formed as shown in FIG. 32.

As shown in FIG. 8, the passivation film 130 of silicon nitride approximately 1.85 μm thick is formed on the resultant substrate including the data pattern. Then, contact holes H1–H4 are formed in the passivation film 130 through the conventional photolithography method using a fourth mask. Specifically, the first contact hole H1 is formed at the pixel region and the first contact hole H1 partially exposes the source electrode 120a. The second contact hole H2 is formed at the pixel region and the second contact hole H2 partially exposes the drain electrode 120b. The third contact hole H3 is formed at the gate driving region and the third contact hole H3 exposes the contact gate pattern 112f. The fourth contact hole H4 is formed at the gate driving region and the fourth contact hole H4 exposes the contact data pattern 120h. In addition, at the pad region are formed fifth and sixth contact holes H5 and H6 for partially exposing the gate pad 112c and the data pad 120d respectively.

Subsequently, a transparent conductive film on the passivation film 130 including the first to sixth contact holes H1–H6 is formed to have a thickness of approximately 1,500 Å. The deposited transparent conductive film is patterned by the conventional photolithography method using a fifth mask.

In other words, there are formed the data line (or first electrode pattern) 144 coupled to the source electrode 120a of the pixel region through the first contact hole H1, the pixel electrode pattern (or second electrode pattern) 140 coupled to the drain electrode 120b of the pixel region through the second contact hole H2, a third electrode pattern 142 which electrically connects the exposed gate pattern 112f of the gate driving region with the exposed data pattern of the gate driving region through the third and fourth contact holes H3 and H4, and a fourth electrode pattern 143 which electrically connects the gate pad 112c of the pad region with the data pad 120d of the pad region through the fifth and sixth contact holes H5 and H6. Here, the third electrode pattern 142 and the fourth electrode pattern 143 are regarded as the same type contact terminal from a fact that they electrically connect a part of the gate pattern with a part of the data pattern each other.

According to the sixth embodiment of the present invention, a contact area in the peripheral region is minimized. Thus, a gate driving circuit may be integrated in a minimized area compared with the panel size. Further, since appliance range of the pixel electrode in the gate driving region is limited to the contact portion and thereby circuit characteristic is not influenced on kinds of used electrodes, a stable circuit can be obtained.

As described previously, according to the present invention, a contact area in the peripheral region is minimized and thereby a gate driving circuit can be integrated in a minimized area compared with the panel size.

Further, since appliance range of the pixel electrode in the gate driving region is limited to the contact portion and thereby circuit characteristic is not influenced on kinds of used electrodes, a stable circuit can be obtained.

Furthermore, the active pattern, the source electrode, and the drain electrode are formed by one masking process and the contact gate pattern extended from the gate of the first thin film transistor and the contact data pattern extended from the source/drain electrode of the second thin film transistor are simultaneously formed while the pixel electrode is patterned. Accordingly, the number of the masks used for forming the thin film transistor can be decreased to four sheets.

Moreover, since the data line is formed together with the pixel electrode, there can be prevented a short failure or an open failure of the data patterns due to the complexity of the data patterns within the pixel region.

In addition, the contact gate pattern that is extended from the gate electrode of the first thin film transistor of the gate driving region and the contact data pattern that is extended from the source/drain electrode of the second thin film transistor are simultaneously formed while the pixel electrode is patterned. Accordingly, the number of the masks used for forming the thin film transistor can be decreased to five sheets.

Moreover, since the passivation film can be formed of acryl resin-based photosensitive organic substance, the number of the process steps for forming contact holes is decreased and thereby the manufacturing process is simplified.

While the present invention has been described in detail, it should be understood that various changes, substitutions and alterations can be made hereto without departing from the spirit and scope of the invention as defined by the appended claims.

What is claimed is:

1. A substrate comprising:
    a gate pattern formed on a pixel region and a peripheral region, the pixel region and the peripheral region being disposed on the substrate;
    an active pattern insulated from the gate pattern to be formed on the gate pattern, the active pattern including a semiconductor layer;
    a data pattern electrically connected to a portion of the active pattern, said data pattern including a data electrode;
    a first insulating interlayer formed on the data pattern, the first insulating interlayer having a first contact hole for partially exposing the data electrode of the data pattern, a second contact hole for exposing a gate electrode of a first drive transistor of the peripheral region, and a third contact hole for exposing a data electrode of a second drive transistor of the peripheral region; and
    an electrode pattern part formed on the first insulating interlayer, the electrode pattern part including a first electrode pattern in contact with a data electrode of the pixel region through the first contact hole, and a second electrode pattern connecting the partially exposed gate electrode of the first drive transistor with the exposed data electrode of the second drive transistor through the second and third contact holes.

2. The substrate of claim 1, wherein the gate pattern includes a gate line and a gate electrode, the gate line is formed on the pixel region and the peripheral region, respectively, the gate electrode is branched from the gate line, and the substrate further comprises a lower capacitor electrode formed on the pixel region of the substrate, the first lower capacitor electrode being made from a same layer as the gate line, the lower capacitor electrode being spaced apart by a selected interval from the gate line and being in parallel with the gate line.

3. The substrate of claim 1, wherein the gate pattern includes a gate line and a gate electrode, the gate line is formed on the pixel region and the peripheral region, respectively, the gate electrode is branched from the gate line, and the substrate further comprises a lower capacitor electrode formed on a gate driving region of the peripheral region of the substrate, said lower capacitor electrode being made from the same layer as the gate line and extending from one side edge of the gate line, the peripheral region comprising the gate driving region and a pad region.

4. The substrate of claim 1, wherein the active pattern is comprised of amorphous silicon.

5. The substrate of claim 1, wherein the peripheral region has a gate driving region and a pad region, the data electrode includes a first electrode or a second electrode, and the first and second electrode of the first and second drive transistors has an interdigital structure.

6. The substrate of claim 5, wherein the second electrode of the second drive transistor has an upper capacitor electrode extending toward the first electrode of the first drive transistor.

7. The substrate of claim 1, wherein the first insulating interlayer is comprised of silicon nitride.

8. The substrate of claim 1, wherein the first insulating interlayer is comprised of a photosensitive organic insulating material.

9. The substrate of claim 8, wherein the first insulating interlayer has an embossing formed on a surface of the first insulating interlayer.

10. The substrate of claim 1, wherein the first and second electrode patterns are comprised of a transparent material.

11. The substrate of claim 10, wherein the transparent material includes indium tin oxide (ITO) or indium zinc oxide (IZO).

12. The substrate of claim 1, wherein the active pattern and the data electrode of the data pattern have first and second end surfaces, respectively, and each of the first and second end surfaces has substantially the same slope as each other.

13. A substrate comprising:
    a gate pattern formed on a pixel region and a peripheral region, the pixel region and the peripheral region being disposed on the substrate;
    an active pattern insulated from the gate pattern to be formed on the gate pattern;
    a data pattern electrically connected to a portion of the active pattern, said data pattern including a first electrode, a second electrode and a data line coupled to the first electrode;
    a first insulating interlayer formed on the data pattern, the first insulating interlayer including a first contact hole for partially exposing the second electrode, a second contact hole for partially exposing the first electrode of the pixel region, a third contact hole for exposing a gate electrode of a first drive transistor of the peripheral region, and a fourth contact hole for exposing a data electrode of a second drive transistor of the peripheral region; and
    an electrode pattern part formed on the first insulating interlayer, the electrode pattern part including a first electrode pattern coupled to a second electrode of the pixel region through the first contact hole, a second electrode pattern coupled to a first electrode of the pixel region through the second contact hole, and a third electrode pattern connecting the exposed gate electrode of the first drive transistor with the exposed data electrode of the second drive transistor through the third and fourth contact holes.

14. The substrate of claim 13, wherein the gate pattern includes a gate line and a gate electrode, the gate line is formed on the pixel region and the peripheral region, respectively, the gate electrode is branched from the gate line, and the substrate further comprises a lower capacitor electrode formed on the pixel region of the substrate, said lower capacitor electrode being made from a same layer as the gate line, and the lower capacitor electrode being spaced apart by a selected interval from the gate line and being in parallel with the gate line.

15. The substrate of claim 13, wherein the gate pattern includes a gate line and a gate electrode, the gate line is formed on the pixel region and the peripheral region, respectively, the gate electrode is branched from the gate line, and the substrate further comprises a lower capacitor electrode formed on a gate driving region of the peripheral region of the substrate, said lower capacitor electrode being made from a same layer as the gate line and extending from one side edge of the gate line, the peripheral region having the gate driving region and a pad region.

16. The substrate of claim 13, wherein the active pattern is comprised of amorphous silicon.

17. The substrate of claim 13, wherein the peripheral region includes a gate driving region and a pad region, and the first and second electrodes of the first and second drive transistors have an interdigital structure.

18. The substrate of claim 17, wherein the second electrode of the second drive transistor has an upper capacitor electrode extending toward the first electrode of the first drive transistor.

19. The substrate of claim 13, wherein the first insulating interlayer is comprised of silicon nitride.

20. The substrate of claim 13, wherein the first insulating interlayer is comprised of a photosensitive organic insulating material.

21. The substrate of claim 20, wherein the insulating interlayer has an embossing formed on a surface of the insulating interlayer.

22. The substrate of claim 13, wherein all the first, second and third electrode patterns are comprised of a same material.

23. A method for manufacturing a substrate, comprising:
 forming a gate pattern on a pixel region and a peripheral region of the substrate;
 forming a gate insulating film on the substrate having the gate pattern;
 forming an active pattern on the gate insulating film, the active pattern including a semiconductor layer;
 forming a data pattern including a first electrode, a second electrode, and a data line coupled to the second electrode;
 forming an insulating interlayer on the data pattern;
 forming a first contact hole for partially exposing a first electrode of the pixel region, a second contact hole for exposing a gate electrode of a first drive transistor of the peripheral region and a third contact hole for exposing a data electrode of a second drive transistor of the peripheral region by partially etching the insulating interlayer;
 forming a conductive film on the insulating interlayer having the first, second, and third contact holes; and
 forming a first electrode pattern and a second electrode pattern by patterning the conductive film, the first electrode pattern being coupled to the first electrode of the pixel region through the first contact hole and the second electrode pattern connecting the exposed gate electrode of the first drive transistor with the exposed data electrode of the second drive transistor through the second and third contact holes.

24. The method of claim 23, wherein the gate pattern includes a gate line and a gate electrode, the gate line is formed on the pixel region and the peripheral region, respectively, the gate electrode is branched from the gate line, said gate pattern being made from a same layer as the gate line, and further including a first lower capacitor electrode which is spaced apart by a predetermined interval from the gate line and is in parallel with the gate line and a second lower capacitor electrode which is formed on the peripheral region of the transparent insulating substrate and is extending from one side of the gate line.

25. The method of claim 23, wherein the peripheral region comprises a gate driving region and a pad region, and the data pattern of the gate drive region comprises the second and first electrodes of the first and second drive transistors, the second and first electrodes having an interdigital structure.

26. The method of claim 25, wherein the first electrode of the first drive transistor of the gate driving region has an upper capacitor electrode extending toward the second electrode of the second drive transistor.

27. The method of claim 23, wherein the active pattern is comprised of amorphous silicon.

28. A method for manufacturing a substrate, comprising:
 forming a gate pattern on a pixel region and a peripheral region of the substrate;
 forming a gate insulating film on the substrate having the gate pattern;
 forming an active pattern on the gate insulating film, the active pattern including a semiconductor layer;
 forming a data pattern including a first electrode, a second electrode and a data line coupled to the second electrode;
 forming an insulating interlayer on the data pattern and the gate insulating film;
 forming a first contact hole for partially exposing the second electrode of the pixel region, a second contact hole for partially exposing the first electrode of the pixel region, a third contact hole for exposing a gate electrode of a first transistor of the peripheral region and a fourth contact hole for exposing a data electrode of a second transistor of the peripheral region by partially etching the insulating interlayer;
 forming a conductive film on the first insulating layer having the first, second, third, and fourth contact holes; and
 forming a first electrode pattern, a second electrode pattern, and a third electrode pattern by patterning the conductive film, the first electrode pattern being coupled to a second electrode of the pixel region through the first contact hole, the second electrode pattern being coupled to a first electrode of the pixel region through the second contact hole and the third electrode pattern connecting the exposed gate electrode of the first transistor with the exposed data electrode of the second transistor through the third and fourth contact holes.

29. The method of claim 28, wherein the gate pattern includes a gate line and a gate electrode, the gate line is formed on the pixel region and the peripheral region, respectively, the gate electrode is branched from the gate line, the gate pattern is made from a same layer as the gate line, and comprises a first lower capacitor electrode spaced apart by a predetermined interval from the gate line and parallel to the gate line and a second lower capacitor electrode formed on the peripheral region of the substrate and from the same layer as the gate line and extending from one side of the gate line.

30. The method of claim 28, wherein the peripheral region comprises a gate driving region and a pad region, and the data pattern of the gate drive region comprises the second and first electrodes of the first and second drive transistors, the second and first electrodes having an interdigital structure.

31. A substrate comprising:
a gate pattern formed on a pixel region and a peripheral region, the pixel region and the peripheral region being disposed on the substrate;
an active pattern insulated from the gate pattern to be formed on the gate pattern, the active pattern including a semiconductor layer;
a data pattern electrically connected to a portion of the active pattern; and
a first insulating interlayer formed on the data pattern, wherein the pixel region includes a plurality of pixels, the active pattern is comprised of amorphous silicon, the data pattern includes a data electrode, and the first insulating interlayer has a first contact hole for partially exposing the data electrode of the data pattern, and a second contact hole for exposing a gate electrode of a first drive transistor of the peripheral region.

32. The substrate of claim 31, wherein the pixels respectively include a first transistor, and the peripheral regions include a plurality of driver transistors for driving the first transistor of the pixels.

33. The substrate of claim 31, wherein the substrate further includes an electrode pattern part formed on the first insulating interlayer, the electrode pattern part including a first electrode pattern in contact with a data electrode of the pixel region through the first contact hole, and a second electrode pattern connecting the partially exposed gate electrode of the first drive transistor with the exposed data electrode of the second drive transistor through the second and third contact holes.

34. The substrate of claim 33, wherein the first and second electrode patterns are comprised of a transparent material.

35. The substrate of claim 34, wherein the transparent material includes indium tin oxide (ITO) or indium zinc oxide (IZO).

* * * * *